United States Patent
Oliver et al.

[11] Patent Number: 5,551,973
[45] Date of Patent: Sep. 3, 1996

[54] PHOTOCHROMIC MICROEMULSION INK COMPOSITIONS

[75] Inventors: John F. Oliver, Calgary; Trevor I. Martin, Burlington; Carol A. Jennings, Etobicoke, all of Canada; Eric G. Johnson, Plant City, Fla.; Marcel P. Breton, Mississauga, Canada

[73] Assignee: Xerox Corporation, Stamford, Conn.

[21] Appl. No.: 567,456

[22] Filed: Dec. 5, 1995

Related U.S. Application Data

[63] Continuation-in-part of Ser. No. 325,762, Oct. 19, 1994, Pat. No. 5,492,559.

[51] Int. Cl.$^6$ .............................. C09D 11/02; C09D 11/06
[52] U.S. Cl. .................. 106/22 B; 106/22 E; 106/20 D; 106/21 A; 106/20 A
[58] Field of Search .............................. 106/22 B, 22 E, 106/20 D, 21 A, 20 A

[56] References Cited

U.S. PATENT DOCUMENTS

| | | | |
|---|---|---|---|
| 3,246,997 | 4/1966 | Sumner | 106/22 E |
| 4,840,674 | 6/1989 | Schwarz | 106/22 |
| 4,853,036 | 8/1989 | Koike et al. | 106/20 |
| 4,938,801 | 7/1990 | Yoshioka et al. | 106/27 R |
| 5,006,170 | 4/1991 | Schwarz et al. | 106/20 |
| 5,021,802 | 6/1991 | Allred | 346/1.1 |
| 5,041,161 | 8/1991 | Cooke et al. | 106/22 |
| 5,047,084 | 9/1991 | Miller et al. | 106/27 |
| 5,051,779 | 9/1991 | Hikawa | 355/200 |
| 5,065,167 | 11/1991 | You et al. | 346/1.1 |
| 5,074,915 | 12/1991 | Yoshioka et al. | 106/27 R |
| 5,091,966 | 2/1992 | Bloomberg et al. | 382/210 |
| 5,122,187 | 6/1992 | Schwarz et al. | 106/25 |
| 5,124,718 | 6/1992 | Korte et al. | 346/1.1 |
| 5,128,525 | 7/1992 | Stearns et al. | 235/454 |
| 5,168,147 | 12/1992 | Bloomberg | 235/456 |
| 5,226,957 | 7/1993 | Wickramanyale et al. | 106/25 R |
| 5,291,243 | 3/1994 | Heckman et al. | 355/201 |
| 5,337,361 | 8/1994 | Wang et al. | 380/51 |

FOREIGN PATENT DOCUMENTS

| | | |
|---|---|---|
| 0459792 | 4/1991 | European Pat. Off. . |
| 0506395 | 3/1992 | European Pat. Off. . |
| 0469864 | 5/1992 | European Pat. Off. . |

OTHER PUBLICATIONS

"Interfacial Phenomena in Apolar Media" (7 pages) Steg E. Friberg–Chemistry Dept. University of Missouri at Rolls (no date available).

"A Hot Melt Ink for Thermal Jet Printing"–Journal of Imaging Science and technology–vol. 36, #2, Mar./Apr. 1992.

*Primary Examiner*—Helene Klemanski
*Attorney, Agent, or Firm*—Judith L. Byorick

[57] ABSTRACT

Disclosed is an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

42 Claims, 3 Drawing Sheets

PHOTOCHROMIC MICROEMULSION INK COMPOSITIONS

This application is a continuation-in-part of application U.S. Ser. No. 08/325,762, filed Oct. 19, 1994, now U.S. Pat. No. 5,492,559 entitled "Liquid Crystalline Microemulsion Ink Compositions", the disclosure of which is totally incorporated herein by reference.

BACKGROUND OF THE INVENTION

The present invention is directed to ink compositions. More specifically, the present invention is directed to ink compositions particularly suitable for use in thermal ink jet printing processes. One embodiment of the present invention is directed to an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink, in excess of the normal boiling point, diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be retired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

Ink jet printing processes may also employ inks that are solid at room temperature and liquid at elevated temperatures. For example, U.S. Pat. No. 4,490,731, the disclosure of which is totally incorporated herein by reference, discloses an apparatus for dispensing solid ink for printing on a substrate such as paper. The ink dye vehicle is chosen to have a melting point above room temperature, so that the ink which is melted in the apparatus will not be subject to evaporation or spillage during periods of nonprinting. The vehicle is also chosen to have a low critical temperature to permit the use of solid ink in a thermal ink jet printer. In thermal ink jet printing processes employing hot melt inks, the solid ink is melted by a heater in the printing apparatus and utilized as a liquid in a manner similar to that of conventional thermal ink jet printing. Upon contact with the printing substrate, the molten ink solidifies rapidly, enabling the dye to remain on the surface instead of being carried into the paper by capillary action, thereby enabling higher print density than is generally obtained with liquid inks. Advantages of a hot melt ink in ink jet printing are elimination of potential spillage of the ink during handling, a wide range of print density and quality, minimal paper cockle or distortion, and enablement of indefinite periods of nonprinting without the danger of nozzle clogging, even without capping the nozzles.

In addition, U.S. Pat. No. 4,751,528, the disclosure of which is totally incorporated herein by reference, discloses a hot melt ink jet system which includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

Further, U.S. Pat. No. 4,791,439, the disclosure of which is totally incorporated by reference, discloses an apparatus for use with hot melt inks having an integrally connected ink jet head and reservoir system, the reservoir system including a highly efficient heat conducting plate inserted within an essentially non-heat conducting reservoir housing. The reservoir system has a sloping flow path between an inlet position and a sump from which ink is drawn to the head, and includes a plurality of vanes situated upon the plate for rapid heat transfer.

Ink compositions for ink jet printing are known. For example, U.S. Pat. No. 4,840,674 (Schwarz), the disclosure of which is totally incorporated herein by reference, discloses an ink composition which comprises a major amount of water, an organic solvent selected from the group consisting of tetramethylene sulfone, 1,1,3,3-tetramethyl urea, 3-methyl sulfolane, and 1,3-dimethyl-2-imidazolidone, which solvent has permanently dissolved therein spirit soluble dyes.

U.S. Pat. No. 5,006,170 (Schwarz) and U.S. Pat. No. 5,122,187 (Marchessault et al.), the disclosures of each of which are totally incorporated herein by reference, disclose hot melt ink compositions suitable for ink jet printing which comprise a colorant, a binder, and a propellant selected from the group consisting of hydrazine; cyclic amines; ureas; carboxylic acids; sulfonic acids; aldehydes; ketones; hydrocarbons; esters; phenols; amides; imides; halocarbons; urethanes; ethers; sulfones; sulfamides; sulfonamides; phosphites; phosphonates; phosphates; alkyl sulfides; alkyl acetates; and sulfur dioxide. Also disclosed are hot melt ink compositions suitable for ink jet printing which comprise a colorant, a propellant, and a binder selected from the group consisting of rosin esters; polyamides; dimer acid amides; fatty acid amides; epoxy resins; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides; benzoate esters; long chain alcohols; phthalate plasticizers; citrate plasticizers; maleate plasticizers; sulfones; polyvinyl pyrrolidinone copolymers; polyvinyl pyrrolidone/polyvinyl acetate copolymers; novalac resins; natural product waxes; mixtures of linear primary alcohols and linear long chain amides; and mixtures of linear primary alcohols and fatty acid amides. In one embodiment, the binder comprises a liquid crystalline material.

Photochromism in general is a reversible change of a single chemical species between two states having distinguishably different absorption spectra, wherein the change is induced in at least one direction by the action of electromagnetic radiation. The inducing radiation, as well as the changes in the absorption spectra, are usually in the ultraviolet, visible, or infrared regions. In some instances, the change in one direction is thermally induced. The single chemical species can be a molecule or an ion, and the reversible change in states may be a conversion between two molecules or ions, or the dissociation of a single molecule or ion into two or more species, with the reverse change being a recombination of the two or more species thus formed into the original molecule or ion. Photochromic phenomena are observed in both organic compounds, such as anils, disulfoxides, hydrazones, osazones, semicarbazones, stilbene derivatives, o-nitrobenzyl derivatives, spiro compounds, and the like, and in inorganic compounds, such as metal oxides, alkaline earth metal sulfides, titanates, mercury compounds, copper compounds, minerals, transition metal compounds such as carbonyls, and the like. Photochromic materials are known in applications such as photochromic glasses, which are useful as, for example, ophthalmic lenses.

Methods for encoding machine-readable information on documents, packages, machine parts, and the like, are known. One-dimensional symbologies, such as those employed in bar codes, are known. Two-dimensional symbologies generally are of two types—matrix codes and stacked bar codes. Matrix codes typically consist of a random checker board of black and white squares. Alignment features such as borders, bullseyes, start and stop bits, and the like, are included in the matrix to orient the matrix during scanning. Stacked bar codes consist of several one-dimensional bar codes stacked together. Two-dimensional symbologies have an advantage over one-dimensional symbologies of enabling greater data density. For example, a typical bar code can contain from about 9 to about 20 characters per inch, while a typical two-dimensional symbology can contain from about 100 to about 800 characters per square inch. Many two-dimensional symbologies also utilize error correction codes to increase their robustness. Examples of two-dimensional symbologies include PDF417, developed by Symbol Technologies, Inc., Data Matrix, developed by International Data Matrix, Vericode, developed by Veritec, Inc., CP Code, developed by Teiryo, Inc. and Integrated Motions, Inc., Maxicode, developed by the United Parcel Service, Softstrip, developed by Softstrip, Inc., Code One, developed by Laserlight Systems, Supercode, developed by Metanetics Inc., DataGlyph, developed by Xerox Corporation, and the like. One-dimensional and two-dimensional symbologies can be read with laser scanners or with video cameras. The scanners typically consist of an imaging detector coupled to a microprocessor for decoding. Scanners can be packaged into pen-like pointing devices or guns. Bar-like codes and methods and apparatus for coding and decoding information contained therein are disclosed in, for example, U.S. Pat. No. 4,692,603, U.S. Pat. No. 4,665,004, U.S. Pat. No. 4,728,984, U.S. Pat. No. 4,728,783, U.S. Pat. No. 4,754,127, and U.S. Pat. No. 4,782,221, the disclosures of each of which are totally incorporated herein by reference.

European Patent Application 469,864-A2 (Bloomberg et al.), the disclosure of which is totally incorporated herein by reference, discloses self-clocking glyph shape codes for encoding digital data in the shapes of glyphs that are suitable for printing on hardcopy recording media. Advantageously, the glyphs are selected so that they tend not to degrade into each other when they are degraded and/or distorted as a result, for example, of being photocopied, transmitted via facsimile, and/or scanned into an electronic document processing system. Moreover, for at least some applications, the glyphs desirably are composed of printed pixel patterns containing nearly the same number of on pixels and nearly the same number of off pixels, such that the code that is rendered by printing such glyphs on substantially uniformly spaced centers appears to have a generally uniform texture. In the case of codes printed at higher spatial densities, this texture is likely to be perceived as a generally uniform gray tone. Binary image processing and convolution filtering techniques for decoding such codes are also disclosed.

European Patent Application 459,792-A2 (Zdybel et al.), the disclosure of which is totally incorporated herein by reference, discloses the provision in electronic document processing systems for printing unfiltered or filtered machine-readable digital representations of electronic documents, and human-readable renderings of them on the same record medium using the same printing process. The integration of machine-readable digital representations of electronic documents with the human-readable hardcopy renderings of them may be employed, for example, not only to enhance the precision with which the structure and content of such electronic documents can be recovered by scanning such hardcopies into electronic document processing systems, but also as a mechanism for enabling recipients of scanned-in versions of such documents to identify and process annotations that were added to the hardcopies after they were printed and/or for alerting the recipients of the scanned-in documents to alterations that may have been made to the original human-readable content of the hardcopy renderings. In addition to storage of the electronic representation of the document, provision is made for encoding information about the electronic representation of the document itself, such as file name, creation and modification dates, access and security information, and printing histories. Provision is also made for encoding information which is computed from the content of the document and other information, for purposes of authentication and verification of document integrity. Provision is also made for the encoding of information which relates to operations which are to be performed depending on handwritten marks made upon a hardcopy rendering of the document; for example, encoding instructions of what action is to be taken when a box on a document is checked. Provision is also made for encoding in the hardcopy another class of information; information about the rendering of the document specific to that hardcopy, which can include a numbered copy of that print, the identification of the machine which performed that print, the reproduction characteristics of the printer, and the screen frequency and rotation used by the printer in rendering halftones. Provision is also made for encoding information about the digital encoding mechanism itself, such as information given in standard-encoded headers about subsequently compressed or encrypted digital information.

U.S. Pat. No. 5,128,525 (Stearns et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,291,243 (Heckman et al.), the disclosure of which is totally incorporated herein by reference, discloses a system for printing security documents which have copy detection or tamper resistance in plural colors with a single pass electronic printer printing an integrated image controlled by an image generation system which electronically generates a safety background image pattern with first and second interposed color patterns which is electronically merged with alphanumeric information and a protected signature into an integrated electronic image for the printer. The single pass printer preferably has an imaging surface upon which two latent images thereof are interposed, developed with two differently colored developer materials, and simultaneously transferred to the substrate in a single pass. The color patterns are preferably oppositely varying density patterns of electronically generated pixel dot images with varying spaces therebetween. Preferably a portion of the alphanumeric information is formed by a special secure font, such as a low density shadow copy. The validating signature also preferably has two intermixed color halftone patterns with halftone density gradients varying across the signature in opposite directions, but differently from the background. Also electronically superimposed in the safety background pattern may be substantially invisible latent image pixel patterns which become visible when copied, and/or are machine readable even in copies.

U.S. Pat. No. 5,168,147 (Bloomberg), the disclosure of which is totally incorporated herein by reference, discloses binary image processing techniques for decoding bitmap image space representations of self-clocking glyph shape codes of various types (e.g., codes presented as original or degraded images, with one or a plurality of bits encoded in each glyph, while preserving the discriminability of glyphs that encode different bit values) and for tracking the number and locations of the ambiguities (sometimes referred to herein as "errors") that are encountered during the decoding of such codes. A substantial portion of the image processing that is performed in the illustrated embodiment of the invention is carried out through the use of morphological filtering operations because of the parallelism that is offered by such operations. Moreover, the error detection that is performed in accordance with this invention may be linked to or compared against the error statistics from one or more alternative decoding process, such as the convolution filtering process that is disclosed herein, to increase the reliability of the decoding that is obtained.

U.S. Pat. No. 5,091,966 (Bloomberg et al.), the disclosure of which is totally incorporated herein by reference, discloses weighted and unweighted convolution filtering processes for decoding bitmap image space representations of self-clocking glyph shape codes and for tracking the number and locations of the ambiguities or "errors" that are encountered during the decoding. This error detection may be linked to or compared against the error statistics from an alternative decoding process, such as the binary image processing techniques that are described to increase the reliability of the decoding that is obtained.

U.S. Pat. No. 5,051,779 (Hikawa), the disclosure of which is totally incorporated herein by reference, discloses an image processing system which specifies input image information on the basis of existence of a special mark or patterns printed on a job control sheet. Selected one of various image processings is executed in accordance with the existence of the special mark or patterns to thereby obtain output image information. Each of the special marks or patterns are line drawings, each drawn so as to have a certain low correlative angle to the longitudinal and transverse directions of an image provided with the special mark or patterns.

U.S. Pat. No. 5,337,361 (Wang et al.), the disclosure of which is totally incorporated herein by reference, discloses a record which contains a graphic image and an information area which are interrelated to discourage misuse of the record. The information area can overlay the graphic image and include information encoded in an error-correctable, machine-readable format which allows recovery of the information despite distortion due to the underlying graphic image. The record may also represent the image by words similar in form to words in the information area. Both the information and graphic words can then be altered when an action regarding the record takes place.

U.S. Pat. No. 5,021,802 (Allred), the disclosure of which is totally incorporated herein by reference, discloses a bubble jet ink which comprises 90 to 99.9 percent by weight of aqueous sol-gel medium and 0.1 to 1 percent by weight colorant. The inks are thermally reversible sol-gels which are gels at ambient temperatures and form liquid sols at temperatures between about 40° and 100° C.

U.S. Pat. No. 5,041,161 (Cooke et al.), the disclosure of which is totally incorporated herein by reference, discloses an ink jet ink which is semi-solid at room temperature. The ink combines the advantageous properties of thermal phase change inks and liquid inks. The inks comprise vehicles, such as glyceryl esters, polyoxyethylene esters, waxes, fatty acids, and mixtures thereof, which are semi-solid at temperatures between 20° and 45° C. The ink is impulse jetted at an elevated temperature in the range of above 45° C. to about 110° C., at which temperature the ink has a viscosity of about 10 to 15 centipoise. The inks also contain 0.1 to 30 weight percent of a colorant system.

U.S. Pat. No. 4,853,036 and U.S. Pat. No. 5,124,718 disclose an ink for ink jet recording which comprises a liquid composition essentially comprising a coloring matter, a volatile solvent having a vapor pressure of 1 mm Hg or more at 25° C., and a material being solid at room temperature and having a molecular weight of 300 or more, and prepared so as to satisfy the formula $B_1/A_1 \geq 3$, assuming viscosity as A1 cP at 25° C., measured when the content of the solid material in the composition is 10 percent by weight, and assuming viscosity as $B_1$ cP at 25° C., measured when the content of the solid material in the composition is 30 percent by weight. An ink jet recording process using the ink is also disclosed.

U.S. Pat. No. 5,065,167 (You et al.), the disclosure of which is totally incorporated herein by reference, discloses an ink jet ink including a waxy carrier that is solid at 25° C. and liquid at the operating temperature of an ink jet nozzle and a driver having a critical pressure greater than 10 atmospheres, the carrier and driver being miscible in liquid phase.

U.S. Pat. No. 5,047,084 (Miller et al.), the disclosure of which is totally incorporated herein by reference, discloses an ink jet ink in the form of a microemulsion of an organic vehicle phase comprising fatty acid and colorant dispersed therein and an aqueous phase containing a surfactant, the vehicle phase preferably being liquid at 70° C. and solid at 20° C.

U.S. Pat. No. 5,226,957 (Wickramanayake et al.), the disclosure of which is totally incorporated herein by reference, discloses water insoluble dyes formulated in a microemulsion-based ink which is waterfast, non-threading, and bleed-alleviated. The inks comprise (a) about 0.05 to 0.75 weight percent of a high molecular weight colloid, (b) about 0.1 to 40 weight percent of at least two surfactants, comprising at least one surfactant and at least one co-surfactant, (c) about 0.5 to 20 weight percent of at least one cosolvent, (d) about 0.1 to 5 weight percent of at least one water insoluble dye, (e) about 0.1 to 20 weight percent of an oil, and (f) the balance water. The ink forms a stable microemulsion.

"Stabilization of Inverse Micelles by Nonionic Surfactants," Stig E. Friberg, contained in *Interfacial Phenomena in Apolar Media*, Eicke & Parfitt, eds., Marcel Dekker Inc. (New York and Basel 1987), the disclosure of which is totally incorporated herein by reference, discloses and describes systems with hydrocarbon, water, and nonionic polyalkylene glycol alkyl ether surfactants which display pronounced variation of their phase patterns with temperature. At particular temperatures and component concentrations, a lamellar liquid crystalline phase is observed.

"A Hot Melt Ink for Thermal Jet Printing," A. H. Sporer et al., Journal of Imaging Science and Technology, Vol. 36, No. 2, p. 176 (March/April 1992), the disclosure of which is totally incorporated herein by reference, discloses an ink technology wherein the fluid vehicle of the ink is a stable, single-phase, water-in-oil (wax) microemulsion at elevated temperatures in the range of 70° to 95° C., yet is a solid at ambient temperatures. The ink, because it is a microemulsion, is stable to freeze-melt cycles. The ink is suitable for jetting as a hot melt ink in conventional continuous or impulse ink jet apparatus, and can also operate in impulse thermal ink jet printheads where other hot melt ink jet ink compositions cannot.

Copending application U.S. Ser. No. 08/325,914, filed Oct. 19, 1994, entitled "Coated Recording Sheets," with the named inventor William M. Schwarz, the disclosure of which is totally incorporated herein by reference, discloses a recording sheet which comprises a substrate and a coating thereon comprising water and a surfactant capable of exhibiting a liquid crystalline phase in water at a temperature of about 25° C. or higher, said coating containing the water and surfactant in relative concentrations such that upon addition of water to the coating, the surfactant undergoes a phase change, thereby increasing the viscosity of the coating. In one embodiment, the surfactant is in a lamellar liquid crystalline phase and, upon addition of water to the coating, the surfactant undergoes a phase change to a hexagonal liquid crystalline phase. Also disclosed are ink jet printing processes wherein an aqueous ink is applied to the aforementioned recording sheet.

Copending application U.S. Ser. No. 08/325,762, filed Oct. 19, 1994, entitled "Liquid Crystalline Microemulsion Ink Compositions," with the named inventors John F. Oliver, Marcel P. Breton, Stig E. Friberg, Raymond W. Wong, and William M. Schwarz, the disclosure of which is totally incorporated herein by reference, discloses an ink composition which comprises an aqueous phase, an oil phase, an oil-soluble dye, and a surfactant, said ink exhibiting a liquid crystalline gel phase at a first temperature and a liquid microemulsion phase at a second temperature higher than the first temperature.

Copending application U.S. Ser. No. 08/567,786, filed concurrently herewith, entitled "Method for Embedding and Recovering Machine-Readable Information," with the named inventors Trevor I. Martin and John F. Oliver, the disclosure of which is totally incorporated herein by reference, discloses a method of embedding and recovering machine readable information on a substrate which comprises (a) writing data in a predetermined machine readable code format on the substrate with a photochromic marking material having a first state corresponding to a first absorption spectrum and a second state corresponding to a second absorption spectrum; and (b) thereafter effecting a photochromic change in the photochromic marking material from the first state to the second state.

Copending application U.S. Ser. No. 07/567,637, filed concurrently herewith, entitled "Ink Compositions With Liposomes Containing Photochromic Compounds," with the named inventors Carol A. Jennings, Marcel P. Breton, Mary A. Isabella, Eric G. Johnson, Trevor I. Martin, and John F. Oliver, the disclosure of which is totally incorporated herein by reference, discloses an ink composition which comprises an aqueous liquid vehicle, a photochromic material, and a vesicle-forming lipid, wherein vesicles of the lipid are present in the ink.

Copending application U.S. Ser. No. 08/567,589, filed concurrently herewith, entitled "Photochromic Electrostatic Toner Compositions," with the named inventors Trevor I. Martin, Carol A. Jennings, Eric G. Johnson, and John F. Oliver, the disclosure of which is totally incorporated herein by reference, discloses a toner composition for the development of electrostatic latent images which comprises particles comprising a mixture of a resin and a photochromic material. Another embodiment of the invention is directed to a liquid developer composition for the development of electrostatic latent images which comprises a nonaqueous liquid vehicle and a photochromic material, wherein the liquid developer has a resistivity of from about $10^8$ to about $10^{11}$ ohm-cm and a viscosity of from about 25 to about 500 centipoise. Yet another embodiment of the invention is directed to a liquid developer composition for the development of electrostatic latent images which comprises a nonaqueous liquid vehicle, a charge control agent, and toner particles comprising a mixture of a resin and a photochromic material.

Copending application U.S. Ser. No. 08/567,457, filed concurrently herewith, entitled "Photochromic Hot Melt Ink Compositions," with the named inventors John F. Oliver, Trevor I. Martin, Carol A. Jennings, Eric G. Johnson, and Stephan V. Drappel, the disclosure of which is totally incorporated herein by reference, discloses a hot melt ink composition comprising (a) an ink vehicle, said ink vehicle being a solid at about 25° C. and having a viscosity of from about 1 to about 20 centipoise at a temperature suitable for hot melt ink jet printing, said temperature being greater than about 45° C., (b) a photochromic material, and (c) an optional propellant.

While known compositions and processes are suitable for their intended purposes, a need remains for ink compositions suitable for thermal ink jet printing. In addition, there is a need for ink compositions which are compatible with a wide variety of plain papers. Further, a need exists for ink compositions compatible with a wide variety of plain papers without the need for special ink drying hardware in the printing apparatus. Additionally, there is a need for ink compositions which generate high quality, waterfast images on plain papers. There is also a need for thermal ink jet ink compositions which generate high quality, fast-drying images on a wide variety of plain papers at low cost, with high quality text, high quality graphics, minimal feathering, minimal intercolor bleed, and excellent image permance. Further, there is a need for thermal ink jet ink compositions which can be employed without the need for very high printhead temperatures. Additionally, there is a need for ink compositions with photochromic characteristics. There is also a need for aqueous photochromic ink compositions suitable for use in thermal ink jet printing processes. A need also remains for processes for preparing documents with images having photochromic characteristics. In addition, there is a need for ink compositions which enable production of photochromic documents wherein the stimulus required to invoke the photochromic response is relatively brief rather than continuous. Further, there is a need for processes and materials which enable the placement of encoded information on documents which is not detectable to the reader but which is machine readable. Additionally, there is a need for aqueous photochromic ink compositions wherein the photochromic material is soluble in the ink vehicle and is also waterfast on the substrate upon which it is printed.

SUMMARY OF THE INVENTION

It is an object of the present invention to provide an ink composition with the above noted advantages.

It is another object of the present invention to provide ink compositions suitable for thermal ink jet printing.

It is yet another object of the present invention to provide ink compositions which are compatible with a wide variety of plain papers.

It is still another object of the present invention to provide ink compositions compatible with a wide variety of plain papers without the need for special ink drying hardware in the printing apparatus.

Another object of the present invention is to provide ink compositions which generate high quality, waterfast images on plain papers.

Yet another object of the present invention is to provide thermal ink jet ink compositions which generate high quality, fast-drying images on a wide variety of plain papers at low cost, with high quality text, high quality graphics, minimal feathering, minimal intercolor bleed, and excellent image permanence.

Still another object of the present invention is to provide thermal ink jet ink compositions which can be employed without the need for very high printhead temperatures.

It is another object of the present invention to provide ink compositions with photochromic characteristics.

It is yet another object of the present invention to provide aqueous photochromic ink compositions suitable for use in thermal ink jet printing processes.

It is still another object of the present invention to provide processes for preparing documents with images having photochromic characteristics.

Another object of the present invention is to provide ink compositions which enable production of photochromic documents wherein the stimulus required to invoke the photochromic response is relatively brief rather than continuous.

Yet another object of the present invention is to provide processes and materials which enable the placement of encoded information on documents which is not detectable to the reader but which is machine readable.

Still another object of the present invention is to provide aqueous photochromic ink compositions wherein the photochromic material is soluble in the ink vehicle and is also waterfast on the substrate upon which it is printed.

These and other objects of the present invention (or specific embodiments thereof) can be achieved by providing an ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

BRIEF DESCRIPTION OF THE DRAWINGS

Illustrated schematically in FIGS. 1 and 3 are partial phase diagrams at 25° C. for mixtures of water, polyoxyethylene (10) stearyl ether, and a ketone mixture comprising 50 percent by weight methyl ethyl ketone and 50 percent by weight 2,4-pentanedione.

Illustrated schematically in FIG. 2 is a partial phase diagram at 50° C. for mixtures of water, polyoxyethylene (10) stearyl ether, and a ketone mixture comprising 50 percent by weight methyl ethyl ketone and 50 percent by weight 2,4-pentanedione.

DETAILED DESCRIPTION OF THE INVENTION

Figure 1:
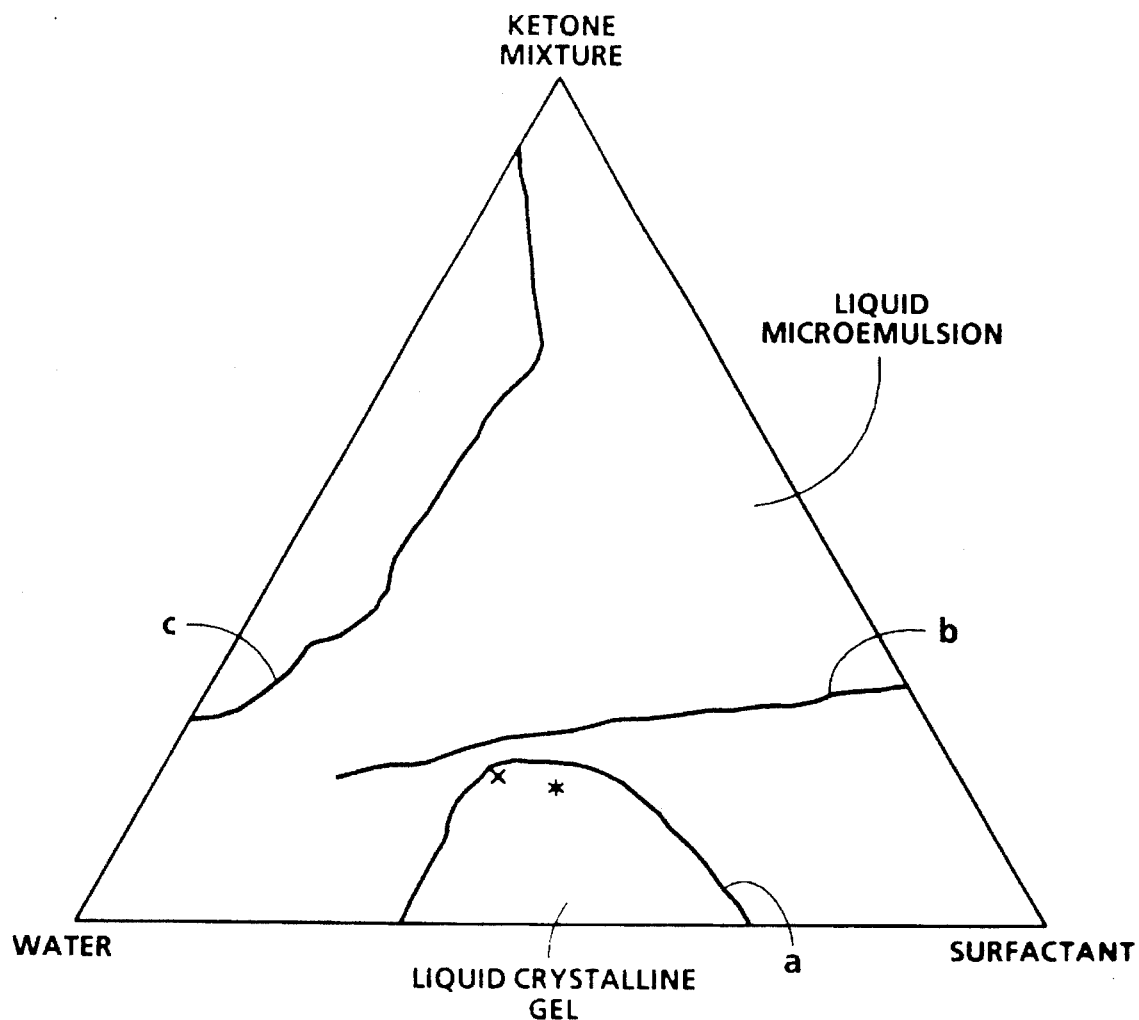

The ink compositions of the present invention comprise an aqueous phase, an oil phase, a photochromic material, and a surfactant. Water is present in the ink in any effective amount to enable formation of an emulsion, preferably an oil-in-water emulsion, and to enable bubble formation in a thermal ink jet printing process. Typically, water is present in the ink in an amount of from about 10 to about 50 percent by weight, although the amount can be outside this range.

The inks of the present invention also contain an oil phase or organic component which is immiscible with water. The organic component can be either a single organic compound or a mixture of two or more organic compounds which are mutually miscible wherein the mixture forms a distinct phase in water. The organic component is one in which a photochromic material (and, if present, an oil-soluble dye) can be dissolved or dispersed, and is one which is capable of forming an emulsion in water, preferably an oil-in-water emulsion. Provided that these conditions are met, the organic component can be selected so that the resulting ink exhibits the desired viscosity and surface tension properties which are most compatible with the operability of the particular printhead to be used and the particular substrate onto which the ink will be jetted. Examples of suitable materials for the organic phase include various mixtures of ketones, alcohols, glycol ethers, and hydrocarbons. Specific examples include methyl ethyl ketone, 2,4-pentadione, ethylene glycol dimethyl ether, ethanol, hexane, and the like. While solvents with boiling points of less than about 80° C. are suitable, solvents which boil at higher temperatures are also suitable, including those with boiling points of over 80° C., and those with boiling points of over 100° C., such as sulfolane, cyclohexanone, 2-pentanol, and the like. The organic component is present in the ink in any effective amount to enable formation of an emulsion with a photochromic material contained in the oil phase. Typically, the organic component is present in the ink in an amount of from about 15 to about 50 percent by weight, preferably from about 17 to about 44 percent by weight, although the amount can be outside these ranges.

Ink compositions of the present invention also contain one or more surfactants capable of imparting to the mixture of water and oil phase a liquid crystalline microemulsion structure at a temperature suitable for ink jet printing. The surfactant or mixture of surfactants is present in any effective amount to enable formation of a liquid crystalline emulsion between the water and organic component in the ink. Typically, the surfactant or mixture of surfactants is present in the ink in an amount of from about 25 to about 65 percent by weight, preferably from about 27 to about 60 percent by weight, although the amount can be outside these ranges. Preferred surfactants generally are nonionic surfactants, which may also be combined with small amounts (i.e., typically less than about 10 percent) of ionic surfactants, although ionic surfactants can also be employed in the absence of nonionic surfactants. Examples of suitable surfactants include those based upon alkyl or alkylaryl groups as the hydrophobic units and alkylene oxide or alkylene glycol groups as the hydrophilic units. Examples include those of the general structural formula $C_xH_{(2x+1)}(OCH_2CH_2)_yA$, wherein x is an integer of from about 8 to about 22, preferably from about 12 to about 18, y is an integer of from 0 to about 14, preferably from about 2 to about 8, and A is a terminal functional group. Also suitable are surfactants of the general structural formula

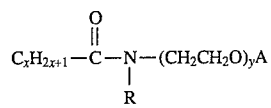

wherein R is hydrogen or an alkyl group (such as methyl, ethyl, propyl, butyl, or the like), x is an integer of from about 8 to about 22, preferably from about 12 to about 18, y is an integer of from 0 to about 14, preferably from about 2 to about 8, and A is a terminal functional group. Also suitable are surfactants of the general structural formula

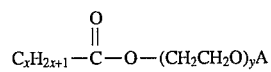

wherein x is an integer of from about 8 to about 22, preferably from about 12 to about 18, y is an integer of from 0 to about 14, preferably from about 2 to about 8, and A is a terminal functional group. Also suitable are surfactants of the general structural formula

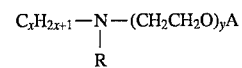

wherein R is hydrogen or an alkyl group (such as methyl, ethyl, propyl, butyl, or the like), x is an integer of from about 8 to about 22, preferably from about 12 to about 18, y is an integer of from 0 to about 14, preferably from about 2 to about 8, and A is a terminal functional group. Also suitable are surfactants of the general structural formula

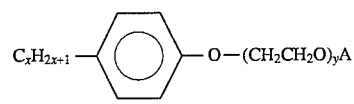

wherein x is an integer of from about 8 to about 22, preferably from about 12 to about 18, y is an integer of from 0 to about 14, preferably from about 2 to about 8, and A is a terminal functional group. Surfactants of this general formula are available from, for example, Union Carbide, Danbury, Conn. Also suitable are surfactants of the general formula

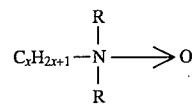

wherein each R is, independently of the other, hydrogen or an alkyl group (such as methyl, ethyl, propyl, butyl, or the like), and x is an integer of from about 8 to about 22, preferably from about 12 to about 18. Surfactants of this general formula are generally available, for example, as the Ammonyx Series from Stepan Chemicals, Northfield, Ill. Also suitable are surfactants of the general formula

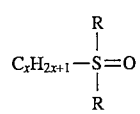

wherein each R is, independently of the other, hydrogen or an alkyl group (such as methyl, ethyl, propyl, butyl, or the like), and x is an integer of from about 8 to about 22, preferably from about 12 to about 18. Also suitable are surfactants of the general formula

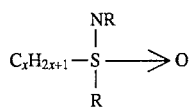

wherein each R is, independently of the other, hydrogen or an alkyl group (such as methyl, ethyl, propyl, butyl, or the like), and x is an integer of from about 8 to about 22, preferably from about 12 to about 18. Also suitable are surfactants of the general formula

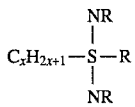

wherein each R is, independently of the others, hydrogen or an alkyl group (such as methyl, ethyl, propyl, butyl, or the like), and x is an integer of from about 8 to about 22, preferably from about 12 to about 18. Also suitable are surfactants of the general formula

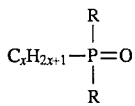

wherein each R is, independently of the others, hydrogen or an alkyl group (such as methyl, ethyl, propyl, butyl, or the like), and x is an integer of from about 8 to about 22, preferably from about 12 to about 18.

Examples of suitable terminal functional groups "A" include —H, —OH, —CH$_3$, —C$_2$H$_5$, —CH$_2$CH$_2$CH$_3$, —CH(CH$_3$)$_2$, —OSO$_3^-$, —OSO$_2$NR$_2$ wherein each R is, independently of the others, hydrogen or an alkyl group (such as methyl, ethyl, propyl, butyl, or the like), —COO$^-$, —OPO$_3^-$, —C(O)OCH$_2$CH$_2$SO$_3^-$, —NR$_3^+$ wherein each R is, independently of the others, hydrogen or an alkyl group (such as methyl, ethyl, propyl, butyl, or the like), —N(R)CH$_2$COO$^-$ wherein R is hydrogen or an alkyl group (such as methyl, ethyl, propyl, butyl, or the like), —N$^+$R$_2$CH$_2$COO$^-$ wherein each R is, independently of the other, hydrogen or an alkyl group (such as methyl, ethyl, propyl, butyl, or the like), —N(R)CH$_2$CH$_2$COO$^-$ wherein R is hydrogen or an alkyl group (such as methyl, ethyl, propyl, butyl, or the like), —N$^+$R$_2$CH$_2$CH$_2$COO$^-$ wherein each R is, independently of the other, hydrogen or an alkyl group (such as methyl, ethyl, propyl, butyl, or the like), —N(R)CH$_2$SO$_3^-$ wherein R is hydrogen or an alkyl group (such as methyl, ethyl, propyl, butyl, or the like), —N$^+$R$_2$CH$_2$SO$_3^-$ wherein each R is, independently of the other, hydrogen or an alkyl group (such as methyl, ethyl, propyl, butyl, or the like), —N(R)CH$_2$CH$_2$SO$_3^-$ wherein R is hydrogen or an alkyl group (such as methyl, ethyl, propyl, butyl, or the like), —N$^+$R$_2$CH$_2$CH$_2$SO$_3^-$ wherein each R is, independently of the other, hydrogen or an alkyl group (such as methyl, ethyl, propyl, butyl, or the like), —C(O)N(R)CH$_2$COO$^-$ wherein R is hydrogen or an alkyl group (such as methyl, ethyl, propyl, butyl, or the like), —C(O)N(R)CH$_2$CH$_2$COO$^-$ wherein R is hydrogen or an alkyl group (such as methyl, ethyl, propyl, butyl, or the like), —C(O)N(R)CH$_2$SO$_3^-$ wherein R is hydrogen or an alkyl group (such as methyl, ethyl, propyl, butyl, or the like), —C(O)N(R)CH$_2$CH$_2$SO$_3^-$ wherein R is hydrogen or an alkyl group (such as methyl, ethyl, propyl, butyl, or the like), or any other suitable terminal functional group. Specific examples of suitable surfactants include ammonium laureth sulfate, commercially available as Steol CA 460 from Stepan Chemicals, Northfield, Ill., the Genapol® series of surfactants available from Hoechst Celanese Corp., Charlotte, N.C., including the 26-L series and the 24-L series, of the general formula RO(CH$_2$CH$_2$O)$_n$H wherein R is a mixture of linear, even carbon-number hydrocarbon chains ranging from C$_{12}$H$_{25}$ to C$_{16}$H$_{33}$ and n represents the number of repeating units and is a number of from 1 to about 12, such as 26-L-1, 26-L-1.6, 26-L-2, 26-L-3, 26-L-5, 26-L-45, 26-L-50, 26-L- 60, 26-L-60N, 26-L-75, 26-L-98N, 24-L-3, where R is a mixture of C$_{12}$H$_{25}$ and C$_{14}$H$_{29}$ and n has an average value of about 3, 24-L-45, where R is a mixture of C$_{12}$H$_{25}$ and C$_{14}$H$_{29}$ and n has an average value of about 6.3, 24-L-50, where R is a mixture of C$_{12}$H$_{25}$ and C$_{14}$H$_{29}$ and n has an average value of about 6.9, 24-L-60, where R is a mixture of C$_{12}$H$_{25}$ and C$_{14}$H$_{29}$ and n has an average value of about 7.2, 24-L-60N, where R is a mixture of C$_{12}$H$_{25}$ and C$_{14}$H$_{29}$ and n has an average value of about 7.0, 24-L-75, where R is a mixture of C$_{12}$H$_{25}$ and C$_{14}$H$_{29}$ and n has an average value of about 8.3, 24-L- 92, and 24-L-98N, where R is a mixture of C12H25 and C14H29 and n has an average value of about 11.3, polyoxyethylene (10) stearyl ether surfactant (Brij 76, available from ICI Americas, Inc., Wilmington, Del.), Brij 56 polyoxyethylene (10) cetyl ether surfactant (available from ICI Americas, Inc., Wilmington, Del.), Brij 78 polyoxyethylene (20) stearyl ether surfactant (available from ICI Americas, Wilmington, Del.), sodium dioctyl sulfosuccinate surfactant (available as Aerosil OT from American Cyanamid, Wayne, N.J.), sodium dodecyl sulfonate surfactant (available from E. I. Du Pont de Nemours & Co., Wilmington, Del.), cetyl trimethyl ammonium bromide surfactant, and the like, as well as mixtures thereof.

Inks of the present invention also contain a photochromic material. Examples of suitable photochromic materials include compounds that undergo heterolytic cleavage, such as spiropyrans and related compounds, and the like; compounds that undergo homolytic cleavage, such as bis-imidazole compounds, bis-tetraphenylpyrrole, hydrazine compounds, aryl disulfide compounds, and the like; compounds that undergo cis-trans isomerization, such as stilbene compounds, photoisomerizable azo compounds, and the like; compounds that undergo photochromic tautomerism, including those that undergo hydrogen transfer phototautomerism, those that undergo photochromic valence tautomerism, and the like; and others.

More specifically, examples include spiropyrans, of the general formula

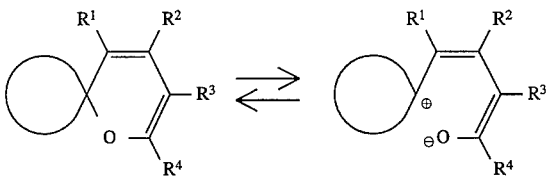

wherein R$^1$, R$^2$, R$^3$, and R$^4$ each, independently of the others, can be (but are not limited to) hydrogen, alkyl, including cyclic alkyl groups, such as cyclopropyl, cyclohexyl, and the like, and including unsaturated alkyl groups, such as vinyl (H$_2$C=CH—), allyl (H$_2$C=CH—CH$_2$—), propynyl (HC≡C—CH$_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirooxazines, of the general formula

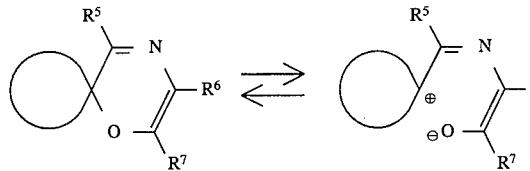

wherein R$^5$, R$^6$, and R$^7$ each, independently of the others, can be (but are not limited to) hydrogen, alkyl, including cyclic alkyl groups, such as cyclopropyl, cyclohexyl, and the like, and including unsaturated alkyl groups, such as vinyl (H$_2$C=CH—), allyl (H$_2$C=CH—CH$_2$—), propynyl (HC≡C—CH$_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Also suitable are spirothiopyrans, of the general formula

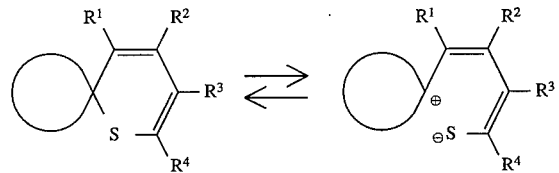

wherein R$^1$, R$^2$, R$^3$, and R$^4$ each, independently of the others, can be (but are not limited to) hydrogen, alkyl, including cyclic alkyl groups, such as cyclopropyl, cyclohexyl, and the like, and including unsaturated alkyl groups, such as vinyl (H$_2$C=CH—), allyl (H$_2$C=CH—CH$_2$—), propynyl (HC≡C—CH$_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 30 carbon atoms and more preferably with from about 5 to about 20 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Examples of spiropyrans include spiro[2H-1-benzopyran-2,2'-indolines], including those of the general formula

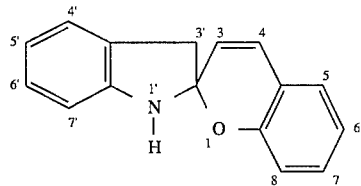

wherein substituents can be present on one or more of the 1', 3', 4', 5', 6', 7', 3, 4, 5, 6, 7, and 8 positions, spiroindolinon-aphthopyrans, including those of the general formula

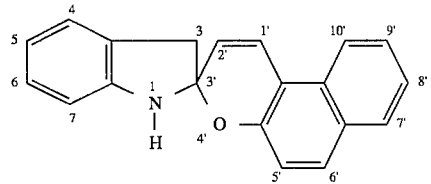

wherein substituents can be present on one or more of the 1, 3, 4, 5, 6, 7, 1', 2', 5', 6', 7', 8', 9', or 10' positions, spiro[2H-1-benzopyran- 2,2'benzothiazolines], including those of the general formula

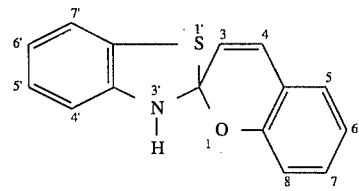

wherein substituents can be present on one or more of the 1', 3', 4', 5', 6', 7', 3, 4, 5, 6, 7, and 8 positions, spiro[2H-1-benzopyran-2,2'-benzoxazolines], including those of the general formula

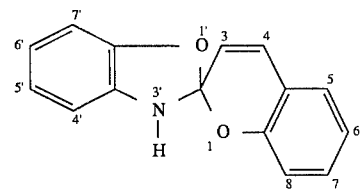

wherein substituents can be present on one or more of the 1', 3', 4', 5', 6', 7', 3, 4, 5, 6, 7, and 8 positions, spiropyranopyrans, including those of the general formula

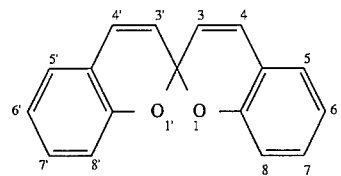

wherein substituents can be present on one or more of the 3, 4, 5, 6, 7, 8, 3', 4', 5', 6', 7', and 8' positions, aza-spiroindolinopyrans, including those of the general formula

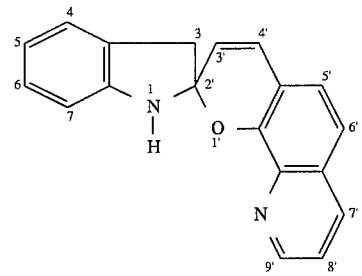

wherein substituents can be present on one or more of the 3, 4, 5, 6, 7, 3', 4', 5', 6', 7', 8', and 9' positions, spiro(quinolinopyrans), including those of the general formula

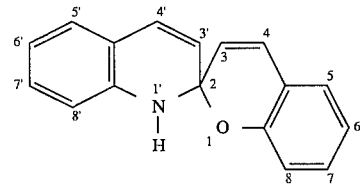

wherein substituents can be present on one or more of the 3, 4, 5, 6, 7, 8, 3', 4', 5', 6', 7', and 8' positions, spiro(pyridino pyrans), including those of the general formula

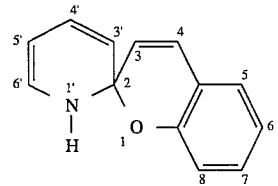

wherein substituents can be present on one or more of the 3, 4, 5, 6, 7, 8, 3', 4', 5', and 6' positions, and the like.

Examples of spirooxazines include spiro[indoline-2,3'-[3H]-naphtho[2,1-b]-1,4-oxazines], including those of the general formula

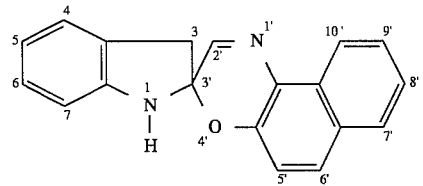

wherein substituents can be present on one or more of the 1, 3, 4, 5, 6, 7, 1', 2', 5', 6', 7', 8', 9', or 10' positions, spiro[2H-1,4-benzoxazine-2,2'-indolines], including those of the general formula

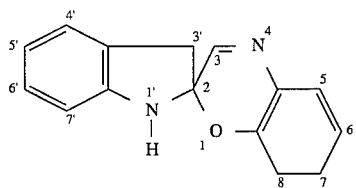

wherein substituents can be present on one or more of the 3, 5, 6, 7, 8, 1', 3', 4', 5', 6', and 7' positions, and the like.

Examples of spirothiopyrans include spiro[2H-1-benzothiopyran- 2,2'-indolines], including those of the general formula

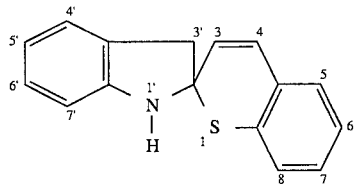

wherein substituents can be present on one or more of the 1', 3', 4', 5', 6', 7', 3, 4, 5, 6, 7, and 8 positions, and the like.

In all of the above examples of spiropyrans, spirooxazines, and spirothiopyrans, examples of substituents include (but are not limited to) alkyl, including cyclic alkyl groups, such as cyclopropyl, cyclohexyl, and the like, and including unsaturated alkyl groups, such as vinyl ($H_2C$=CH—), allyl ($H_2C$=CH—$CH_2$—), propynyl (HC≡C—$CH_2$—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like.

Further, two or more substituents can be joined together to form a ring.

Substituents on the left ring of the spiropyrans, spirooxazines, and spirothiopyrans (represented by the loop in the generic structural formulae of these materials) can be adjusted to affect the color of the open form of the material. Substituents on the central moiety of the spiropyrans, spirooxazines, and spirothiopyrans or on alkyl or aryl groups attached thereto also affect the color of the open form of the material, although to a lesser degree than substituents on the left ring. Further, when the left ring contains a nitrogen atom, this atom or other atoms can be substituted to affect the solubility of the compound in various liquids and resins. For example, long chain hydrocarbons, such as those with 16 or 18 carbon atoms, can increase solubility in hydrocarbons. Sulfonate and carboxylate groups, for example, can enhance water solubility.

Specific examples of spiropyrans, spirooxazines, and spirothiopyrans include spiro[2H-1-benzopyran-2,2'-indoline]; 8-acetoxymercuri- 6-nitro-1',3',3'-trimethylspiro[2H-1-benzopyran-2,2'-indoline]; 6-acetyl-1',3'3'-trimethylspiro [2H-1-benzopyran-2,2'-indoline]; 8-allyl- 5'-chloro-6-nitro-1',3',3'-trimethylspiro[2H-1-benzopyran-2,2'-indoline]; 8-allyl-3',3'-dimethyl-6'-nitro-1'-phenylspiro[2H-1-benzopyran- 2,2'-indoline]; 8-allyl-6-nitro-1',3,3',3'-tetramethylspiro[2H-1-benzopyran- 2,2'-indoline]; 8-allyl-6-nitro-1',3',3'-trimethylspiro[2H-1-benzopyran- 2,2'indoline]; 8-allyl-1',3',3'-trimethylspiro[2H-1-benzopyran-2,2'-indoline]; 5'-amino- 5,7-dichloro-6-nitro-1',3',3'-trimethylspiro[2H-1-benzopyran-2,2'-indoline]; 6-amino-7-hydroxy-1',3',3'-trimethylspiro[2H-1-benzopyran-2,2'-indoline]; 5'-amino-8-methoxy-6-nitro-1',3',3'-trimethylspiro[2H-1-benzopyran-2,2'-indoline]; 5-amino-8-methoxy-1',3',3'-trimethylspiro [2H- 1-benzopyran-2,2'-indoline]; 5'-amino-8-methoxy-1', 3',3'-trimethylspiro[ 2H-1-benzopyran-2,2'-indoline]; 5'-amino-6-nitro-1',3',3'-trimethylspiro[2H-1-benzopyran-2, 2'-indoline]; 5'-amino-1',3',3'-trimethylspiro[2H-1-benzopyran-2,2'-indoline]; 6-amino-1',3',3'-trimethylspiro[2H-1-benzopyran-2,2'-indoline]; 8-amino-1',3',3'-trimethylspiro [2H-1-benzopyran-2,2'-indoline]; 1'-amyl-5-bromo-3',3'-dimethyl- 8-methoxy-6-nitrospiro[2H-1-benzopyran-2,2'-indoline]; 1'-amyl- 3',3'-dimethyl-8-methoxyspiro[2H-1-benzopyran-2,2'-indoline]; 1'-amyl- 3,3-dimethyl-6-methoxy-8-nitrospiro[2H-1-benzopyran-2,2'-indoline]; 1'-amyl- 3',3-dimethyl-5',6-dinitro-8-methoxyspiro[2H-1-benzopyran-2,2'-indoline]; 1'-amyl-3',3-dimethyl-8-methoxy-5,5',6-trinitrospiro[2H-1-benzopyran- 2,2'-indoline]; 1'-amyl-3,3'-dimethyl-6-nitrospiro[2H-1-benzopyran-2,2'-indoline]; 6-bromo-1'-butyl-3',3'-dimethylspiro[2H-1-benzopyran- 2,2'-indoline]; 8-bromo-1'-butyl-3',3'-dimethyl-6-nitrospiro[2H-1-benzopyran-2,2'-indoline; 8-bromo-5'-chloro-5,7-dimethoxy- 6-nitro-1',3',3'-trimethylspiro[2H-1-benzopyran-2,2'-indoline]; 8-bromo-5'-chloro-7-hydroxy-1', 3',3'-trimethylspiro[2H-1-benzopyran- 2,2'-indoline]; 5-bromo-5'-chloro-8-methoxy-1',3',3'-trimethylspiro[2H-1-benzopyran-2,2'-indoline]; 6-bromo-5'-chloro-8-methoxy-1',3',3'-trimethylspiro[2H-1-benzopyran-2,2'-indoline]; 5-bromo-6'-chloro-8-methoxy- 6-nitro-1',3',3',7'-tetramethylspiro[2H-1-benzopyran-2,2'-indoline]; 5-bromo-5'-chloro-6-methoxy-8-nitro-1',3',3'-trimethylspiro[2H- 1-benzopyran-2,2'-indoline]; 5-bromo-5'-chloro-8-methoxy-6-nitro- 1',3',3'-trimethylspiro[2H-1-benzopyran-2,2'-indoline]; 5-bromo-7'-chloro- 8-methoxy-6-nitro-1',3',3'-trimethylspiro[2H-1-benzopyran-2,2'-indoline]; 6-bromo-5'-chloro-8-nitro-1',3',3'-trimethylspiro[2H-1-benzopyran-2, 2'-indoline]; 8-bromo-5'-chloro-6-nitro-1',3',3'-trimethylspiro[2H-1-benzopyran- 2,2'-indoline]; 5-bromo-4',6'- dichloro-8-methoxy-6-nitro- 1',3',3'-trimethylspiro[2H-1-benzopyran-2,2'-indoline]; 5-bromo-4',7'-dichloro-8-methoxy-6-nitro-1',3',3'-trimethylspiro[2H-1-benzopyran-2,2'-indoline]; 5-bromo-5',7'-dichloro-8-methoxy-6-nitro-1',3',3'-trimethylspiro[2H-1-benzopyran-2,2'-indoline]; 6-bromo-5'-chloro-1',3',3'-trimethylspiro[2H-1-benzopyran-2,2'-indoline]; 5-bromo-3',3'-diethyl-8-methoxy- 1'-methyl-6-nitrospiro[2H-1-benzopyran-2,2'-indoline]; 5-bromo-5',8-dimethoxy-6-nitro-1',3',3'-trimethylspiro[2H-1-benzopyran-2,2'-indoline]; 5-bromo-7',8-dimethoxy-6-nitro-1',3',3'-trimethylspiro[2H-1-benzopyran- 2,2'-indoline]; 6-bromo-5',8-dimethoxy-1',3',3'-trimethylspiro[2H-1-benzopyran-2,2'-indoline]; 6-bromo-3',3'-dimethyl-1'-ethylspiro[2H-1-benzopyran-2,2'-indoline]; 6-bromo-3',3'-dimethyl-1'-ethyl- 8-methoxyspiro[2H-1-benzopyran-2,2'-indoline]; 5-bromo-1',3'-dimethyl- 3'-ethyl-6-methoxy-8-nitrospiro[2H-1-benzopyran-2,2'-indoline]; 5-bromo-1',3'-dimethyl-3'-ethyl-8-methoxy-6-nitrospiro[2H-1-benzopyran- 2,2'-indoline]; 8-bromo-3',3'-dimethyl-1'-ethyl-6-nitrospiro[2H-1-benzopyran- 2,2'-indoline]; 5-bromo-3',3'-dimethyl-1'-isoamyl-8-methoxy- 6-nitrospiro[2H-1-benzopyran-2,2'-indoline]; 5-bromo-1',3'-dimethyl-6-methoxy- 8-nitro-3'-phenylspiro[2H-1-benzopyran-2,2'-indoline]; 5-bromo- 1',3'-dimethyl-8-methoxy-6-nitro-3'-phenylspiro[2H-1-benzopyran-2,2'-indoline]; 5-bromo-3',3'-dimethyl-6-methoxy-8-nitro-1'-phenylspiro[2H-1-benzopyran- 2,2'-indoline]; 5-bromo-3',3'-dimethyl-8-methoxy-6-nitro-1'-phenylspiro[2H-1-benzopyran-2,2'-indoline]; 8-bromo-3',3'-dimethyl-6-nitro- 1'-propylspiro[2H-1-benzopyran-2,2'-indoline]; 6-bromo-3',3'-dimethyl-1'-propylspiro[2H-1-benzopyran-2,2'-indoline]; 5-bromo-1'-dimethylamino- 8-methoxy-3'-methyl-6-nitro-3'-phenylspiro[2H-1-benzopyran- 2,2'-indoline]; 5-bromo-5',6-dinitro-8-methoxy-1',3',3'-trimethylspiro[2H-1-benzopyran-2,2'-indoline]; 5-bromo-3',3'-diphenyl-8-methoxy- 1'-methyl-6-nitrospiro[2H-1-benzopyran-2,2'-indoline]; 5-bromo-4',6'-diphenyl-8-methoxy-6-nitro-1',3',3'-trimethylspiro[2H-1-benzopyran- 2,2'-indoline]; 5-bromo-4'-fluoro-8-methoxy-6-nitro-1',3',3'-trimethylspiro[2H-1-benzopyran-2,2'-indoline]; 5-bromo-5'-fluoro-8-methoxy- 6-nitro-1',3',3'-trimethylspiro[2H-1-benzopyran-2,2'-indoline]; 8-bromo-7-hydroxy-1',3',3'-trimethylspiro[2H-1-benzopyran-2,2'-indoline]; 5-bromo-8-methoxy-6-nitro-1',3',3',4',7'-pentamethylspiro[2H-1-benzopyran- 2,2'-indoline]; 5-bromo-8-methoxy-6-nitro-1',3',3',5',7'-pentamethylspiro[2H-1-benzopyran-2,2'-indoline]; 5-bromo-6-methoxy-8-nitro-5'-phenyl-1',3',3'-trimethylspiro[2H-1-benzopyran-2,2'-indoline]; 5-bromo- 6-methoxy-8-nitro-7'-phenyl-1',3',3'-trimethylspiro[2H-1-benzopyran- 2,2'-indoline]; 5-bromo-8-methoxy-6-nitro-5'-phenyl-1',3',3'-trimethylspiro[2H-1-benzopyran-2,2'-indoline]; 5-bromo-8-methoxy-6-nitro-7'-phenyl-1',3',3'-trimethylspiro[2H-1-benzopyran-2,2'-indoline]; 5-bromo- 8-methoxy-6-nitro-1',3,3',3'-tetramethylspiro[2H-1-benzopyran- 2,2'-indoline]; 5-bromo-8-methoxy-6-nitro-1',3',3',5'-tetramethylspiro[2H- 1-benzopyran-2,2'-indoline]; 5-bromo-8-methoxy-6-nitro-1',3',3',6'-tetramethylspiro[2H-1-benzopyran-2,2'-indoline]; 5-bromo-8-methoxy-6-nitro- 1',3',3',7'-tetramethylspiro[2H-1-benzopyran-2,2'-indoline]; 5-bromo- 6-methoxy-8-nitro-1',3',3'-trimethylspiro[2H-1-benzopyran-2,2'-indoline]; 5'-bromo-6-methoxy-8-nitro-1',3',3'-trimethylspiro[2H-1-benzopyran- 2,2'-indoline]; 5-bromo-8-methoxy-6-nitro-1',3',3'-trimethylspiro[2H-1-benzopyran- 2,2'-indoline]; 5'-bromo-8-methoxy-6-nitro-1',3',3'-trimethylspiro[2H-1-benzopyran- 2,2'-indoline]; 6-bromo-8-methoxy-5-nitro-1',3',3'-trimethylspiro[2H-1-benzopyran-2,2'-indoline]; 5-bromo-8-methoxy- 6-nitro-1',3',3'-trimethyl-4',6',7'-triphenylspiro[2H-1-benzopyran- 2,2'-indoline]; 5-bromo-8-methoxy-1',3',3'-trimethylspiro[2H-1-benzopyran- 2,2'-indoline]; 6-bromo-5'-methoxy-1',3',3'-trimethylspiro[2H-1-benzopyran-2,2'-indoline]; 6-bromo-8-methoxy-1',3',3'-trimethylspiro[2H-1-benzopyran-2,2'-indoline]; 6-bromo-8-nitro-1',3,3',3'-tetramethylspiro[2H-1-benzopyran-2,2'-indoline]; 8-bromo-6-nitro- 1',3,3',3'-tetramethylspiro[2H-1-benzopyran-2,2'-indoline]; 5-bromo-6-nitro- 4',6',8-trimethoxy-1',3',3'-trimethylspiro[2H-1-benzopyran-2,2'-indoline]; 5-bromo-6-nitro-4',7',8-trimethoxy-1',3',3'-trimethylspiro[2H-1-benzopyran- 2,2'-indoline]; 5-bromo-6-nitro-1',3',3'-trimethylspiro[2H-1-benzopyran- 2,2'-indoline]; 5'-bromo-6-nitro-1',3',3'-trimethylspiro[2H-1-benzopyran- 2,2'-indoline]; 6-bromo-8-nitro-1',3',3'-trimethylspiro[2H-1-benzopyran- 2,2'-indoline]; 8-bromo-6-nitro-1',3',3'-trimethylspiro[2H-1-benzopyran- 2,2'-indoline]; 6-bromo-5'-nitro-1',3',3'-trimethylspiro[2H-1-benzopyran- 2,2'-indoline]; 6-bromo-1',3',3'-trimethylspiro[2H-1-benzopyran- 2,2'-indoline]; 1'-butyl-6-chloro-3',3'-dimethyl-8-methoxyspiro[2H-1-benzopyran-2,2'-indoline]; 1'-butyl-3',3'-dimethylspiro[2H-1-benzopyran-2,2'-indoline]; 1'-butyl-3',3'-dimethyl-6,8-dinitrospiro[2H-1-benzopyran-2,2'-indoline]; 1'-butyl-3',3'-dimethyl-8-methoxyspiro[2H-1-benzopyran-2,2'-indoline]; 8-carbomethoxy-5'-chloro- 1',3',3'-trimethylspiro[2H-1-benzopyran-2,2'-indoline]; 5'-carbomethoxy-6-nitro- 1',3',3'-trimethylspiro[2H-1-benzopyran-2,2'-indoline]; 8-carbomethoxy- 6-nitro-1',3',3'-trimethylspiro[2H-1-benzopyran-2,2'-indoline]; 6-carbomethoxy-1',3',3'-trimethylspiro[2H-1-benzopyran-2,2'-indoline]; 8-carbomethoxy-1',3',3'-trimethylspiro[2H-1-benzopyran-2,2'-indoline]; 6-carboxy-8-methoxy-1',3',3'-trimethylspiro[2H-1-benzopyran- 2,2'-indoline]; 5'-carboxy-6-nitro-1',3',3'-trimethylspiro[2H-1-benzopyran- 2,2'-indoline]; 6-carboxy-1',3',3'-trimethylspiro[2H-1-benzopyran-2,2'-indoline]; 7-carboxy-1',3',3'-trimethylspiro[2H-1-benzopyran-2,2'-indoline]; 8-carboxy-1',3',3'-trimethylspiro[2H-1-benzopyran-2,2'-indoline]; 5'-chloro-6,8-dibromo-1',3',3'-trimethylspiro[2H-1-benzopyran-2,2'-indoline]; 6'-chloro-5,7-dimethoxy-6-nitro-1',3',3',7'-tetramethylspiro[2H-1-benzopyran- 2,2'-indoline]; 5'-chloro-5,7-dimethoxy-6-nitro-1',3',3'-trimethylspiro[2H-1-benzopyran-2,2'-indoline]; 5'-chloro-7,8-dimethoxy-6-nitro- 1',3',3'-trimethylspiro[2H-1-benzopyran-2,2'-indoline]; 7'-chloro-5,7-dimethoxy- 6-nitro-1',3',3'-trimethylspiro[2H-1-benzopyran-2,2'-indoline]; 5'-chloro-5,7-dimethoxy-1',3',3'-trimethylspiro[2H-1-benzopyran-2,2'-indoline]; 6-chloro-5',8-dimethoxy-1',3',3'-trimethylspiro[2H-1-benzopyran-2,2'-indoline]; 6-chloro-7',8-dimethoxy-1',3',3'-trimethylspiro[2H-1-benzopyran-2,2'-indoline]; 6-chloro-3',3'-dimethyl-1'-ethyl- 8-methoxyspiro[2H-1-benzopyran-2,2'-indoline]; 5-chloro-1',3'-dimethyl- 8-methoxy-6-nitro-3'-phenylspiro[2H-1-benzopyran-2,2'-indoline]; 6-chloro-3',3'-dimethyl-8-methoxy-1'-phenylspiro[2H-1-benzopyran- 2,2'-indoline]; 6-chloro-3',3'-dimethyl-8-nitro-1'-phenylspiro[2H-1-benzopyran-2,2'-indoline]; 5'-chloro-5,6-dinitro-8-methoxy- 1',3',3'-trimethylspiro[2H-1-benzopyran-2,2'-indoline]; 5'-chloro- 6,6'-dinitro-8-methoxy-1',3',3'-trimethylspiro[2H-1-benzopyran-2,2'-indoline]; 5'-chloro-6,8-dinitro-7-methoxy-1',3',3'-trimethylspiro[2H-1-benzopyran- 2,2'-indoline]; 7'-chloro-5,6-dinitro-8-methoxy-1',3',3'-trimethylspiro[2H-1-benzopyran-2,2'-indoline]; 5'-chloro-6,6'-dinitro- 1',3',3'-trimethylspiro[2H-1-benzopyran-2,2'-indoline]; 5'-chloro-6,8-dinitro- 1',3',3'-trimethylspiro[2H-1-benzopyran-2,2'-indoline]; 6-chloro-5',8-dinitro-1',3',3'-trimethylspiro[2H-1-benzopyran-2,2'-indoline]; 5'-chloro- 7-ethoxy-6-nitro-1',3',3'-trimethylspiro[2H-1-benzopyran-2,2'-indoline]; 5-chloro-8-ethoxy-6-nitro-1',3',3'-trimethylspiro[2H-1-benzopyran- 2,2'-indoline]; 5'-chloro-8-ethoxy-6-nitro-1',3',3'-trimethylspiro[2H-1-benzopyran-2,2'-indoline]; 5'-chloro-8-ethoxy-1',3',3'-trimethylspiro[2H-1-benzopyran-2,2'-indoline]; 6-chloro-8-ethoxy-1',3',3'-trimethylspiro[2H-1-benzopyran-2,2'-indoline]; 5'-chloro-8-fluoro-6-nitro- 1',3',3'-trimethylspiro[2H-1-benzopyran-2,2'-indoline]; 5'-chloro-8-fluoro- 1',3',3'-trimethylspiro[2H-1-benzopyran-2,2'-indoline]; 5'-chloro-6-formyl-1',3',3'-trimethylspiro[2H-1-benzopyran-2,2'-indoline]; 5'-chloro-6-hydroxy- 8-methoxy-1',3',3'-trimethylspiro[2H-1-benzopyran-2,2'-indoline]; 5'-chloro- 6-iodo-8-nitro-1',3',3'-trimethylspiro[2H-1-benzopyran-2,2'-indoline]; 5'-chloro-8-iodo-6-nitro-1',3',3'-trimethylspiro[2H-1-benzopyran- 2,2'-indoline]; 5'-chloro-7-methoxy-6-nitro-1',3',3',5-tetramethylspiro[2H- 1-benzopyran-2,2'-indoline]; 5-chloro-8-methoxy-6-nitro-1',3',3'-trimethylspiro[2H-1-benzopyran-2,2'-indoline]; 5'-chloro-6-methoxy-8-nitro-1',3',3'-trimethylspiro[2H-1-benzopyran-2,2'-indoline]; 5'-chloro-7-methoxy- 6-nitro-1',3',3'-trimethylspiro[2H-1-benzopyran-2,2'-indoline]; 5'-chloro- 8-methoxy-5-nitro-1',3',3'-trimethylspiro[2H-1-benzopyran-2,2'-indoline]; 5'-chloro-8-methoxy-6-nitro-1',3',3'-trimethylspiro[2H-1-benzopyran- 2,2'-indoline]; 6-chloro-5'-methoxy-8-nitro-1',3',3'-trimethylspiro[2H-1-benzopyran-2,2'-indoline]; 7'-chloro-6-methoxy-8-nitro- 1',3',3'-trimethylspiro[2H-1-benzopyran-2,2'-indoline]; 7'-chloro-8-methoxy- 6-nitro-1',3',3'-trimethylspiro[2H-1-benzopyran-2,2'-indoline]; 5'-chloro- 6-methoxy-1',3',3'-trimethylspiro[2H-1-benzopyran-2,2'-indoline]; 5-chloro-8-methoxy-1',3',3'-trimethylspiro[2H-1-benzopyran-2,2'-indoline]; 5'-chloro-8-methoxy-1',3',3'-trimethylspiro[2H-1-benzopyran-2,2'-indoline]; 6-chloro-5'-methoxy-1',3',3'-trimethylspiro[2H-1-benzopyran- 2,2'-indoline]; 6-chloro-8-methoxy-1',3',3'-trimethylspiro[2H-1-benzopyran- 2,2'-indoline]; 7-chloro-7'-methoxy-1',3',3'-trimethylspiro[2H- 1benzopyran-2,2'-indoline]; 5'-chloro-8-methoxy-1',3',3'-trimethyl-5,6,6'-trinitrospiro[2H-1-benzopyran-2,2'-indoline]; 5'-chloro-6-nitro-1',3',3',5,7-pentamethylspiro[2H-1-benzopyran-2,2'-indoline]; 5'-chloro-6-nitro- 1',3',3',5,8-pentamethylspiro[2H-1-benzopyran-2,2'-indoline]; 6-chloro-8-nitro- 1',3',3',5,7-pentamethylspiro[2H-1-benzopyran-2,2'-indoline]; 7-chloro-6-nitro-1',3,3',3'-tetramethylspiro[2H-1-benzopyran-2,2'-indoline]; 4'-chloro-6-nitro-1',3',3'-trimethylspiro[2H-1-benzopyran-2,2'-indoline]; 5-chloro-6-nitro-1',3',3'-trimethylspiro[2H-1-benzopyran-2,2'-indoline]; 5'-chloro-6-nitro-1',3',3'-trimethylspiro[2H-1-benzopyran-2,2'-indoline]; 5'chloro-8-nitro-1',3',3'-trimethylspiro[2H-1-benzopyran-2,2'-indoline]; 6'-chloro-6-nitro-1',3',3'-trimethylspiro[2H-1-benzopyran-2,2'-indoline]; 6-chloro-8-nitro-1',3',3'-trimethylspiro[2H-1-benzopyran-2,2'-indoline]; 7-chloro- 6-nitro-1',3',3'-trimethylspiro[2H-1-benzopyran-2,2'-indoline]; 7'-chloro- 6-nitro-1',3',3'-trimethylspiro[2H-1-benzopyran-2,2'-indoline]; 7-chloro- 8-nitro-1',3',3'-trimethylspiro[2H-1-benzopyran-2,2'-indoline]; 8-chloro- 6-nitro-1',3',3'-trimethylspiro[2H-1-benzopyran-2,2'-indoline]; 5'-chloro- 6-(β-nitrovinyl)-1',3',3'-trimethylspiro[2H-1-benzopyran-2,2'-indoline]; 5'-chloro-1',3',3',5,7-pentamethylspiro[2H-1-benzopyran-2,2'-indoline]; 6-chloro-4',7,8-trimethoxy-1',3',3'-trimethylspiro[2H-1-benzopyran-2,2'-indoline[; 5-chloro-1',3',3'-trimethylspiro[2H-1-benzopyran- 2,2'-indoline]; 5'-chloro-1',3',3'-trimethylspiro[2H-1-benzopyran-2,2'-indoline]; 6-chloro-1',3',3'-trimethylspiro[2H-1-benzopyran-2,2'-indoline]; 7-chloro-1',3',3'-trimethylspiro[2H-1-benzopyran- 2,2'-indoline]; 8-chloro-1',3',3'-trimethylspiro[2H-1-benzopyran- 2,2'-indoline]; 6-cyano-1',3',3'-trimethylspiro[2H-1-benzopyran- 2,2'-indoline]; 6,8-diallyl-1',3',3'-trimethylspiro[2H-1-benzopyran- 2,2'-indoline]; 5,6-dibromo-8-methoxy-1',3',3'-trimethylspiro[2H-1-benzopyran- 2,2'-indoline]; 6,8-dibromo-5'-methoxy- 1',3',3'-trimethylspiro[2H-1-benzopyran-2,2'-indoline]; 6,8-dibromo-5-nitro- 1',3',3'-trimethylspiro[2H-1-benzopyran-2,2'-indoline]; 6,8-dibromo- 1',3',3'-trimethylspiro[2H-1-benzopyran-2,2'-indoline]; 4',7'-dichloro- 5,7-dimethoxy-6-nitro-1',3',3'-trimethylspiro[2H-1-benzopyran-2,2'-indoline]; 5',8-dichloro-5,7-dimethoxy-6-nitro-1',3',3'-trimethylspiro[2H-1-benzopyran- 2,2'-indoline]; 5,6-dichloro-3',3'-dimethyl-8-ethoxy-1'-phenylspiro[2H-1-benzopyran-2,2'-indoline]; 5,7-dichloro-1',3'-dimethyl-6-nitro- 3'-phenylspiro[2H-1-benzopyran-2,2'-indoline]; 5,7-dichloro-3',3'-dimethyl- 6-nitro-1'-phenylspiro[2H-1-benzopyran-2,2'-indoline]; 4',7'-dichloro- 5,6-dinitro-8-methoxy-1',3',3'-trimethylspiro[2H-1-benzopyran- 2,2'-indoline]; 4',7'-dichloro-7,8-dinitro-6-methoxy-1',3',3'-trimethylspiro[2H-1-benzopyran-2,2'-indoline]; 5,7-dichloro-5',6-dinitro- 1',3',3'-trimethylspiro[2H-1-benzopyran-2,2'-indoline]; 5,7-dichloro-4',6'-diphenyl- 6-nitro-1',3',3'-trimethylspiro[2H-1-benzopyran-2,2'-indoline]; 5,6-dichloro-8-ethoxy-1',3',3'-trimethylspiro[2H-1-benzopyran-2,2'-indoline]; 4',7'-dichloro-8-methoxy-6-nitro-1',3',3'-trimethylspiro[2H-1-benzopyran- 2,2'-indoline]; 5,7-dichloro-5'-methoxy-6-nitro-1',3',3'-trimethylspiro[2H-1-benzopyran-2,2'-indoline]; 5,7-dichloro-7'-methoxy-6-nitro- 1',3',3'-trimethylspiro[2H-1-benzopyran-2,2'-indoline]; 4',7'-dichloro- 8-methoxy-1',3',3'-trimethylspiro[2H-1-benzopyran-2,2'-indoline]; 5,6-dichloro- 8-methoxy-1',3',3'-trimethylspiro[2H-1-benzopyran-2,2'-indoline]; 5',6-dichloro-8-methoxy-1',3',3'-trimethylspiro[2H-1-benzopyran-2,2'-indoline]; 6,7'-dichloro-8-methoxy-1',3',3'-trimethylspiro [2H-1-benzopyran- 2,2'-indoline]; 5,7-dichloro-6-nitro-1',3',3',4',7'-pentamethylspiro[2H-1-benzopyran-2,2'-indoline]; 5,7-dichloro-6-nitro- 1',3',3', 5', 7'-pentamethylspiro[2H-1-benzopyran-2,2'-indoline]; 5,7-dichloro- 6-nitro-7'-phenyl-1',3',3'-trimethylspiro[2H-1-benzopyran-2,2'-indoline]; 5,7-dichloro-6-nitro-4',5',6',7'-tetrafluoro-1',3',3'-trimethylspiro [2H-1-benzopyran-2,2'-indoline]; 4',6'-dichloro-6-nitro-1',3',3'-trimethylspiro[2H-1-benzopyran-2,2'-indoline]; 4',7'-dichloro-6-nitro- 1',3',3'-trimethylspiro[2H-1-benzopyran-2,2'-indoline]; 5,7-dichloro-6-nitro- 1',3',3',5'-tetramethylspiro[2H-1-benzopyran-2,2'-indoline]; 5,5'-dichloro- 6-nitro-1',3',3'-trimethylspiro[2H-1-benzopyran-2,2'-indoline]; 5',6-dichloro-8-nitro-1',3',3'-trimethylspiro[2H-1-benzopyran-2,2'-indoline]; 5,7-dichloro-6-nitro-1',3',3'-trimethylspiro[2H-1-benzopyran-2,2'-indoline]; 5,8-dichloro-6-nitro-1',3',3'-trimethylspiro[2H-1-benzopyran-2,2'-indoline]; 5',7'-dichloro-6-nitro-1',3',3'-trimethylspiro[2H-1-benzopyran- 2,2'-indoline]; 5',8-dichloro-6-nitro-1',3',3'-trimethylspiro[2H-1-benzopyran- 2,2'-indoline]; 6,8-dichloro-5-nitro-1',3',3'-trimethylspiro[2H-1-benzopyran- 2,2'-indoline]; 7,8-dichloro-6-nitro-1',3',3'-trimethylspiro[2H-1-benzopyran- 2,2'-indoline]; 5,7-dichloro-6-nitro-1',3',3'-trimethyl-4',6',7'-triphenylspiro[ 2H-1-benzopyran-2,2'-indoline]; 5',6-dichloro-1',3',3'-trimethylspiro[2H-1-benzopyran-2,2'-indoline]; 5,7-dichloro-1',3',3'-trimethylspiro[2H-1-benzopyran-2,2'-indoline]; 5',7'-dichloro-1',3',3'-trimethylspiro[2H-1-benzopyran-2,2'-indoline]; 6,8-dichloro-1',3',3'-trimethylspiro[2H-1-benzopyran-2,2'-indoline]; 7,8-dichloro-1',3',3'-trimethylspiro[2H-1-benzopyran-2,2'-indoline]; 4',7'-diethoxy-8-methoxy- 1',3',3'-trimethylspiro[2H-1-benzopyran-2,2'-indoline]; 3',3'-diethyl-6-methoxy- 1'-methyl-8-nitrospiro[2H-1-benzopyran-2,2'-indoline]; 3',3'-diethyl- 8-methoxy-1'-methyl-6-nitrospiro[2H-1-benzopyran-2,2'-indoline]; 3',3'-diethyl-1'-methyl-6-nitrospiro[2H-1-benzopyran-2,2'-indoline]; 1',3'-diethyl-3'-methyl-4',7',8'-trimethoxyspiro

[2H-1-benzopyran-2,2'-indoline]; 7-diethylamino-1',3',3'-trimethylspiro[2H-1-benzopyran-2,2'-indoline]; 5,7-dihydroxy- 1',3',3'-trimethylspiro[2H-1-benzopyran-2,2'-indoline]; 6,8-diiodo- 1',3',3'-trimethylspiro[2H-1-benzopyran-2,2'-indoline]; 5',8'-dimethoxy- 3',3'-dimethyl-1'-ethylspiro[2H-1-benzopyran-2,2'-indoline]; 5,7-dimethoxy- 3',3'-dimethyl-5',6-dinitro-1'-isoamylspiro[2H-1-benzopyran-2,2'-indoline]; 5,7-dimethoxy-1',3'-dimethyl-6-nitro-3'-phenylspiro[2H- 1'-benzopyran- 2,2'-indoline]; 5,7-dimethoxy-3',3'-dimethyl-6-nitro-1'-phenylspiro[ 2H-1-benzopyran-2,2'-indoline]; 1',8-dimethoxy-5,6-dinitro-3'-methyl-3'-phenylspiro[2H-1-benzopyran-2,2'-indoline]; 4',7'-dimethoxy- 6,8-dinitro-1',3',3'-trimethylspiro[2H-1-benzopyran-2,2'-indoline]; 5,7-dimethoxy- 6,8-dinitro-1',3',3'-trimethylspiro[2H-1-benzopyran-2,2'-indoline]; 5',8-dimethoxy-5,6-dinitro-1',3',3'-trimethylspiro[2H-1-benzopyran- 2,2'-indoline]; 6',8-dimethoxy-5,6-dinitro-1',3',3'-trimethylspiro[2H-1-benzopyran-2,2'-indoline]; 7',8-dimethoxy-5,6-dinitro- 1',3',3'-trimethylspiro[2H-1-benzopyran-2,2'-indoline]; 4',7'-dimethoxy-8-ethoxy- 1',3',3'-trimethylspiro[2H-1-benzopyran-2,2'-indoline]; 5',7'-dimethoxy- 8-ethoxy-1',3',3'-trimethylspiro[2H-1-benzopyran-2,2'-indoline]; 5,7-dimethoxy-4'-fluoro-6-nitro-1',3',3'-trimethylspiro[2H-1-benzopyran- 2,2'-indoline]; 5,7-dimethoxy-5'-fluoro-6-nitro-1',3',3'-trimethylspiro[2H-1-benzopyran-2,2'-indoline]; 1',8-dimethoxy-3'-methyl-6-nitro-3'-phenylspiro[2H-1-benzopyran-2,2'-indoline]; 5,7-dimethoxy-6-nitro- 7'-phenyl-1',3',3'-trimethylspiro[2H-1-benzopyran-2,2'-indoline]; 4',7'-dimethoxy-6-nitro-1',3',3'-trimethylspiro[2H-1-benzopyran-2,2'-indoline]; 4',7'-dimethoxy-8-nitro-1',3',3'-trimethylspiro[2H-1-benzopyran-2,2'-indoline]; 5',6-dimethoxy-8-nitro-1',3',3'-trimethylspiro[2H-1-benzopyran- 2,2'-indoline]; 5,7-dimethoxy-6-nitro-1',3',3'-trimethylspiro[2H-1-benzopyran-2,2'-indoline]; 5',8-dimethoxy-5-nitro- 1',3',3'-trimethylspiro[2H-1-benzopyran-2,2'-indoline]; 5',8-dimethoxy-6-nitro- 1',3',3'-trimethylspiro[2H-1-benzopyran-2,2'-indoline]; 6,7'-dimethoxy- 8-nitro-1',3',3'-trimethylspiro[2H-1-benzopyran-2,2'-indoline]; 7',8-dimethoxy-5-nitro-1',3',3'-trimethylspiro[2H-1-benzopyran-2,2'-indoline]; 7',8-dimethoxy-6-nitro-1',3',3'-trimethylspiro[2H-1-benzopyran-2,2'-indoline]; 5,7-dimethoxy-6-nitro-1',3',3'-trimethyl-4',6',7'-triphenylspiro[2H-1-benzopyran-2,2'-indoline]; 5,7-dimethoxy-1',3',3'-trimethylspiro[2H-1-benzopyran-2,2'-indoline]; 5',8-dimethoxy-1',3',3'-trimethylspiro[2H-1-benzopyran-2,2'-indoline]; 7',8-dimethoxy-1',3',3'-trimethylspiro[2H-1-benzopyran-2,2'-indoline]; 1',3'-dimethyl-6,8-dinitro- 3'-ethylspiro[2H-1-benzopyran-2,2'-indoline]; 3',3'-dimethyl-6,8-dinitro- 1'-ethylspiro[2H-1-benzopyran-2,2'-indoline]; 3',3'-dimethyl-5,6-dinitro-1'-hexadecyl 8-methoxyspiro[2H-1-benzopyran-2,2'-indoline]; 3',3'-dimethyl- 6,8-dinitro-1'-isoamylspiro[2H-1-benzopyran-2,2'-indoline]; 3',3'-dimethyl- 5,6-dinitro-1'-isoamyl-8-methoxyspiro[2H-1-benzopyran-2,2'-indoline]; 3',3'-dimethyl-6,8-dinitro-1'-isoamyl-7-methoxyspiro[2H-1-benzopyran- 2,2'-indoline]; 1',3'-dimethyl-5,6-dinitro-8-methoxy-3'-phenylspiro[2H-1-benzopyran- 2,2'-indoline]; 1',3'-dimethyl-5',6-dinitro-8-methoxy-3'-phenylspiro[2H-1-benzopyran-2,2'-indoline]; 3,3'-dimethyl-5,6-dinitro-8-methoxy- 1'-phenylspiro[2H-1-benzopyran-2,2'-indoline]; 3,3'-dimethyl-6,8-dinitro- 7-methoxy-1'-phenylspiro[2H-1-benzopyran-2,2'-indoline]; 3',3'-dimethyl- 7,8-dinitro-6-methoxy-1'-phenylspiro[2H-1-benzopyran-2,2'-indoline]; 1',3'-dimethyl-6,8-dinitro-3'-phenylspiro[2H-1-benzopyran-2,2'-indoline]; 3',3'-dimethyl-6,8-dinitro-1'-phenylspiro[2H-1-benzopyran-2,2'-indoline]; 3',3'-dimethyl-6,8-dinitro-1'-propylspiro[2H-1-benzopyran-2,2'-indoline]; 1',3'-dimethyl-3',7'-diphenyl-8-methoxy-6-nitrospiro[2H-1-benzopyran- 2,2'-indoline]; 3',3'-dimethyl-8-ethoxy-1'-phenylspiro[2H-1-benzopyran- 2,2'-indoline]; 1',3'-dimethyl-3'-ethylspiro[2H-1-benzopyran- 2,2'-indoline]; 3',3'-dimethyl-1'-ethylspiro[2H-1-benzopyran-2,2'-indoline]; 1',3'-dimethyl-3'-ethyl-8-methoxyspiro[2H-1-benzopyran-2,2'-indoline]; 3',3'-dimethyl-1'-ethyl-8-methoxyspiro[2H-1-benzopyran-2,2'-indoline]; 1',3'-dimethyl-3'-ethyl-6-methoxy-8-nitrospiro[2H-1-benzopyran-2,2'-indoline]; 1',3'-dimethyl-3'-ethyl-8-methoxy-5-nitrospiro [2H-1-benzopyran- 2,2'-indoline]; 1',3'-dimethyl-3'-ethyl-8-methoxy-6-nitrospiro[2H-1-benzopyran- 2,2'-indoline]; 3',3'-dimethyl-1'-ethyl-8-methoxy-6-nitrospiro[2H-1-benzopyran-2,2'-indoline]; 1',3'-dimethyl-3'-ethyl-6-nitrospiro [2H-1-benzopyran-2,2'-indoline]; 3',3'-dimethyl-1'-ethyl-6-nitrospiro[2H-1-benzopyran-2,2'-indoline]; 3',3'-dimethyl-1'-ethyl-8-nitrospiro[2H-1-benzopyran-2,2'-indoline]; 3',3'-dimethyl-1'-hexadecyl-6-nitrospiro[2H-1-benzopyran-2,2'-indoline]; 3',3'-dimethyl-1'-(β-hydroxyethyl)- 6-nitrospiro [2H-1-benzopyran-2,2'-indoline]; 3,3'-dimethyl- 1'-isoamyl-8-methoxy-5,5',6-trinitrospiro[2H-1-benzopyran-2,2'-indoline]; 3',3'-dimethyl-1'-isoamyl-6-nitrospiro[2H-1-benzopyran-2,2'-indoline]; 3',3'-dimethyl-1'-isoamyl-5',6,8-trinitrospiro[2H-1-benzopyran-2,2'-indoline]; 3',3'-dimethyl-1'-isopropyl-8-methoxy-6-nitrospiro[2H-1-benzopyran- 2,2'-indoline]; 1',3'-dimethyl-6-methoxy-8-nitro-3'-phenylspiro[2H-1-benzopyran-2,2'-indoline]; 1',3'-dimethyl-8-methoxy-6-nitro- 3'-phenylspiro[2H-1-benzopyran-2,2'-indoline]; 3',3'-dimethyl-6-methoxy-8-nitro-1'-phenylspiro[2H-1-benzopyran-2,2'-indoline]; 3',3'-dimethyl- 7-methoxy-6-nitro-1'-phenylspiro[2H-1-benzopyran-2,2'-indoline]; 3',3'-dimethyl-8-methoxy-5-nitro-1'-phenylspiro[2H-1-benzopyran- 2,2'-indoline]; 3',3'-dimethyl-8-methoxy-6-nitro-1'-phenylspiro[2H-1-benzopyran-2,2'-indoline]; 3',3'-dimethyl-8-methoxy-6-nitro-1'-propylspiro[2H-1-benzopyran-2,2'-indoline]; 1',3'-dimethyl-8-methoxy- 3'-phenylspiro[2H-1-benzopyran-2,2'-indoline]; 3',3'-dimethyl-8-methoxy- 1'-phenylspiro[2H-1-benzopyran-2,2'-indoline]; 3',3'-dimethyl-8-methoxy-1'-propylspiro[2H-1-benzopyran-2,2'-indoline]; 1',3'-dimethyl-6-nitro- 3'-phenylspiro[2H-1-benzopyran-2,2'-indoline]; 1',3'-dimethyl-8-nitro- 3'-phenylspiro[2H-1-benzopyran-2,2'-indoline]; 3',3'-dimethyl-6-nitro- 1'-phenylspiro[2H-1-benzopyran-2,2'-indoline]; 3',3'-dimethyl-1'-phenylspiro[2H-1-benzopyran-2,2'-indoline]; 3'3'-dimethyl-1'-propylspiro[2H-1-benzopyran-2,2'-indoline]; 1'-dimethylamino-5,6-dinitro- 8-methoxy-3'-methyl-3'-phenylspiro[2H-1-benzopyran-2,2'-indoline]; 1'-dimethylamino-8-methoxy-3'-methyl-6-nitro-3'-phenylspiro[2H-1-benzopyran- 2,2'-indoline]; 1'-dimethylamino-3'-methyl-6-nitro-3'-phenylspiro[2H-1-benzopyran-2,2'-indoline]; 5,6-dinitro-8-methoxy- 1',3',3',4',7'-pentamethylspiro[2H-1-benzopyran-2,2'-indoline]; 5,6-dinitro- 8-methoxy-7'-phenyl-1',3',3'-trimethylspiro[2H-1-benzopyran-2,2'-indoline]; 5,6-dinitro-8-methoxy-1',3,3',3'-tetramethylspiro [2H-1-benzopyran- 2,2'-indoline]; 5,6-dinitro-8-methoxy-1',3',5'-tetramethylspiro[2H-1-benzopyran-2,2'-indoline]; 5,5'-dinitro-8-methoxy- 1',3',3'-trimethylspiro[2H-1-benzopyran-2,2'-indoline]; 5,6-dinitro-8-methoxy- 1',3',3'-trimethylspiro[2H-1-benzopyran-2,2'-indoline]; 5',8-dinitro-6-methoxy-1',3',3'-trimethylspiro[2H-1-benzopyran-2,2'-indoline]; 6,7'-dinitro-8-methoxy-1',3',3'-trimethylspiro[2H-1-benzopyran-2,2'-indoline]; 6,8-dinitro-5'-methoxy-1',3',3'-trimethylspiro[2H-1-benzopyran- 2,2'-indoline]; 6,8-dinitro-7-methoxy-1',3',3'-trimethylspiro[2H-1-benzopyran-2,2'-indoline]; 5,6-dinitro-8-methoxy-1',3',3'-trimethyl-4',6',7'-triphenylspiro[2H-1-benzopyran-2,2'-indoline]; 6,8- dinitro-5'-phenyl- 1',3',3'-trimethylspiro[2H-1-benzopyran-2,2'-indoline]; 6,8-dinitro- 1',3,3',3'-tetramethylspiro[2H-1-benzopyran-2,2'-indoline]; 6,8-dinitro- 1',3',3',7'-tetramethylspiro[2H-1-benzopyran-2,2'-indoline]; 5',6-dinitro- 1',3',3'-trimethylspiro[2H-1-benzopyran-2,2'-indoline]; 6,8-dinitro- 1',3',3'-trimethylspiro[2H-1-benzopyran-2,2'-indoline]; 4',6'-diphenyl-8-methoxy-6-nitro-1',3',3'-trimethylspiro[2H-1-benzopyran-2,2'-indoline]; 3',3'-diphenyl- 1'-methyl-6-nitrospiro[2H-1-benzopyran-2,2'-indoline]; 4',6'-diphenyl- 6-nitro-1',3',3'-trimethylspiro[2H-1-benzopyran-2,2'-indoline]; 5',7'-diphenyl-6-nitro-1',3',3'-trimethylspiro[2H-1-benzopyran-2,2'-indoline]; 6-ethoxy-8-nitro-1',3',3'-trimethylspiro[2H-1-benzopyran-2,2'-indoline]; 8-ethoxy-6-nitro-1',3',3'-trimethylspiro[2H-1-benzopyran-2,2'-indoline]; 8-ethoxy-1',3',3',4',7'-pentamethylspiro[2H-1-benzopyran-2,2'-indoline]; 8-ethoxy-5'-phenyl-1',3',3'-trimethylspiro[2H-1-benzopyran-2,2'-indoline]; 8-ethoxy-7'-phenyl-1',3',3'-trimethylspiro[2H-1-benzopyran-2,2'-indoline]; 8-ethoxy-1',3',3'-trimethylspiro[2H-1-benzopyran-2,2'-indoline]; 8-ethoxymethyl-6-nitro-1',3',3'-trimethylspiro[2H-1-benzopyran-2,2'-indoline]; 3'-ethyl-8-methoxy-3'-methyl-1'-phenylspiro[2H-1-benzopyran- 2,2'-indoline]; 3'-ethyl-3'-methyl-6-nitro-1'-phenylspiro[2H-1-benzopyran- 2,2'-indoline]; 8-ethyl-6-nitro-1',3',3'-trimethylspiro[2H-1-benzopyran-2,2'-indoline]; 4'-fluoro-8-methoxy-6-nitro-1',3',3'-trimethylspiro[2H-1-benzopyran- 2,2'-indoline]; 5'-fluoro-6-methoxy-8-nitro-1',3',3'-trimethylspiro[2H-1-benzopyran-2,2'-indoline]; 5'-fluoro-8-methoxy-6-nitro-1',3',3'-trimethylspiro[2H-1-benzopyran-2,2'-indoline]; 4'-fluoro-6-nitro- 1',3',3'-trimethylspiro[2H-1-benzopyran-2,2'-indoline]; 5'-fluoro-6-nitro- 1',3',3'-trimethylspiro[2H-1-benzopyran-2,2'-indoline]; 6-fluoro-8-nitro- 1',3',3'-trimethylspiro[2H-1-benzopyran-2,2'-indoline]; 8-fluoro-6-nitro-1',3',3'-trimethylspiro[2H-1-benzopyran-2,2'-indoline]; 7-fluoro- 1',3',3'-trimethylspiro[2H-1-benzopyran-2,2'-indoline]; 8-fluoro- 1',3',3'-trimethylspiro[2H-1-benzopyran-2,2'-indoline]; 8-Formyl-7-hydroxy-1',3',3'-trimethylspiro [2H-1-benzopyran-2,2'-indoline]; 6-formyl-8-methoxy-1',3',3'-trimethylspiro[2H-1-benzopyran-2,2'-indoline]; 6-formyl- 1',3',3'-trimethylspiro[2H-1-benzopyran-2,2'-indoline]; 8-formyl-1',3',3'-trimethylspiro[2H-1-benzopyran-2,2'-indoline]; 1',3',3',5,5',7-hexamethyl- 6-nitrospiro[2H-1-benzopyran-2,2'-indoline]; 1',3',3',5,7,8-hexamethyl-6-nitrospiro[2H-1-benzopyran-2,2'-indoline]; 5'-(β-hydroxyethyl)-8-methoxy- 6-nitro-1',3',3'-trimethylspiro [2H-1-benzopyran-2,2'-indoline]; 5'-(β-hydroxyethyl)-8-methoxy-1',3',3'-trimethylspiro[2H-1-benzopyran-2,2'-indoline]; 5'-(β-hydroxyethyl)-6-nitro-1',3',3'-trimethylspiro [2H-1-benzopyran- 2,2'-indoline]; 5'-(β-Hydroxyethyl)-1',3',3'-trimethylspiro[2H-1-benzopyran- 2,2'-indoline]; 6-hydroxy-8-methoxy-1',3',3'-trimethylspiro[2H- 1-benzopyran-2,2'-indoline]; 7-hydroxy-5'-nitro-1',3',3'-trimethylspiro[2H- 1-benzopyran-2,2'-indoline]; 7-hydroxy-6-nitro-1',3',3'-trimethylspiro[2H- 1-benzopyran- 2,2'-indoline]; 6-hydroxy-1',3',3'-trimethylspiro[2H-1-benzopyran- 2,2'-indoline]; 7-hydroxy-1',3',3'-trimethylspiro[2H-1-benzopyran- 2,2'-indoline]; 8-hydroxy-1',3',3'-trimethylspiro[2H-1-benzopyran- 2,2'-indoline]; 8-hydroxymethyl-6-nitro-1',3',3'-trimethylspiro[2H-1-benzopyran-2,2'-indoline]; 6-iodo-8-nitro-1',3',3'-trimethylspiro[2H-1-benzopyran-2,2'-indoline]; 8-iodo-6-nitro-1',3',3'-trimethylspiro[2H-1-benzopyran-2,2'-indoline]; 1'-methoxy-3'-methyl-6-nitro-3'-phenylspiro[2H-1-benzopyran-2,2'-indoline]; 5'-methoxy-6-nitro- 1',3',3',5,7-pentamethylspiro[2H-1-benzopyran-2,2'-indoline]; 5'-methoxy- 6-nitro-1',3',3',5,8-pentamethylspiro[2H-1-benzopyran-2,2'-indoline]; 7'-methoxy-6-nitro-1',3',3',5,7-pentamethylspiro[2H-1-benzopyran-2,2'-indoline]; 7'-methoxy-6-nitro-1',3',3',5,8-pentamethylspiro [2H-1-benzopyran- 2,2'-indoline]; 6-methoxy-8-nitro-5'-phenyl-1',3',3'-trimethylspiro[2H-1-benzopyran-2,2'-indoline]; 6-methoxy-8-nitro-7'-phenyl- 1',3',3'-trimethylspiro[2H-1-benzopyran-2,2'-indoline]; 7-methoxy-6-nitro-7'-phenyl-1',3',3'-trimethylspiro[2H-1-benzopyran-2,2'-indoline]; 8-methoxy- 5-nitro-5'-phenyl-1',3',3'-trimethylspiro[2H-1-benzopyran-2,2'-indoline]; 8-methoxy-5-nitro-7'-phenyl-1',3',3'-trimethylspiro[2H-1-benzopyran- 2,2'-indoline]; 8-methoxy-6-nitro-3-phenyl-1',3',3'-trimethylspiro[2H -1-benzopyran-2,2'-indoline]; 8-methoxy-6-nitro-5'-phenyl- 1',3',3'-trimethylspiro[2H-1-benzopyran-2,2'-indoline]; 8-methoxy- 6-nitro-7'-phenyl-1',3',3'-trimethylspiro[2H-1-benzopyran-2,2'-indoline]; 6-methoxy- 8-nitro-1',3,3',3'-tetramethylspiro[2H-1-benzopyran-2,2'-indoline]; 6-methoxy-8-nitro-1',3',3',5'-tetramethylspiro[2H-1-benzopyran- 2,2'-indoline]; 6-methoxy-8-nitro-1',3',3',6'-tetramethylspiro[2H-1-benzopyran- 2,2'-indoline]; 6-methoxy-8-nitro-1',3',3',7'-tetramethylspiro [2H-1-benzopyran-2,2'-indoline]; 7-methoxy-6-nitro- 1',3,3',3'-tetramethylspiro[2H-1-benzopyran-2,2'-indoline]; 7-methoxy-6-nitro- 1',3',3'5'-tetramethylspiro[2H-1-benzopyran-2,2'-indoline]; 8-methoxy- 5-nitro-1',3,3',3'-tetramethylspiro[2H-1-benzopyran-2,2'-indoline]; 8-methoxy-5-nitro-1',3',3',6'-tetramethylspiro[2H-1-benzopyran- 2,2'-indoline]; 8-methoxy-5-nitro-1',3',3',7'-tetramethylspiro [2H-1-benzopyran- 2,2'-indoline]; 8-methoxy-6-nitro-1',3,3',3'-tetramethylspiro[2H-1-benzopyran-2,2'-indoline]; 8-methoxy-6-nitro- 1',3',3',4'-tetramethylspiro[2H-1-benzopyran-2,2'-indoline]; 8-methoxy-6-nitro- 1',3',3',5'-tetramethylspiro[2H-1-benzopyran-2,2'-indoline]; 8-methoxy-6-nitro-1',3',3',6'-tetramethylspiro[2H-1-benzopyran-2,2'-indoline]; 8-methoxy-6-nitro-1',3',3',7'-tetramethylspiro[2H-1-benzopyran- 2,2'-indoline]; 8-methoxy-6-nitro-1',3',3'-triethylspiro[2H-1-benzopyran- 2,2'-indoline]; 5'-methoxy-6-nitro-1',3',3'-trimethylspiro[2H-1-benzopyran- 2,2'-indoline]; 5'-methoxy-8-nitro-1',3',3'-trimethylspiro[2H-1-benzopyran- 2,2'-indoline]; 6-methoxy-8-nitro-1',3',3'-trimethylspiro[2H-1-benzopyran- 2,2'-indoline]; 7-methoxy-6-nitro-1',3',3'-trimethylspiro[2H-1-benzopyran-2,2'-indoline]; 7-methoxy-6-nitro-1',3',3'-trimethylspiro[2H-1-benzopyran- 2,2'-indoline]; 7'-methoxy-8-nitro-1',3',3'-trimethylspiro[2H-1-benzopyran- 2,2'-indoline]; 8-methoxy-5-nitro-1',3',3'-trimethylspiro[2H-1-benzopyran- 2,2'-indoline]; 8-methoxy-5'-nitro-1',3',3'-trimethylspiro[2H-1-benzopyran- 2,2'-indoline]; 8-methoxy-6-nitro-1',3',3'-trimethylspiro[2H-1-benzopyran- 2,2'-indoline]; 7-methoxy-6-nitro-1',3',3'-trimethyl-4',6',7'-triphenylspiro [2H-1-benzopyran-2,2'-indoline]; 8-methoxy-6-nitro-1',3',3'-trimethyl- 4',6',7'-triphenylspiro[2H-1-benzopyran-2,2'-indoline]; 8-methoxy- 1',3',3',4',7'-pentamethylspiro[2H-1-benzopyran-2,2'-indoline]; 8-methoxy- 5'-phenyl-1',3',3'-trimethylspiro[2H-1-benzopyran-2,2'-indoline]; 8-methoxy-7'-phenyl-1',3',3'-trimethylspiro[2H-1-benzopyran-2,2'-indoline]; 8-methoxy-1',3,3',3'-tetramethylspiro[2H-1-benzopyran-2,2'-indoline]; 8-methoxy-4',6',7'-trichloro-1',3',3'-trimethylspiro[2H-1-benzopyran- 2,2'-indoline]; 5'-methoxy-1',3',3'-trimethylspiro[2H-1-benzopyran- 2,2'-indoline]; 6-methoxy-1',3',3'-trimethylspiro[2H-1-benzopyran- 2,2'-indoline]; 7-methoxy-1',3',3'-trimethylspiro[2H-1-benzopyran- 2,2'-indoline]; 8-methoxy-1',3',3'-trimethylspiro[2H-1-benzopyran- 2,2'-indoline]; 8-methoxy-1',3',3'-trimethyl-5,5',6-trinitrospiro[2H-1-benzopyran-2,2'-indoline]; 6-nitro-1',3',3',5,7-pentamethylspiro [2H-1-benzopyran-2,2'-indoline]; 6-nitro-1',3',3',5,8-pentamethylspiro[2H-1-benzopyran-2,2'-indoline]; 6-(o- nitrophenylazo)- 1',3',3'-trimethylspiro[2H-1-benzopyran-2, 2'-indoline]; 6-(p-nitrophenylazo)- 1',3',3'-trimethylspiro [2H-1-benzopyran-2,2'-indoline]; 6-nitro- 5'-phenyl-1',3',3'-trimethylspiro[2H-1-benzopyran-2,2'-indoline]; 6-nitro-7'-phenyl-1',3',3'-trimethylspiro[2H-1-benzopyran-2,2'-indoline]; 8-nitro- 5'-phenyl-1',3',3'-trimethylspiro[2H-1-benzopyran-2,2'-indoline]; 8-nitro- 7'-phenyl-1',3',3'-trimethylspiro[2H-1-benzopyran-2,2'-indoline]; 6-nitro-8-piperidinomethyl-1',3',3'-trimethylspiro[2H-1-benzopyran-2,2'-indoline]; 7-nitro-5,5',6,8-tetrachloro-1',3',3'-trimethylspiro[2H-1-benzopyran- 2,2'-indoline]; 6-nitro-4',5',6', 7'-tetrafluoro-1',3',3'-trimethylspiro[2H-1-benzopyran-2,2'-indoline]; 6-nitro-1',3,3',3'-tetramethylspiro[2H-1-benzopyran-2,2'-indoline]; 6-nitro-1',3',3',5'-tetramethylspiro[2H-1-benzopyran-2,2'-indoline]; 6-nitro-1',3',3',6'-tetramethylspiro[2H-1-benzopyran-2,2'-indoline]; 6-nitro-1',3',3',7'-tetramethylspiro[2H-1-benzopyran-2,2'-indoline]; 6-nitro-1',3',3',8-tetramethylspiro[2H-1-benzopyran-2,2'-indoline]; 8-nitro-1',3,3',3'-tetramethylspiro[2H-1-benzopyran-2,2'-indoline]; 8-nitro-1',3',3',6'-tetramethylspiro[2H-1-benzopyran-2,2'-indoline]; 8-nitro-1',3',3',7'-tetramethylspiro[2H-1-benzopyran-2,2'-indoline]; 5-nitro-5',6,8-trichloro- 1',3',3'-trimethylspiro[2H-1-benzopyran-2,2'-indoline]; 6-nitro-5,5',7-trichloro- 1',3',3'-trimethylspiro[2H-1-benzopyran-2,2'-indoline]; 6-nitro- 5,5',8-trichloro-1',3',3'-trimethylspiro[2H-1-benzopyran-2,2'-indoline]; 6-nitro- 5,7,7'-trichloro-1',3',3'-trimethylspiro[2H-1-benzopyran-2,2'-indoline]; 6-nitro-5',7,8-trichloro-1', 3',3'-trimethylspiro[2H-1-benzopyran- 2,2'-indoline]; 7-nitro-5,6,8-trichloro-1',3',3'-trimethylspiro[2H-1-benzopyran- 2,2'-indoline]; 5-nitro-4',7',8-trimethoxy-1',3',3'-trimethylspiro[2H-1-benzopyran-2,2'-indoline]; 6-nitro-4', 6',8-trimethoxy- 1',3',3'-trimethylspiro[2H-1-benzopyran-2, 2'-indoline]; 6-nitro-4',7,8-trimethoxy- 1',3',3'-trimethylspiro[2H-1-benzopyran-2,2'-indoline]; 8-nitro-4',6,7'-trimethoxy-1',3',3'-trimethylspiro[2H-1-benzopyran-2,2'-indoline]; 5-nitro-1',3',3'-trimethylspiro[2H-1-benzopyran-2,2'-indoline]; 5'-nitro- 1',3',3'-trimethylspiro[2H-1-benzopyran-2,2'-indoline]; 6-nitro- 1',3',3'-trimethylspiro[2H-1-benzopyran-2,2'-indoline]; 7-nitro-1',3',3'-trimethylspiro[2H-1-benzopyran-2,2'-indoline]; 8-nitro-1',3',3'-trimethylspiro[2H-1-benzopyran-2,2'-indoline]; 6-(β-nitrovinyl)-1',3',3'-trimethylspiro[2H-1-benzopyran-2,2'-indoline]; 6-nitro-1',3',3'-trimethyl- 4',6',7'-triphenylspiro [2H-1-benzopyran-2,2'-indoline]; 1',3',3',5,7-pentamethylspiro[2H-1-benzopyran-2,2'-indoline]; 1',3',3', 6,8-pentamethylspiro[2H-1-benzopyran-2,2'-indoline]; 7'-phenyl-1',3',3'-trimethylspiro[2H-1-benzopyran-2,2'-indoline]; 6-phenylazo-1',3',3'-trimethylspiro[2H-1-benzopyran-2,2'-indoline]; 1',3,3',3'-tetramethylspiro[2H-1-benzopyran-2,2'-indoline]; 1',3',3',5'-tetramethylspiro[2H-1-benzopyran-2,2'-indoline]; 1',3',3',6'-tetramethylspiro[2H-1-benzopyran-2,2'-indoline]; 1',3'3',7'-tetramethylspiro[2H-1-benzopyran-2,2'-indoline]; 1',3',3',8'-tetramethylspiro[2H-1-benzopyran-2,2'-indoline]; 5,6,8-trichloro-1',3',3'-trimethylspiro[2H-1-benzopyran-2,2'-indoline]; 4',6,8-trimethoxy-1',3',3'-trimethylspiro[2H-1-benzopyran-2,2'-indoline]; 4',7,8-trimethoxy-1',3',3'-trimethylspiro[2H-1-benzopyran-2,2'-indoline]; 5',7,8-trimethoxy-1',3',3'-trimethylspiro[2H-1-benzopyran-2,2'-indoline]; 1',3',3'-trimethylspiro[2H-1-benzopyran- 2,2'-indoline]; 1',3',3'-trimethyl-5',6,8-trinitrospiro[2H-1-benzopyran- 2,2'-indoline]; 1',3',3'-trimethyl-4',6,7'-triphenylspiro[2H-1-benzopyran- 2,2'-indoline]; spiro[2H-1-benzopyran-2,2'-[1H]-benzo[g]indoline]; 8-methoxy-6-nitro-1',3',3'-trimethylspiro[2H-1-benzopyran- 2,2'-[1H]-benzo[g]indoline]; 6-nitro-1',3',3'-trimethylspiro[2H- 1-benzopyran-2,2'-[1H]-benzo[g]indoline]; spiro[2H-benzopyran-2,2,-[1H]-benzo[e]indoline]; 6-nitro-1',3',3'-trimethylspiro[2H-benzopyran-2,2,-[1H]-benzo[e]indoline]; spiro[indoline-2, 3'-[3H]-naphtho[2,1-b]pyran]; 8'-bromo- 1,3,3-trimethylspiro[indoline-2,3'-[3H]-naphtho[2,1-b]pyran]; 1-butyl- 3,3-dimethylspiro[indoline-2,3'-[3H]-naphtho[2,1-b]pyran]; 1-butyl- 3,3-dimethyl-8-nitrospiro[indoline-2,3'-[3H]-naphtho[2,1-b]pyran]; 5'-carboxy- 5-chloro-1,3,3-trimethylspiro[indoline-2,3'-[3H]-naphtho[2,1-b]pyran]; 5'-carboxy-1,3,3-trimethylspiro[indoline-2,3'-[3H]-naphtho[2,1-b]pyran]; 5-chloro-1,3,3-trimethylspiro[indoline-2,3'-[3H]-naphtho[2,1-b]pyran]; 5-chloro-8'-nitro-1,3,3-trimethylspiro[indoline-2,3'-[3H]-naphtho[2,1-b]pyran]; 4,7-dimethoxy-1,3,3-trimethylspiro[indoline-2,3'-[3H]-naphtho[2,1-b]pyran]; 1,3-dimethyl-3-ethylspiro[indoline-2,3'-[3H]-naphtho[2,1-b]pyran]; 3,3-dimethyl-1-ethylspiro[indoline-2,3'-[3H]naphtho[2,1-b]pyran]; 3,3-dimethyl-1-ethyl-8'-nitrospiro[indoline-2,3'-[3H]-naphtho[2,1-b]pyran]; 3,3-dimethyl-1-propylspiro[indoline-2,3'-[3 H]-naphtho[2,1-b]pyran]; 3,3-dimethyl-1-propyl-8'-nitrospiro[indoline-2,3'-[3H]-naphtho[2,1-b]pyran]; 9'-hydroxy-1,3,3-trimethylspiro[indoline-2,3'-[3H]-naphtho[2,1-b]pyran]; 5-(β-hydroxyethyl)-1,3,3-trimethylspiro[indoline-2,3'-[3H]-naphtho[2,1-b]pyran]; 5-methoxy-8'-nitro- 1,3,3-trimethylspiro[indoline-2,3'-[3H]-naphtho[2,1-b]pyran]; 5'-methoxy- 8'-nitro-1,3,3-trimethylspiro[indoline-2,3'-[3H]-naphtho[2,1-b]pyran]; 5'-methoxy-10'-nitro-1,3,3-trimethylspiro[indoline-2,3'-[3H]-naphtho[2,1-b]pyran]; 5-methoxy-1,3,3-trimethylspiro[indoline-2,3'-[3H]-naphtho[2,1-b]pyran]; 5'-methoxy-1,3,3-trimethylspiro[indoline-2,3'-[3H]-naphtho[2,1-b]pyran]; 7'-nitro-1,3,3-trimethylspiro[indoline-2,3'-[3H]-naphtho[2,1-b]pyran]; 8'-nitro-1,3,3-trimethylspiro[indoline-2,3'-[3H]-naphtho[2,1-b]pyran]; 10'-nitro-1,3,3-trimethylspiro[indoline-2,3'-[3H]-naphtho[2,1-b]pyran]; 1,3,3,4,7-pentamethylspiro[indoline-2,3'-[3H]-naphtho[2,1-b]pyran]; 1,3,3,5,7-pentamethylspiro[indoline-2,3'-[3H]naphtho[2,1-b]pyran]; 5-phenyl-1,3,3-trimethylspiro[indoline-2,3'-[3H]-naphtho[2,1-b]pyran]; 7-phenyl-1,3,3-trimethylspiro[indoline-2,3'-[3H]-naphtho [2,1-b]pyran]; 1,2',3,3-tetramethylspiro[indoline-2,3'-[3H]-naphtho[2,1-b]pyran]; 1,3,3,5-tetramethylspiro[indoline-2, 3'-[3H]-naphtho[ 2,1-b]pyran]; 1,3,3,7-tetramethylspiro[indoline-2,3'-[3H]-naphtho[2,1-b]pyran]; 1,3,3,-trimethylspiro[indoline-2,3'-[3H]-naphtho[2,1-b]pyran]; spiro[indoline-2,2'-[2H]-phenanthro[2,1-b]pyran]; 1,3,3,-trimethylspiro[indoline-2,2'-[2H]-phenanthro[2,1-b]pyran]; spiro[3H-anthra[2,1-b]pyran-3,2'-indoline]; 1',3',3'-trimethylspiro[3H-anthra[2,1-b]pyran-3,2'-indoline]; spiro[indoline-2,3'-(3H)-phenanthro[3,4-b]pyran]; 1,3,3-trimethylspiro[indoline-2,3'-(3H)-phenanthro[3,4-b]pyran]; spiro[indoline-2,2'-[2H]-naphtho[1,2-b]pyran]; 6'-chloro-1,3,3-trimethylspiro[indoline-2,2'-[2H]-naphtho[1,2-b]pyran]; 6'-nitro-1,3,3-trimethylspiro[indoline-2,2'-[2H]-naphtho[1, 2-b]pyran]; 1,3,3-trimethylspiro[indoline-2,2'-[2H]-naphtho [1,2-b]pyran]; spiro[indoline-2,2'-[2H]-naphtho[2,3-b]pyran]; 10'-nitro-1,3,3-trimethylspiro[indoline-2,2'-[2H]-naphtho[2,3-b]pyran]; 1,3,3-trimethylspiro[indoline-2,2'-[2H]-naphtho[2,3-b]pyran]; spiro[2H-1-benzopyran-2,2'-benzothiazoline]; 6'-acetamido- 3,3'-dimethyl-6-nitrospiro [2H-1-benzopyran-2,2'-benzothiazoline]; 6'-amino-3,3'-dimethyl-6-nitrospiro[2H-1-benzopyran- 2,2'-benzothiazoline]; 6-bromo-3,3'-dimethylspiro[2H-1-benzopyran-2,2'-benzothiazoline]; 6-bromo-3,3'-dimethyl-6'-methoxyspiro[2H-1-benzopyran- 2,2'-benzothiazoline]; 6-bromo-3,3'-dimethyl-8-methoxy-6-nitrospiro[2H-1-benzopyran-2,2'-benzothiazoline]; 6-bromo-3,3'-dimethyl-6'-methylthiospiro[2H-1-benzopyran-2,2'-benzothiazoline];

6-bromo-3,3'-dimethyl- 6'-nitrospiro[2H-1-benzopyran-2, 2'-benzothiazoline]; 8-bromo- 3,3'-dimethyl-6-nitrospiro [2H-1-benzopyran-2,2'-benzothiazoline]; 6-bromo- 3'-methylspiro[2H-1-benzopyran-2,2'-benzothiazoline]; 3'-butyl-6-nitro- 3-phenylspiro[2H-1-benzopyran-2,2'-benzothiazoline]; 8-carbethoxy- 3,3'-dimethylspiro[2H-1-benzopyran-2,2'-benzothiazoline]; 8-carbethoxy- 3,3'-dimethyl-6-nitrospiro[2H-1-benzopyran-2,2'-benzothiazoline]; 8-carboxy- 3,3'-dimethylspiro[2H-1-benzopyran-2,2'-benzothiazoline]; 6'-carboxy- 3,3'-dimethyl-8-methoxy-6-nitrospiro[2H-1-benzopyran-2,2'-benzothiazoline]; 8-carboxy-3,3'-dimethyl-6-nitrospiro[2H-1-benzopyran- 2,2'-benzothiazoline]; 6'-chloro-3,3'-dimethyl-8-methoxy-6-nitrospiro[2H- 1-benzopyran-2,2'-benzothiazoline]; 6-chloro-3,3'-dimethyl-8-nitrospiro[2H-1-benzopyran-2,2'-benzothiazoline]; 3-(p-chlorophenyl)-8-methoxy- 3'-methyl-6-nitrospiro[2H-1-benzopyran-2,2'-benzothiazoline]; 6'-cyano-3,3'-dimethyl-8-methoxy-6-nitrospiro[2H-1-benzopyran-2,2'-benzothiazoline]; 6,6'-dibromo-3,3'-dimethylspiro[2H-1-benzopyran-2,2'-benzothiazoline]; 6',8-dimethoxy-3,3'-dimethylspiro[2H-1-benzopyran- 2,2'-benzothiazoline]; 6',8-dimethoxy-3,3'-dimethyl-6,7'-dinitrospiro[2H-1-benzopyran- 2,2'-benzothiazoline]; 6',8-dimethoxy-3,3'-dimethyl-6-nitrospiro [2H-1-benzopyran-2,2'-benzothiazoline]; 6',8-dimethoxy-3'-ethyl- 3-methyl-6-nitrospiro[2H-1-benzopyran-2,2'-benzothiazoline]; 3,3'-dimethylspiro[2H-1-benzopyran-2,2'-benzothiazoline]; 3,3'-dimethyl-6,6'-dinitrospiro[2H-1-benzopyran-2,2'-benzothiazoline]; 3,3'-dimethyl-6,6'-dinitro- 8-methoxyspiro[2H-1-benzopyran-2,2'-benzothiazoline]; 3,3'-dimethyl- 6'-hydroxy-8-methoxy-6-nitrospiro[2H-1-benzopyran-2,2'-benzothiazoline]; 3,3'-dimethyl-5'-isobutyramido-6-nitrospiro[2H-1-benzopyran-2,2'-benzothiazoline]; 3,3'-dimethyl-5'-methacrylamido-6-nitrospiro[2H-1-benzopyran-2,2'-benzothiazoline]; 3,3'-dimethyl-8-methoxyspiro[2H-1-benzopyran-2,2'-benzothiazoline]; 3,3'-dimethyl-8-methoxy- 6'-methylthio-6-nitrospiro[2H-1-benzopyran-2,2'-benzothiazoline]; 3,3'-dimethyl-6'-methoxy-6-nitrospiro[2H-1-benzopyran- 2,2'-benzothiazoline]; 3,3'-dimethyl-8-methoxy-5-nitrospiro [2H-1-benzopyran- 2,2'-benzothiazoline]; 3,3'-dimethyl-8-methoxy-6-nitrospiro[2H-1-benzopyran-2,2'-benzothiazoline]; 3,3'-dimethyl-6'-methylthio- 6-nitrospiro [2H-1-benzopyran-2,2'-benzothiazoline]; 3,3'-dimethyl-6-nitrospiro[2H-1-benzopyran-2,2'-benzothiazoline]; 3,3'-dimethyl- 8-nitrospiro[2H-1-benzopyran-2,2'-benzothiazoline]; 3'-ethyl-8-methoxy- 3-methylspiro[2H-1-benzopyran-2,2'-benzothiazoline]; 3-ethyl-8-methoxy- 3'-methyl-6-nitrospiro[2H-1-benzopyran-2,2'-benzothiazoline]; 3'-ethyl-6'-methoxy-3-methyl-6-nitrospiro[2H-1-benzopyran-2,2'-benzothiazoline]; 3'-ethyl-8-methoxy-3-methyl-6-nitrospiro [2H-1-benzopyran- 2,2'-benzothiazoline]; 3-ethyl-3'-methyl-6-nitrospiro[2H-1-benzopyran- 2,2'-benzothiazoline]; 3'-ethyl-3-methyl-6-nitrospiro[2H-1-benzopyran- 2,2'-benzothiazoline; 3'-ethyl-8-methoxy-6-nitro-3-phenylspiro[2H-1-benzopyran-2,2'-benzothiazoline]; 3'-ethyl-6-nitrospiro[2H-1-benzopyran-2, 2'-benzothiazoline]; 3'-ethyl-6-nitro-3-phenylspiro[2H-1-benzopyran-2,2'-benzothiazoline]; 3-isopropyl-8-methoxy-3'-methyl-6-nitrospiro[2H-1-benzopyran-2,2'-benzothiazoline]; 3'-isopropyl-8-methoxy-3methyl-6-nitrospiro[2H-1-benzopyran-2,2'-benzothiazoline]; 7-methoxy-3'-methylspiro[2H-1-benzopyran-2,2'-benzothiazoline]; 8-methoxy-3'-methyl-6-nitro-3-phenylspiro[2H-1-benzopyran- 2,2'-benzothiazoline]; 8-methoxy-3'-methyl-6-nitro-3-propylspiro[2H-1-benzopyran-2,2'-benzothiazoline]; 3'-methylspiro[2H-1-benzopyran- 2,2'-benzothiazoline]; 3'-methyl-6-nitrospiro[2H-1-benzopyran- 2,2'-benzothiazoline]; 3'-methyl-6-nitro-3-phenylspiro[2H-1-benzopyran-2,2'-benzothiazoline]; 3'-methyl-6-nitro-3-propylspiro[2H-1-benzopyran- 2,2'-benzothiazoline]; 6-nitro-3-phenyl-3'-propylspiro[2H-1-benzopyran- 2,2'-benzothiazoline]; spiro [benzothiazoline-2,3,'-[3H]-naphtho[2,1-b]pyran]; 2',3-dimethylspiro[benzothiazoline-2,3,'-[3H]-naphtho[2,1-b]pyran]; 2',3-dimethyl-6-methoxyspiro[benzothiazoline-2,3,'-[3H]-naphtho[2,1-b]pyran]; 3-ethylspiro[benzothiazoline-2,3,'-[3H]-naphtho[2,1-b]pyran]; 3-ethyl-2'-methylspiro [benzothiazoline-2,3,'-[3H]naphtho[2,1-b]pyran]; 3-methylspiro[benzothiazoline-2,3,'-[3H]-naphtho[2,1-b]pyran]; spiro[2H-1-benzopyran-2,2'-benzoxazoline]; 8-bromo- 3'-methyl-6-nitrospiro[2H-1-benzopyran-2,2'-benzoxazoline]; 5'-chloro- 3,3'-dimethyl-6-nitrospiro[2H-1-benzopyran-2,2'-benzoxazoline]; 6-chloro- 3,3'-dimethyl-8-nitrospiro[2H-1-benzopyran-2,2'-benzoxazoline]; 3,3'-dimethyl-6-methoxy-8-nitrospiro[2H-1-benzopyran-2,2'-benzoxazoline]; 3,3'-dimethyl-8-methoxy-6-nitrospiro[2H-1-benzopyran- 2,2'-benzoxazoline]; 3,3'-dimethyl-8-methoxy-6-nitro-5'-phenylspiro[2H-1- benzopyran-2,2'-benzoxazoline]; 3,3'-dimethyl-6-nitrospiro[2H-1-benzopyran- 2,2'-benzoxazoline]; 3,3'-dimethyl-8-nitrospiro [2H-1-benzopyran- 2,2'-benzoxazoline]; 3,3'-dimethyl-6-nitro-5'-phenylspiro[2H-1-benzopyran- 2,2'-benzoxazoline]; 3-ethyl-3'-methyl-6-nitrospiro[2H-1-benzopyran- 2,2'-benzoxazoline]; 8-methoxy-6-nitro-3,3',5', 7'-tetramethylspiro[2H-1-benzopyran-2,2'-benzoxazoline]; 8-methoxy-6-nitro- 3,3',5'-trimethylspiro[2H-1-benzopyran-2,2'-benzoxazoline]; 6-nitro- 3,3',5'-trimethylspiro[2H-1-benzopyran-2,2'-benzoxazoline]; 8-nitro-3,3',5'-trimethylspiro[2H-1-benzopyran-2,2'-benzoxazoline]; spiro[2H-1-benzopyran-2,2'-naphth[2,3-d]oxazoline]; 3,3'-dimethyl-8-methoxy-6-nitrospiro[2H-1-benzopyran-2,2'-naphth[2,3-d]oxazoline]; 3,3'-dimethyl-6-nitrospiro[2H-1-benzopyran-2,2'-naphth[2,3-d]oxazoline]; spiro[2H-1-benzopyran- 2,2'-naphth[2,1-d]oxazoline]; 3,3'-dimethyl-8-methoxy-6-nitrospiro[2H-1-benzopyran-2,2'-naphth[2,1-d]oxazoline]; 2,2'-spirobi[2H- 1-benzopyran]; 3-amyl-2,2'-spirobi[2H-1-benzopyran]; 3-amyl-6'-bromo- 2,2'-spirobi[2H-1-benzopyran]; 3-amyl-6-bromo-6'-methyl-2,2'-spirobi[2H- 1-benzopyran]; 3-amyl-6'-bromo-6-methyl-2,2'-spirobi[2H-1-benzopyran]; 3-amyl-6,6'-dibromo-2,2'-spirobi[2H-1-benzopyran]; 3-amyl-6,6'-dimethyl- 2,2'-spirobi[2H-1-benzopyran]; 3-amyl-6-methyl-2,2'-spirobi[2H-1-benzopyran]; 5-bromo-8,8'-dimethoxy-6-nitro-3'-phenyl-2, 2'-spirobi[2H-1-benzopyran]; 6-bromo-6'-nitro-3-phenyl-2, 2'-spirobi[2H-1-benzopyran]; 6-bromo- 3'-phenyl-2,2'-spirobi[2H-1-benzopyran]; 3-benzyl-2,2'-spirobi[2H-1-benzopyran]; 3-butyl-2,2'-spirobi[2H-1-benzopyran]; 6-chloro-6'-nitro-3-phenyl- 2,2'-spirobi[2H-1-benzopyran]; 8-chloro-6-nitro-3'-phenyl-2,2'-spirobi[2H-1-benzopyran]; 6,6'-dibromo-3,3'-dimethylene-2,2'-spirobi[2H- 1-benzopyran]; 8,8'-dimethoxy-6'-nitro-3-phenyl-2,2'-spirobi[2H-1-benzopyran]; 3,3'-dimethyl-2,2'-spirobi[2H-1-benzopyran]; 6,6'-dimethyl- 3',3'-dimethylene-2,2'-spirobi[2H-1-benzopyran]; 3,3'-dimethylene-2,2'-spirobi[2H-1-benzopyran]; 6,6'-dinitro-3,3'-diphenyl-2,2'-spirobi[2H-1-benzopyran]; 3,3'-diphenyl-2,2'-spirobi[2H-1-benzopyran]; 3-ethyl-2,2'-spirobi[2H-1-benzopyran]; 8-fluoro-6-nitro-3'-phenyl-2,2'-spirobi[2H-1-benzopyran]; 8-iodo-6-nitro-3'-phenyl-2,2'-spirobi[2H-1-benzopyran]; 8'-methoxy- 3-methyl-6-nitro-2,2'-spirobi[2H-1-benzopyran]; 8-methoxy-6-nitro- 3'-phenyl-2,2'-spirobi[2H -1-benzopyran]; 8-methoxy-6-nitro-3-phenyl- 2,2'-spirobi[2H-1-benzopyran]; 8-methoxy-8'-nitro-3-phenyl-2,2'-spirobi[2H-1-benzopyran]; 8'-methoxy-6-nitro-3-phenyl-2,2'-spirobi[2H-1-benzopyran]; 3-methyl-2, 2'-spirobi[2H-1-benzopyran]; 3-methyl-6-nitro- 2,2'-spirobi[2H-1-benzopyran]; 6-nitro-3'-phenyl-2,2'-spirobi[2H-1-benzopyran]; 3-phenyl-2,2'-spirobi[2H-1-benzopyran]; 3,3'-tetramethylene- 2,2'-spirobi[2H-1-benzopyran]; 3,3'-trimethylene-2,2'-spirobi[2H-1-benzopyran];; 3,3'-spirobi[3H-naphtho[2,1-b]pyran]; 2-amyl- 3,3'-spirobi[3H-naphtho[2,1-b]pyran]; 2-benzyl-3,3'-spirobi[3H-naphtho[2,1-b]pyran]; 2-butyl-3,3'-spirobi[3H-naphtho[2,1-b]pyran]; 2-chloro- 3,3'-spirobi[3H-naphtho[2,1-b]pyran]; 2-chloro-8,8'-dinitro-3,3'-spirobi[3H-naphtho[2,1-b]pyran]; 2-decyl-3,3'-spirobi[3H-naphtho[2,1-b]pyran]; 8,8'-dibromo-3,3'-spirobi[3H-naphtho[2,1-b]pyran]; 2,2'-dicarboethoxy- 3,3'-spirobi[3H-naphtho[2,1-b]pyran]; 2,2'-dicarbomethoxy-3,3'-spirobi[3 H-naphtho[2,1-b]pyran]; 2,2'-diethyl-3,3'-spirobi[3 H-naphtho[2,1-b]pyran]; 5,5'-dimethoxy-3,3'-spirobi[3H-naphtho[2,1-b]pyran]; 5,5'-dimethoxy-8,8'-dinitro-3,3'-spirobi[3H-naphtho[2,1-b]pyran]; 5,5'-dimethoxy-10,10'-dinitro-3,3'-spirobi[3H-naphtho[2,1-b]pyran]; 9,9'-dimethoxy- 8,8'-dinitro-3,3'-spirobi[3 H-naphtho[2,1-b]pyran]; 2,2'-dimethyl- 3,3'-spirobi[3H-naphtho[2,1-b]pyran]; 2,2'-dimethyl-8,8'-dinitro- 3,3'-spirobi[3H-naphtho[2,1-b]pyran]; 5,5'-dimethyl-10,10'-dinitro-3,3'-spirobi[3H-naphtho[2,1-b]pyran]; 9,9'-dimethyl-8,8'-dinitro-3,3'-spirobi[3H-naphtho[2,1-b]pyran]; 9,9-dimethyl-7,7'-dinitro-3,3'-spirobi[3H-naphtho[2,1-b]pyran]; 2-(γ,γ-dimethylallyl)-3,3'-spirobi[3H-naphtho[2,1-b]pyran]; 2,2'-dimethylene-3,3'-spirobi[3H-naphtho[2,1-b]pyran]; 7,7'-dinitro- 3,3'-spirobi[3H-naphtho[2,1-b]pyran]; 8,8'-dinitro-3,3'-spirobi[3H-naphtho[2,1-b]pyran]; 9,9'-dinitro-3,3'-spirobi[3H-naphtho[2,1-b]pyran]; 10.10'-dinitro-3,3'-spirobi[3H-naphtho[2,1-b]pyran]; 8,8'-dinitro-2-methyl-3,3'-spirobi[3H-naphtho[2,1-b]pyran]; 8,8'-dinitro-2,2'-(2"methyl)trimethylene-3,3'-spirobi[3H-naphtho[2,1-b]pyran]; 8,8'-dinitro- 2-phenyl-3,3'-spirobi[3H-naphtho[2,1-b]pyran]; 8,8'-dinitro-2,2'-trimethylene- 3,3'-spirobi[3H-naphtho[2,1-b]pyran]; 2,2'-diphenyl-3,3'-spirobi[3H-naphtho[2,1-b]pyran]; 2-ethyl-3,3'-spirobi[3H-naphtho[2,1-b]pyran]; 2-heptyl-3,3'-spirobi[3H-naphtho[2,1-b]pyran]; 2-hexyl-3,3'-spirobi[3H-naphtho[2,1-b]pyran]; 2-isobutyl-3,3'-spirobi[3H-naphtho[2,1-b]pyran]; 2-isopropyl-3,3'-spirobi[3H-naphtho[2,1-b]pyran]; 2-methyl-3,3'-spirobi[3H-naphtho[2,1-b]pyran]; 2,2'-(2"-methyl)trimethylene-3,3'-spirobi[3H-naphtho[2,1-b]pyran]; 8'-nitro-2-phenyl-3,3'-spirobi[3H-naphtho[2,1-b]pyran]; 2-octyl-3,3'-spirobi[3H-naphtho[2,1-b]pyran]; 2-phenyl- 3,3'-spirobi[3H-naphtho[2,1-b]pyran]; 2-(β-phenylethyl)-3,3'-spirobi[3H-naphtho[2,1-b]pyran]; 2-propyl-3,3'-spirobi[3H-naphtho[2,1-b]pyran]; 2,2'-tetramethylene-3,3'-spirobi[3H-naphtho[2,1-b]pyran]; 2,2'-trimethylene- 3,3'-spirobi[3H-naphtho[2,1-b]pyran]; 2,2'-spirobi[2 H-naphtho[1,2-b]pyran]; 3-amyl-2,2'-spirobi[2H-naphtho[1,2-b]pyran]; 6,6'-dichloro- 2,2'-spirobi[2H-naphtho[1,2-b]pyran]; 7,7'-dinitro-2,2'-spirobi[2H-naphtho[1,2-b]pyran]; 8,8'-dinitro-2,2'-spirobi[2H-naphtho[1,2-b]pyran]; 9,9'-dinitro-2,2'-spirobi[2H-naphtho[1,2-b]pyran]; 10,10'-dinitro-2,2'-spirobi[2H-naphtho[1,2-b]pyran]; 3-phenyl-2,2'-spirobi[2H-naphtho[1,2-b]pyran]; 2,2'-spirobi[2H-naphtho[2,3-b]pyran]; spiro[2H-1-benzopyran- 2,3'-[3H]-naphtho[2,1-b]pyran]; 2'-amylspiro[2H-1-benzopyran-2,3'-[3H]-naphtho[2,1-b]pyran]; 3-amylspiro[2H-1-benzopyran-2,3'-[3H]-naphtho[2,1-b]pyran]; 3-amyl-6-bromospiro[2H-1-benzopyran-2,3'-[3H]-naphtho[2,1-b]pyran]; 3-amyl-7-chlorospiro[2H-1-benzopyran-2,3'-[3H]-naphtho[2,1-b]pyran]; 3-amyl-6-hydroxyspiro[2H-1-benzopyran-2,3'-[3H]-naphtho[2,1-b]pyran]; 3-amyl-6-methoxyspiro[2H-1-benzopyran-2,3'-[3H]-naphtho[2,1-b]pyran]; 3-amyl-7-methoxyspiro[2H-1-benzopyran-2,3'-[3H]-naphtho[2,1-b]pyran]; 3-amyl-6-methylspiro[2H-1-benzopyran-2,3'-[3H]-naphtho[2,1-b]pyran]; 3-amyl-7-methylspiro[2H-1-benzopyran-2,3'-[3H]-naphtho[2,1-b]pyran]; 3-amyl-6-nitrospiro[2H-1-benzopyran-2,3'-[3H]-naphtho[2,1-b]pyran]; 2'-benzylspiro[2H-1-benzopyran-2,3'-[3H]-naphtho[2,1-b]pyran]; 3-benzylspiro[2H-1-benzopyran-2,3'-[3H]-naphtho[2,1-b]pyran]; 6-bromospiro[2H-1-benzopyran-2,3'-[3H]-naphtho[2,1-b]pyran]; 6-bromo-8-methoxy-3-methyl-8'-nitrospiro[2H-1-benzopyran- 2,3'-[3H]-naphtho[2,1-b]pyran]; 8'-bromo-8-methoxy-3-phenylspiro[2H-1-benzopyran-2,3'-[3H]-naphtho[2,1-b]pyran]; 6-bromo-3-methyl- 8'-nitrospiro[2H-1-benzopyran-2,3'-[3H]-naphtho[2,1-b]pyran]; 6-bromo- 8'-nitro-3-phenylspiro[2H-1-benzopyran-2,3'-[3H]-naphtho[2,1-b]pyran]; 8'-bromo-3-phenylspiro[2H-1-benzopyran-2,3'-[3H]-naphtho[2,1-b]pyran]; 6-chloro-8-methoxy-3-methyl-8'-nitrospiro[2H-1-benzopyran- 2,3'-[3H]-naphtho[2,1-b]pyran]; 6-chloro-3-methylspiro[2H-1-benzopyran- 2,3'-[3H]-naphtho[2,1-b]pyran]; 6-chloro-3-methyl-8'-nitrospiro[2H- 1-benzopyran-2,3'-[3H]-naphtho[2,1-b]pyran]; 8-chloro-3-methyl-8'-nitrospiro[2H-1-benzopyran-2,3'-[3H]-naphtho[2,1-b]pyran]; 6-chloro-8'-nitro- 3-phenylspiro[2H-1-benzopyran-2,3'-[3H]-naphtho[2,1-b]pyran]; 7-diethylamino- 3-methyl-8'-nitrospiro[2H-1-benzopyran-2,3'-[3H]-naphtho[2,1-b]pyran]; 5,7-dimethoxy-8'-nitro-3-phenylspiro[2H-1-benzopyran-2,3'-[3H]-naphtho[2,1-b]pyran]; 2',3-dimethylspiro[2H-1-benzopyran- 2,3'-[3H]-naphtho[2,1-b]pyran]; 2',3-dimethylenespiro[2H-1-benzopyran- 2,3'-[3H]-naphtho[2,1-b]pyran]; 6-fluoro-3-methyl-8'-nitrospiro[2H-1-benzopyran-2,3'-[3 H]-naphtho[2,1-b]pyran]; 2-isopropylspiro[2H-1-benzopyran-2,3'-[3 H]-naphtho[2,1-b]pyran]; 3-isopropylspiro[2H-1-benzopyran-2,3'-[3 H]-naphtho[2,1-b]pyran]; 8-methoxy- 2'-methylspiro[2H-1-benzopyran-2,3'-[3H]-naphtho[2,1-b]pyran]; 8-methoxy-2'-methyl-8'-nitrospiro[2H-1-benzopyran-2,3'-[3H]-naphtho[2,1-b]pyran]; 8-methoxy-3-methyl-6-nitrospiro[2H-1-benzopyran-2,3'-[3H]-naphtho[2,1-b]pyran]; 8-methoxy-3-methyl-8'-nitrospiro[2H-1-benzopyran- 2,3'-[3H]-naphtho[2,1-b]pyran]; 7-methoxy-2'-methyl-4-phenylspiro[2H- 1-benzopyran-2,3'-[3H]-naphtho[2,1-b]pyran]; 7-methoxy-3-methyl-4-phenylspiro[2H-1-benzopyran-2,3'-[3H]-naphtho[2,1-b]pyran]; 8-methoxy- 8'-nitro-3-phenylspiro[2H-1-benzopyran-2,3'-[3H]-naphtho[2,1-b]pyran]; 2'-methylspiro[2H-1-benzopyran-2,3'-[3H]-naphtho[2,1-b]pyran]; 3-methylspiro[2H-1-benzopyran-2,3'-[3H]-naphtho[2,1-b]pyran]; 6-methylspiro[2H-1-benzopyran-2,3'-[3H]-naphtho[2,1-b]pyran]; 3-methyl-6-nitrospiro[2H-1-benzopyran-2,3'-[3H]-naphtho[2,1-b]pyran]; 2'-methyl-4-phenylspiro[2H-1-benzopyran-2,3'-[3H]-naphtho[2,1-b]pyran]; 8'-nitro- 3-(o-nitrophenyl)spiro[2H-1-benzopyran-2,3'-[3H]-naphtho[2,1-b]pyran]; 8'-nitro- 3-phenylspiro[2H-1-benzopyran-2,3'-[3H]-naphtho[2,1-b]pyran]; 2'-octylspiro[2H-1-benzopyran-2,3'-[3H]-naphtho[2,1-b]pyran]; 2'-phenylspiro[2H-1-benzopyran-2,3'-[3H]-naphtho[2,1-b]pyran]; 3-phenylspiro[2H-1-benzopyran-2,3'-[3H]-naphtho[2,1-b]pyran]; 2'-(β-phenylethyl)spiro[2H-1-benzopyran-2,3'-[3H]-naphtho[2,1-b]pyran]; 3-(β-phenylethyl)spiro[2H-1-benzopyran-2,3'-[3H]-naphtho[2,1-b]pyran]; 2',3-trimethylenespiro[2H-1-benzopyran-2,3'-[3H]-naphtho[2,1-b]pyran]; spiro[2H-1-benzopyran-2,2'-[2H]-naphtho[1,2-b]pyran]; 3-amylspiro[2H- 1-benzopyran- 2,2'-[2H]-naphtho[1,2-b]pyran]; 3'-amylspiro[2H-1-benzopyran- 2,2'-[2H]-naphtho[1,2-b]pyran]; 3-amyl-6-bromospiro[2H-1-benzopyran- 2,2'-[2H]-naphtho[1,2-b]pyran]; 3-amyl-6-methoxyspiro[2H-1-benzopyran- 2,2'-[2H]-naphtho[1,2-b]pyran]; 3-amyl-6-methylspiro[2H-1-benzopyran- 2,2'-[2H]-naphtho[1,2-b]pyran]; 3-amyl-6-nitrospiro[2 H -1-benzopyran- 2,2'-[2H]-naphtho[1,2-b]pyran]; 6'-chloro-8-methoxy-3-phenylspiro

[2H-1-benzopyran-2,2'-2H]-naphtho[1,2-b]pyran]; 3'methyl- 4'-phenylspiro[2H-1-benzopyran-2,2'-[2H]-naphtho[1,2-b]pyran]; 3-phenylspiro[2H-1-benzopyran-2,2'-[2H]-naphtho[1,2-b]pyran]; 3'-phenylspiro[2H-1-benzopyran-2,2'-[2H]-naphtho[1,2-b]pyran]; spiro[3H-anthraceno[2,1-b]pyran-3,2'-[2H]-1-benzopyran]; spiro[2H-1-benzopyran- 2,2'-[2'H]phenanthreno[2,1-b]pyran]; spiro[3H-anthraceno[2,1-b]pyran- 3,3'-[3H]naphtho[2,1-b]pyran]; spiro[3H-naphtho[2,1-b]pyran-3,2'-[2'H] phenanthreno[2,1-b]pyran]; 2,2'-spirobi[2H-phenanthreno[2,1-b]pyran]; spiro[4H-1-benzopyran-4,3'-[3H]naphtho[2,1-b]pyran]; 2,3-diphenyl- 7-methoxyspiro[4H-1-benzopyran-4,3'-[3H]naphtho[2,1-b]pyran]; 2,3-diphenyl-7-methoxy-8'-nitrospiro[4H-1-benzopyran-4,3'-[3H]naphtho[2,1-b]pyran]; 2,3-diphenyl-8'-nitrospiro[4H-1-benzopyran-4,3'-[3H]naphtho[2,1-b]pyran]; 7-methoxy-3-methyl-8'-nitro-2-phenylspiro[4H-1-benzopyran-4,3'-[3H]naphtho[2,1-b]pyran]; 6-methoxy- 3-methyl-2-phenylspiro[4H-1-benzopyran-4,3'-[3 H]naphtho[2,1-b]pyran]; 7-methoxy-3-methyl-2-phenylspiro [4H-1-benzopyran-4,3'-[3 H]naphtho[2,1-b]pyran]; 3-(p-methoxyphenyl)-8'-nitro-2-phenylspiro [4H-1-benzopyran- 4,3'-[3H]naphtho[2,1-b]pyran]; 3-methyl-2-phenylspiro[4H-1-benzopyran- 4,3'-[3H]naphtho[2,1-b]pyran]; spiro[2H-naphtho[1,2-b]pyran-2,3'-[3H]-naphtho[2,1-b]pyran]; 2'-amylspiro[2H-naphtho[1,2-b]pyran-2,3'-[3H]-naphtho[2,1-b]pyran]; 3-amylspiro[2H-naphtho[1,2-b]pyran-2,3'-[3H]-naphtho[2,1-b]pyran]; 2',3-dimethyl-4-phenylspiro[2H-naphtho[1,2-b]pyran-2,3'-[3H]-naphtho[2,1-b]pyran]; 2'-3-dimethylenespiro[2H-naphtho[1,2-b]pyran-2,3'-[3 H]-naphtho[2,1-b]pyran]; 2'-methyl-4-phenylspiro[2H-naphtho[1,2-b]pyran-2,3'-[3H]-naphtho[2,1-b]pyran]; 3-methyl- 4-phenylspiro[2H-naphtho[1,2-b]pyran-2,3'-[3H]-naphtho[2,1-b]pyran]; 2'-phenylspiro[2H-naphtho[1,2-b]pyran-2,3'-[3H]-naphtho[2,1-b]pyran]; 3-phenylspiro[2H-naphtho[1,2-b]pyran-2,3'-[3H]-naphtho[2,1-b]pyran]; 4-phenylspiro[2H-naphtho[1,2-b]pyran-2,3'-[3H]-naphtho[2,1-b]pyran]; 2',3-trimethylenespiro[2H-naphtho[1,2-b]pyran-2,3'-[3H]-naphtho[2,1-b]pyran]; spiro [4H-napthto[1,2-b]pyran-4,3'-[3H]naphtho[2,1-b]pyran]; 3-methyl-8'-nitro-2-phenylspiro[4H-napthto[1,2-b]pyran-4,3'-[3 H]naphtho[2,1-b]pyran]; spiro[2H-1-benzopyran-2,9'-xanthene]; 6,8-dinitrospiro[2H-1-benzopyran-2,9'-xanthane]; 3'-hydroxy-6-nitrospiro[2H-1-benzopyran-2,9'-xanthene]; 6-nitrospiro[2H-1-benzopyran-2,9'-xanthene]; 8-nitrospiro[2H-1-benzopyran- 2,9'-xanthene]; spiro[3H-naphtho[2,1-b]pyran-3,9'-xanthene]; 2-methylspiro[3H-naphtho[2,1-b]pyran-3,9'-xanthene]; 8-nitrospiro[3H-naphtho[2,1-b]pyran-3,9'-xanthene]; spiro[3H-naphtho[2,1-b]pyran-3,2'-[2H]pyran; 4',6-diphenylspiro[3H-naphtho[2,1-b]pyran-3,2'-[2H]pyran; spiro[indoline-2,2'-pyrano[3,2-H]quinoline]; 6'-bromo-1,3,3-trimethylspiro[indoline-2,2'-pyrano[3,2-H]quinoline]; 5-chloro-1,3,3,6'-tetramethylspiro[indoline-2,2'-pyrano[3,2-H]quinoline]; 5-chloro-1,3,3,9'-tetramethylspiro[indoline-2,2'-pyrano[3,2-H]quinoline]; 5-chloro-1,3,3-trimethylspiro[indoline-2,2'-pyrano[3,2-H]quinoline]; 3,3-dimethyl-1-ethylspiro[indoline-2,2'-pyrano[3,2-H]quinoline]; 3,3-dimethyl-1-propylspiro[indoline-2,2'-pyrano[3,2-H]quinoline]; 1-ethyl-3,3,6'-trimethylspiro[indoline-2,2'-pyrano[3,2-H]quinoline]; 5-fluoro-1,3,3,6'-tetramethylspiro[indoline-2,2'-pyrano[3,2-H]quinoline]; 5-fluoro-1,3,3-trimethylspiro[indoline-2,2'-pyrano[3,2-H]quinoline]; 1,3,3,6',7-pentamethylspiro[indoline-2,2'-pyrano[3,2-H]quinoline]; 1,3,3,7,9'-pentamethylspiro[indoline-2,2'-pyrano[3,2-H]quinoline]; 1-propyl-3,3,6'-trimethylspiro[indoline-2,2'-pyrano[3,2-H]quinoline]; 1,3,3,7-tetramethylspiro[indoline- 2,2'-pyrano[3,2-H]quinoline]; 1,3,3,9'-tetramethylspiro[indoline-2,2'-pyrano[3,2-H]quino-line]; spiro[indoline-2,3'-[3H]-naphtho[2,1-b]-1,4-oxazine]; 5-chloro-1,3,3-trimethylspiro[indoline- 2,3'-[3H]-naphtho[2,1-b]-1,4-oxazine]; 1,3,3-trimethylspiro[indoline-2,3'-[3H]-naphtho[2,1-b]-1,4-oxazine]; spiro[indoline-2,2'-[2H]-pyrano[3,4-b]pyridine]; 5'-hydroxymethyl-1,3,3,8'-tetramethylspiro[indoline-2,2'-[2H]-pyrano[3,4-b]pyridine]; spiro[indoline-2,2'-[2H]-pyrano[3,2-b]pyridine]; 5-chloro-1,3,3-trimethylspiro[indoline-2,2'-[2H]-pyrano[3,2-b]pyridine]; spiro[indoline-2,2'-[2H]-pyrano[3,2-c]quinoline]; 1,3,3,5'-tetramethylspiro[indoline-2,2'-[2H]-pyrano[3,2-c]quinoline]; spiro[2H-1,4-benzoxazine- 2,2'-indoline]; 1',3',3'-trimethylspiro[2H-1,4-benzoxazine-2,2'-indoline]; spiro [2H-1-benzopyran-2,2'-[2H]quinoline]; 6-bromo-3-isopropyl- 1'-methylspiro[2H-1-benzopyran-2,2'-[2H]quinoline]; 6-bromo- 1'-methylspiro[2H-1-benzopyran-2,2'-[2H]quinoline]; 3,3'-dimethylene-1'-methylspiro[2H-1-benzopyran-2,2'-[2H]quinoline]; 1'-ethylspiro[2H-1-benzopyran- 2,2'-[2H]quinoline]; 1'-ethyl-6-nitrospiro[2H-1-benzopyran- 2,2'-[2H]quinoline]; 1'-ethyl-8-nitrospiro[2H-1-benzopyran-2,2'- 2H]quinoline]; 6-methoxy-1'-methylspiro[2H-1-benzopyran-2,2'- 2H]quinoline]; 7-methoxy-1'-methylspiro[2H-1-benzopyran-2,2'-2H]quinoline]; 1'-methylspiro[2H-1-benzopyran-2,2'-[2H]quinoline]; 1'-methyl- 6-nitrospiro[2H-1-benzopyran-2,2'-[2H]quinoline]; 1'-methyl- 3,3'-trimethylenespiro[2H-1-benzopyran-2,2'-[2H]quinoline]; 6-nitro-1',3,3'-trimethylspiro[2H-1-benzopyran-2,2'-[2H]quinoline]; spiro [3H-naphtho[2,1-b]pyran-3,2'-[2H]quinoline]; 2-isopropyl-1'-methylspiro[3H-naphtho[2,1-b]pyran-3,2'-[2H] quinoline]; 1'-methylspiro[3H-naphtho[2,1-b]pyran-3,2'-[2H]quinoline]; spiro[2H-1-benzopyran-2,2'-[2H]pyridine]; 6-bromo- 1'-methylspiro[2H-1-benzopyran-2,2'-[2H]pyridine]; 1',3-dimethyl- 6-nitrospiro[2H-1-benzopyran-2,2'-[2H]pyridine]; 6,8-dinitro-1'-methyl- 3-phenylspiro[2H-1-benzopyran-2,2'-[2 H]pyridine]; 1'-ethylspiro[2H-1-benzopyran- 2,2'-[2H]pyridine]; 3-ethyl-1'-methyl-6-nitrospiro [2H-1-benzopyran- 2,2'-[2H]pyridine]; 1'-ethyl-6-nitrospiro[2H-1-benzopyran-2,2'-[2H]pyridine]; 1'-ethyl-8-nitrospiro[2H-1-benzopyran-2,2'-[2H]pyridine]; 7-methoxy- 1'-methylspiro[2H-1-benzopyran-2,2'-[2H]pyridine]; 1'-methylspiro[2H-1-benzopyran-2,2'-[2H]pyridine]; 1'-methyl-6-nitrospiro[2H-1-benzopyran-2,2'-[2H]pyridine]; spiro[3H-naphtho[2,1-b]pyran-3,2'-[2H]pyridine]; 1'-methylspiro[3H-naphtho[2,1-b]pyran-3,2'-[2H]pyridine]; 1',4',6-triphenylspiro[3H-naphtho[2,1-b]pyran-3,2'-[2H]pyridine]; spiro[9H-acridine-9,2'-[2H]benzopyran]; 8'-methoxy-10-methylspiro[9H-acridine-9,2'-[2H]benzopyran]; 10-methylspiro[9H-acridine- 9,2'-[2H]benzopyran]; spiro [9H-acridine-9,3'-[3H]naphtho[2,1-b]pyran]; 10-methylspiro[9 H-acridine-9,3'-[3H]naphtho[2,1-b]pyran]; spiro[indoline-2,2'-[2 H]pyrano[2,3-b]indole]; 5-chloro-1,3,3,9'-tetramethylspiro[indoline-2,2'-[2H]pyrano[2,3-b]indole]; spiro[indoline- 2,2'-[2H]pyrano[3,2-b]indole]; 5-chloro-1,3,3-trimethylspiro[indoline-2,2'-[2H]pyrano[3,2-b]indole]; spiro[indoline-2,2'-[2H]pyrano[2,3-b]benzofuran]; 1,3,3-trimethylspiro[indoline-2,2'-[2H]pyrano[2,3-b]benzofuran]; spiro[indoline-2,2'-[2H]pyrano[3,2-b]benzofuran]; 5chloro-1,3,3-trimethylspiro[indoline-2,2'-[2H]pyrano[3,2-b]benzofuran]; spiro[2H-1-benzothieno[2,3-b]pyran-2,2'-indoline]; 5'-chloro- 1',3',3'-trimethylspiro[2H-1-benzothieno[2,3-b]pyran-2,2'-indoline]; spiro[2H]-1-benzothieno[3,2-b]pyran-2,2'-indoline]; 5'-chloro-1',3',3'-trimethylspiro[2H]-1-benzothieno[3,2-b]pyran-2,2'-indoline]; spiro[3H-naphtho[ 2,1-b]pyran-3,9'-thioxanthene]; 4'-chloro-8-nitrospiro[3 H-naphtho[2,1-b]pyran-3,9'-thioxanthene]; spiro[2H,8H-benzo[1,2-b:-3,4-b']dipyran-8-2'-indoline]-2-one; 1',3',3',4-tetramethylspiro[2H,8H-benzo[1,2-b:-3,4-b']dipyran-8-2'- indoline]-2-one; spiro[2H-1-benzopyran- 2,2'-oxazoline]; 3'-methyl-6-nitro-5'-phenylspiro[2H-1-benzopyran-2,2'-oxazoline]; spiro[2H-1-benzothiopyran-2,2'-indoline]; 1,3',3'-trimethylspiro[2H-1-benzothiopyran-2,2'-indoline]; spiro [3H-naphtho[2,1-b]pyran-3,2'-thiazoline]; 4',5'-dihydro-2, 3'-dimethylspiro[3H-naphtho[2,1-b]pyran-3,2'-thiazoline]; m-dithiino[5,4b: 5,6-b']bis[1]benzopyranspiro[3H-naphtho[ 2,1-b]pyran-3,2'-thiazoline]; 6H,8H-thiopyrano[4,3-b:4,5-b']bis[1]benzopyranspiro[3H-naphtho[2,1-b]pyran-3,2'-thiazoline]; 6H,8H-bisnaphtho[1',2':5,6]pyrano[3,2-c:2',3'-d]thiopyranspiro[3H-naphtho[2,1-b]pyran-3,2'-thiazoline]; spiro[2H-1-benzopyran-2,1'-isoindoline]; 6-nitro- 2',3',3'-trimethylspiro[2H-1-benzopyran-2,1'-isoindoline]; spiro[indoline- 2,3'-[3H]pyrano-[3,2-a]xanthene]-12'-one; 5-chloro-3',12'-dihydro-1,3,3-trimethylspiro[indoline-2,3'-[3H] pyrano-[3,2-a]xanthene]-12'-one; spiro[benzoselenazole-2, 3'-[3H]naphtho[2,1-b]pyran]; 3-ethylspiro [benzoselenazole-2,3'-[3H]naphtho[2,1-b]pyran]; and the like. Mixtures of two or more spiro compounds can also be used.

One spiro compound preferred for lightfastness and reversibility of the photochromic shift over a number of times is of the formula

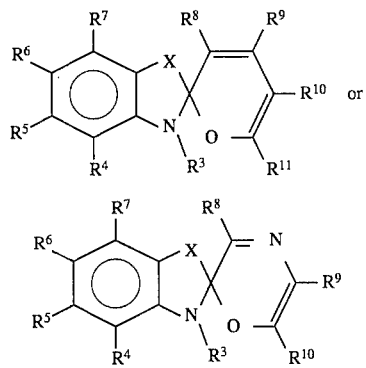

wherein X is a sulfur atom, a selenium atom, an oxygen atom, a $—CH_2—$ group, a $—CHR^1—$ group, or a $—CR^1R^2—$ group, and wherein $R^1$, $R^2$, $R^3$, $R^4$, $R^5$, $R^6$, $R^7$, $R^8$, $R^9$, $R^{10}$, and $R^{11}$ each, independently of the others, can be (but are not limited to) hydrogen, alkyl, including cyclic alkyl groups, such as cyclopropyl, cyclohexyl, and the like, and including unsaturated alkyl groups, such as vinyl ($H_2C=CH—$), allyl ($H_2C=CH—CH_2—$), propynyl ($HC\equiv C—CH_2—$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like.

The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 20 carbon atoms and more preferably with from 1 to about 10 carbon atoms, aryloxy groups, preferably with from about 5 to about 20 carbon atoms and more preferably with from about 5 to about 10 carbon atoms, alkylthio groups, preferably with from 1 to about 20 carbon atoms and more preferably with from 1 to about 10 carbon atoms, arylthio groups, preferably with from about 5 to about 20 carbon atoms and more preferably with from about 5 to about 10 carbon atoms, aldehyde groups, ketone groups, ester groups, amide groups, carboxylic acid groups, sulfonic acid groups, and the like. Further, two or more R groups can be joined together to form a ring.

Spiropyrans, spirooxazines, and spirothiopyrans are known compounds and can be prepared as described in, for example, U.S. Pat. No. 3,293,055; U.S. Pat. No. 3,451,338; U.S. Pat. No. 3,100,778; U.S. Pat. No. 3,290,331; U.S. Pat. No. 3,231,584; U.S. Pat. No. 3,299,079; U.S. Pat. No. 3,291,604; U.S. Pat. No. 3,149,120; U.S. Pat. No. 3,022,318; U.S. Pat. No. 2,978,462; U.S. Pat. No. 3,413,234; U.S. Pat. No. 3,407,145; French Patent 1,450,583; French Patent 1,451,332; Zelichenok et al., *Macromolecules,* vol. 25, p. 3179 et seq. (1992); A. I. Kiprianov et al., *Zh. Obshch. Khim.,* vol. 17, p. 1468 (1947); E. B. Knott, *J. Chem. Soc.,* vol. 1951, p. 3038 (1951); Y. Hirshberg et al., *J. Chem. Soc.,* vol. 1955, p. 3313 (1955); C. Schiele et al., *Tetrahedron,* vol. 23, p. 3733 (1967); T. A. Shakhverdov et al., *Opt. Spektrosk.,* vol. 24, p. 619 (1968); R. Guglielmetti et al., *J. Chim. Phys.,* vol. 65, p. 454 (1968); A. Hinnen et al., *Bull. Soc. Chim. Fr.,* p. 2066 (1968); E. Berman et al., *J. Amer. Chem. Soc.,* vol. 81, p. 5605 (1959); D. P. Maisuradze et al., *Soobshch. Akad. Nauk Gruz. SSR,* vol. 50, p. 77 (1968); D. P. Maisuradze et al., *Soobshch. Akad. Nauk Gruz. SSR,* vol. 49, p. 75 (1968); T. Bercovici et al., *Mol. Photochem.,* vol. 1, p. 23 (1969); O. F. Koelsch et al., *J. Amer. Chem. Soc.,* vol. 74, p. 6288 (1952); O. Chaude, *Cahiers Phys.* (France), vol. 52, p. 39 (1954); I. Shimidzu et al., *Kogyo Kagaku Zasshi,* vol. 72, p. 171 (1969); I. Shimidzu et al., *Bull. Chem. Soc. Jap.,* vol. 42, p. 1730 (1969); I. Shimidzu et al., *Nippon Kagaku Zasshi,* vol. 88, p. 1127 (1967); I. Shimidzu, et al., *Nippon Kagaku Zasshi,* vol. 89, p. 755 (1968); C. Balny et al., *Tetrahedron Lett.,* vol. 1968, p. 5097 (1968); J. Arnaud et al., *J. Chim. Phys.,* vol. 64, p. 1165 (1967); R. Wizinger et al., *Helv. Chim. Acta,* vol. 23, p. 247 (1940); L. D. Taylor et al., *Tetrahedron Lett.,* vol. 1967, p. 1585 (1967); A. I. Nogaideli et al., *Soobshch. Akad. Nauk Gruz. SSR,* vol. 40, p. 607 (1965); E. D. Bergmann et al., *J. Amer. Chem. Soc.,* vol. 7, p. 5009 (1950); C. Schiele et al., *Angew. Chem.,* vol. 78, p. 389 (1966); C. Schiele et al., *Ann. Chem.,* vol. 696, p. 81(1966); C. Schiele et al., *Tetrahedron Lett.,* vol. 1966, p. 4409 (1966); R. Guglielmetti et al., *Bull. Soc. Chim. Fr.,* vol. 1967, p. 2824 (1967); Z. M. Elashvili et al., *Soobshch. Aka Nauk Gruz, SSR,* vol. 52, p. 351(1968); O. Dumenil et al., *Bull. Soc. Chim. Fr.,* vol. 1969, p. 817 (1969); P. H. Vandewijer et al., *J. Polym. Sci. Part C,* vol. 22, p. 231 (1968); A. V. Shablya et al., *Opt. Spektrosk.,* vol. 20, p. 738 (1966); H. Decker et al., *Chem. Bet.,* vol. 41, p. 2997 (1908); O. Arnold, *Z. Naturforsch.,* vol. 21b, p. 291(1966); C. Schiele et al., *Ann. Chem.,* vol. 722, p. 162 (1969); I. M. Heilbron et al., *J. Chem. Soc.,* vol. 1931, p. 1336 (1931); A. Lowenbein et al., *Chem. Ber.,* vol. 59, p. 1377 (1926); W. Borsche et al., *Ann. Chem.,* vol. 393, p. 29 (1912); R.

Dickinson et al., *J. Chem. Soc.*, vol. 1928, p. 2077 (1928); W. Dilthey et al., *J. Prakt. Chem.*, vol. 1, p. 179 (1926); R. Dickinson et al., *J. Chem. Soc.*, vol. 1927, p. 14(1927); R. Dickinson et al., *J. Chem. Soc.*, vol. 1927, p. 1699 (1927); W. Dilthey et al., *Chem. Ber.*, vol. 61, p. 963 (1928); I. M. Heilbron et al., *J. Chem. Soc.*, vol. 1933, p. 430 (1933); I. M. Heilbron et al., *J. Chem. Soc.*, vol. 1929, p. 936 (1929); I. M. Heilbron et al., *J. Chem. Soc.*, vol. 1936, p. 1380 (1936); C. Schiele et al., *Tetrahedron Lett.*, vol. 1966, p. 4413 (1966); I. M. Heilbron et al., *J. Chem. Soc.*, vol. 1934, p. 1571(1934); I. M. Heilbron et al., *J. Chem. Soc.*, vol. 1933, p. 1263 (1933); F. Irving, *J. Chem. Soc.*, vol. 1929, p. 1093 (1929); F. Przystal et al., *Anal. Chim. Acta*, vol. 41, p. 391 (1968); C. F. Koelsch, *J. Org. Chem.*, vol. 16, p. 1362 (1951); R. S. Becker et al., *J. Phys. Chem.*, vol. 72, p. 997 (1968); E. O. Howard et al., *J. Amer. Chem. Soc.*, vol. 82, p. 158 (1960); A. I. Nogaideli et al., *Soobshch. Akad. Nauk Gruz. SSR*, vol. 49, p. 573 (1968); A. Samat et al., *Bull. Soc., Chim. Belg.*, vol. 100, no. 9, p. 679 (1991); G. Petilion, Ph.D. Thesis, University of Brest (1979); M. Maguet, Ph.D. Thesis, University of Brest (1980); and R. Guglielmetti et al., *Bull. Soc. Chim. France*, vol 1971, p. 2039 (1971); the disclosures of each of which are totally incorporated herein by reference. Spiro compounds are also available commercially from, for example, Aldrich Chemical Company, Milwaukee, Wis., Nippon Kankoh - Shikiso Kenkyusho Co. Ltd., Okayama, Japan, Chroma Chemicals Inc., Dayton, OH, and the like. Specific examples of suitable commercially available spiropyrans and spirooxazines include 27,361-9; 32,254-7; 32,255-5; 32,256-3; and 32,257-1, available from Aldrich; SP-1822; SP-98; SP-48; SP-12;, and SP-99, available from Nippon Kankoh - Shikiso Kenkyusho; and the like.

Stilbene compounds are of the general formula

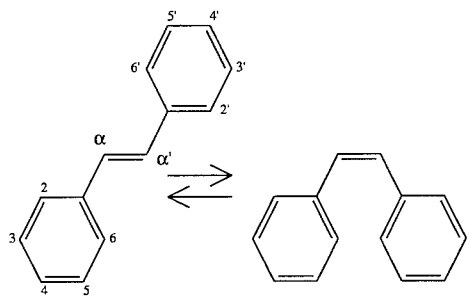

wherein substituents may be present at the 2, 3, 4, 5, 6, 2',3',4',5', and 6' positions. Examples of suitable substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from I to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Specific examples of stilbenes include stilbene (no substituents), 3-methylstilbene, 4-methoxystilbene, 3-methoxystilbene, 4-aminostilbene, 4-fluorostilbene, 3-fluorostilbene, 4-chlorostilbene, 3-chlorostilbene, 4-bromostilbene, 3-bromostilbene, 3-iodostilbene, 4-cyanostilbene, 3-cyanostilbene, 4-acetylstilbene, 4-benzoylstilbene, 4-phenacylstilbene, 4-nitrostilbene, 3-nitrostilbene, 3-nitro-3'-methoxystilbene, 3-nitro-4-dimethylaminostilbene, 4,4'-dinitrostilbene, 4-nitro-4'-methoxystilbene, 4-nitro-3'-methoxystilbene, 4-nitro-4'-aminostilbene, 4-nitro-4'-dimethylaminostilbene, α-methylstilbene, α,α'-dimethylstilbene, α,α'-difluorostilbene, α,α'-dichlorostilbene, 2,4,6-trimethylstilbene, 2,2',4,4',6,6'-hexamethylstilbene, and the like. Stilbene compounds are well known and can be prepared as described in, for example, G. S. Hammond et al., *J. Amer. Chem. Soc.*, vol. 86, p. 3197 (1964), W. G. Herkstroeter et al., *J. Amer. Chem. Soc.*, vol. 88, p. 4769 (1966), D. L. Beveridge et al., *J. Amer. Chem. Soc.*, vol. 87, p. 5340 (1965), D. Gegiou et al., *J. Amer. Chem. Soc.*, vol. 90, p. 3907 (1968), D. Schulte-Frohlinde et al., *J. Phys. Chem.*, vol. 66, p. 2486 (1962), S. Malkin et al., *J. Phys. Chem.*, vol. 68, p. 1153 (1964), S. Malkin et al., *J. Phys. Chem.*, vol. 66, p. 2482 (1964), H. Stegemeyer, *J. Phys. Chem.*, vol. 66, p. 2555 (1962), H. Gusten et al., *Tetrahedron Lett.*, vol. 1968, p. 3097 (1968), D. Gegiou et al., *J. Amer. Chem. Soc.*, vol. 90, p. 12 (1968), K. Kruger et al., *J. Phys. Chem.*, vol. 66, p. 293 (1969), and D. Schulte-Frohlinde, *Ann.*, vol. 612, p. 138 (1958), the disclosures of each of which are totally incorporated herein by reference.

Aromatic azo compounds which exhibit photochromism are of the general formula

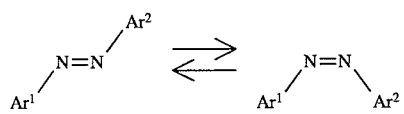

wherein $Ar^1$ and $Ar^2$ are each, independently of the other, selected from the group consisting of aromatic groups. The aromatic groups can be substituted, with examples of substituents including (but not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl (HC≡C—CH₂—), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Examples of photochromic azo compounds include azobenzene, 2-methoxyazobenzene, 2-hydroxyazobenzene, 3-methylazobenzene, 3-nitroazobenzene, 3-methoxyazobenzene, 3-hydroxyazobenzene, 4-iodoazobenzene, 4-bromoazobenzene, 4-chloroazobenzene, 4-fluoroazobenzene, 4-methylazobenzene, 4-carbomethoxyazobenzene, 4-acetylazobenzene, 4-carboxyazobenzene, 4-cyanoazobenzene, 4-ethoxyazobenzene, 4-methoxyazobenzene, 4-nitroazobenzene, 4-acetamidoazobenzene, 4-dimethylaminoazobenzene, 4-aminoazobenzene, 4-trimethylammonium azobenzene (with any suitable anion accompanying the ammonium cation, including but not limited to, $Cl^-$, $Br^-$, $I^-$, $HSO_4^-$, $SO_4^{2-}$, $NO_3^-$, $HCOO^-$, $CH_3COO^-$, $HCO_3^-$, $CO_3^{2-}$, $H_2PO_4^-$, $HPO_4^{2-}$, $PO_4^{3-}$, $SCN^-$, $BF_4^-$, $ClO_4^-$, $SSO_3^-$, $CH_3SO_3^-$, $CH_3C_6H_4SO_3^-$, $SO_3^{2-}$, $BrO_3^-$, $IO_3^-$, $ClO_3^-$, or the like, as well as mixtures thereof), 4-dimethylamino-4'-phenylazobenzene, 4-dimethylamino-4'-hydroxyazobenzene, 4,4'-bis(dimethylamino)azobenzene, 4-dimethylamino-4'-p-aminophenylazobenzene, 4-dimethylamino-4'-p-acetamidophenylazobenzene, 4-dimethylamino-4'-p-aminobenzylazobenzene, 4-dimethylamino-4'-[β-(p-aminophenyl)ethyl]azobenzene, 4-dimethylamino-4'-mercuric acetate azobenzene, 4-hydroxyazobenzene, 2-methyl-4-hydroxyazobenzene, 4-hydroxy- 4'-methylazobenzene, 2,6-dimethyl-4-hydroxyazobenzene, 2,2'- 4',6,6'-pentamethyl-4-hydroxyazobenzene, 2,6-dimethyl-2',4',6'-trichloro- 4-hydroxyazobenzene, 4-hydroxy-4'-chloroazobenzene, 2,2',4',6-tetrachloro- 4-hydroxyazobenzene, 3-sulfonate-4-hydroxyazobenzene, 2,2'-dimethoxyazobenzene, 3,3'-dinitroazobenzene, 3,3'-dimethylazobenzene, 4,4'-dimethylazobenzene, 4,4'-dimethoxyazobenzene, 4,4'-dinitroazobenzene, 4,4'-dichloroazobenzene, 2,4-dimethoxyazobenzene, 2,6-dimethoxyazobenzene, 4-nitro-4'-methoxyazobenzene, 2,4,6-trimethylazobenzene, 2,3'-dimethoxy-4'-isobutyramidoazobenzene, 2,2',4,4',6,6'-hexamethylazobenzene, 2-hydroxy-5-methylazobenzene, 3,3'-disulfonateazobenzene, 4-methoxy-3'-sulfonateazobenzene, 4-methoxy- 4'-sulfonateazobenzene, 2,4-dimethoxy-5'-sulfonateazobenzene, 2,2',4-trimethoxy-5'-sulfonateazobenzene, 4,4'-dimethoxy-3,3'-dicarboxylateazobenzene, 2,2'-azopyridine, 3,3'-azopyridine, 4,4'-azopyridine, 2-phenylazopyridine, 3-phenylazopyridine, 4-phenylazopyridine, 6,6'-azoquinoline, 1-phenylazonaphthalene, 1,1-azonaphthalene, a,2'-azonaphthalene, 2,2'-azonaphthalene, 1-phenylazo- 4-naphthol, 1-phenylazo-4-methoxynaphthalene, 3-phenylazo-2-naphthol, 3-phenylazo-2-methoxynaphthalene, 1-(o-hydroxyphenylazo)-2-naphthol, 4-phenylazo-1-naphthylamine, 1-phenylazo-2-naphthylamine, and the like. Polymeric azo materials are also suitable. Aromatic azo compounds are well known and can be prepared as described in, for example, A. Natansohn et al., *Macromolecules*, vol. 25, p. 2268 (1992); G. Zimmerman et al., *J. Amer. Chem. Soc.*, vol. 80, p. 3528 (1958); W. R. Brode, in *The Roger Adams Symposium*, p. 8, Wiley (New York 1955); D. Gegiou et al., *J. Amer. Chem. Soc.*, vol. 90, p. 3907 (1968); S. Malkin et al., *J. Phys. Chem.*, vol. 66, p. 2482 (1962); D. Schulte-Frohlinde, *Ann.*, vol. 612, p. 138 (1958); E. I. Stearns, *J. Opt. Soc. Amer.*, vol. 32, p. 382 (1942); W. R. Brode et al., *J. Amer. Chem. Soc.*, vol 74, p. 4641 (1952); W. R. Brodeetal., *J. Amer. Chem. Soc.*, vol 75, p. 1856 (1953); E. Fischer et al., *J. Chem. Phys.*, vol. 27, p. 328 (1957); G. Wettermark et al., *J. Amer. Chem. Soc.*, vol. 87, p. 476 (1965); G. Gabor et al., *J. Phys. Chem.*, vol. 72, p. 3266 (1968); M. N. Inscoe et al., *J. Amer. Chem. Soc.*, vol 81, p. 5634 (1959); E. Fischer et al., *J. Chem. Soc.*, vol. 1959, p. 3159 (1959); G. Gabor et al., *J. Phys. Chem.*, vol. 66, p. 2478 (1962); G. Gabor et al., *Israel J. Chem.*, vol. 5, p. 193 (1967); D. Bullock et al., *J. Chem. Soc.*, vol. 1965, p. 5316 (1965); R. Lovrien et al., *J. Amer. Chem. Soc.*, vol 86, p. 2315 (1964); J. H. Collins et al., *J. Amer. Chem. Soc.*, vol. 84, p. 4708 (1962); P. P. Birnbaum et al., *Trans. Faraday Soc.*, vol. 50, p. 1192 (1954); M. Frankel et al., *J. Chem. Soc.*, vol. 1955, p. 3441 (1955); E. Fischer et al., *J. Chem. Phys.*, vol. 23, p. 1367 (1955); E. Fischer, *J. Amer. Chem. Soc.*, vol. 82, p. 3249 (1960); H. Sterk et al., *Monatsch. Chem.*, vol. 99, p. 297 (1968); A. H. Cook et al., *J. Chem. Soc.*, vol. 1939, p. 1315 (1939); A. H. Cook et al., *J. Chem. Soc.*, vol. 1939, p. 1309 (1939); N. Campbell et al., *J. Chem. Soc.*, vol. 1953, p. 1281 (1953); P. P. Birnbaum et al., *Trans. Faraday Soc.*, vol. 49, p. 735 (1953); R. Lefevre et al., *J. Chem. Soc.*, vol. 1953, p. 867 (1953); G. S. Hartley, *J. Chem. Soc.*, vol. 1938, p. 633 (1938); J. H. Gould et al., *J. Opt. Soc. Amer.*, vol. 42, p. 380 (1952); G. Gabor et al., *J. Phys. Chem.*, vol. 72, p. 153 (1968); R. Lefevre et al., *J. Chem. Soc.*, vol. 1951, p. 1814(1951); M. A. Horowitz et al., *J. Amer. Chem. Soc.*, vol. 77, p. 5011 (1955); and A. Winkel et al., *Ber.*, vol. 74B, p. 670 (1940), the disclosures of each of which are totally incorporated herein by reference.

Bisimidazoles are of the general formula

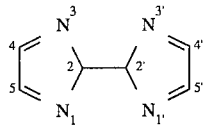

wherein substituents can be present on the 2, 4, 5, 2',4', and 5' positions. examples of substituents include (but are not limited to) alkyl, including cyclic alkyl groups, such as cyclopropyl, cyclohexyl, and the like, and including unsaturated alkyl groups, such as vinyl ($H_2C=CH-$), allyl ($H_2C=CH-CH_2-$), propynyl ($HC\equiv C-CH_2-$), and the like, preferably with from 1 to about 50 carbon atoms and more preferably with from 1 to about 30 carbon atoms, aryl, preferably with from about 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Specific examples of photochromic bisimidazoles include 2,2',4,4',5,5'-hexaphenyl bisimidazole, 2,2',4, 4',5,5'-hexa-p-tolyl bisimidazole, 2,2',4,4',5,5'-hexa-p-chlorophenyl bisimidazole, 2,2'-di-p-chlorophenyl- 4,4',5,5'-tetraphenyl bisimidazole, 2,2'-di-p-anisyl-4,4',5,5'-tetraphenyl bisimidazole, and the like. Bisimidazole compounds are known, and can be prepared as described in, for example, T. Hayashi et al., *Bull. Chem. Soc. Jap.*, vol. 33, p. 565 (1960), T. Hayashi et al., *J. Chem. Phys.*, vol. 32, p. 1568 (1960), T. Hayashi et al., *Bull. Chem. Soc. Jap.*, vol. 38, p. 2202 (1965), and D. M. White et al., *J. Org. Chem.*, vol. 29, p. 1926 (1964), the disclosures of each of which are totally incorporated herein by reference.

Bis-tetraphenylpyrrole is of the formula

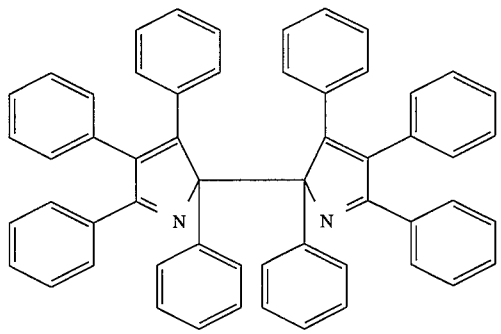

and can be prepared as disclosed in, for example, S. M. Blinder et al., *J. Chem. Phys.*, vol. 36, p. 540 (1962) and in G. Rio et al., *Acad. Sci., Paris, Set. C*, vol. 263, p. 634 (1967), the disclosures of each of which are totally incorporated herein by reference.

Hydrazines are of the general formula

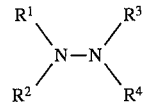

wherein $R^1$, $R^2$, $R^3$, and $R^4$ each, independently of the others, can be hydrogen, alkyl, preferably with from 1 to about 50 carbon atoms and more preferably with from 1 to about 30 carbon atoms, aryl, preferably with from about 5 to about 30 carbon atoms and more preferably with from about 5 to about 20 carbon atoms, and arylalkyl, preferably with from about 6 to about 50 carbon atoms and more preferably with from about 6 to about 30 carbon atoms. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring.

Specific examples of hydrazines include hydrazine (wherein $R^1$, $R^2$, $R^3$, and $R^4$ are each hydrogen), 1,2-diphenylhydrazine, tetraphenylhydrazine, and the like. Hydrazines are well known and can be prepared as described in, for example, G. N. Lewis et al., *J. Amer. Chem. Soc.*, vol 64, p. 2801 (1942), D. A. Ramsay, *J. Phys. Chem.*, vol. 57, p. 415 (1953), P. F. Holt et al., *J. Chem. Soc.*, v. 1955, p. 98 (1955), and J. Weiss, *Trans. Faraday Soc.*, vol. 36, p. 856 (1940), disclosures of each of which are totally incorporated herein by reference.

Aryl disulfides are of the general formula

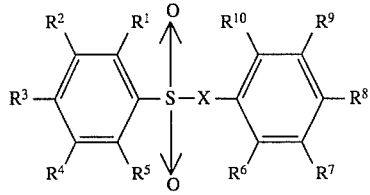

wherein X is a sulfur atom, an oxygen atom, or an SO$_2$ group and R$^1$, R$^2$, R$^3$, R$^4$, R$^5$, R$^6$, R$^7$, R$^8$, R$^9$, and R$^{10}$ each, independently of the others, can be hydrogen, alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. The alkyl, aryl, and arylalkyl groups can also be substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 30 carbon atoms and more preferably with from 1 to about 20 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more R groups can be joined together to form a ring.

Specific examples of aryl disulfide compounds include

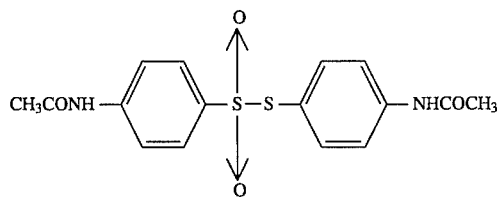

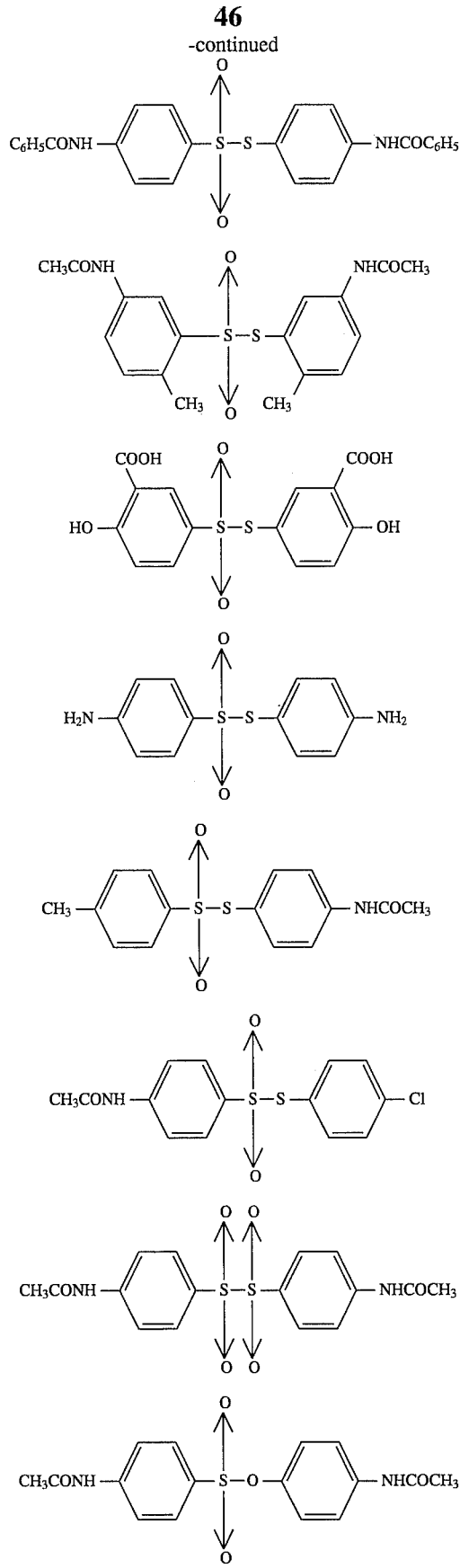

and the like. Aryl disulfide compounds are known, and can be prepared as described in, for example, C. M. Bere et al., J. Chem. Soc., vol. 1924, p. 2359 (1924) and in R. Child et al., J. Chem. Soc., vol. 1926, p. 2697 (1926), the disclosures of each of which are totally incorporated herein by reference.

Also suitable are compounds that exhibit tautomeric photochromic phenomena. Examples of these materials include those that undergo photochromic valence tautomerism, those that undergo hydrogen transfer, including keto-enol phototautomerism, aci-nitro phototautomerism, and those that undergo other forms of phototautomerism, such as the naphthacenequinones and their substituted derivatives, as well as polymers containing these moieties, which undergo photochromic transformation between the trans and ana forms as follows:

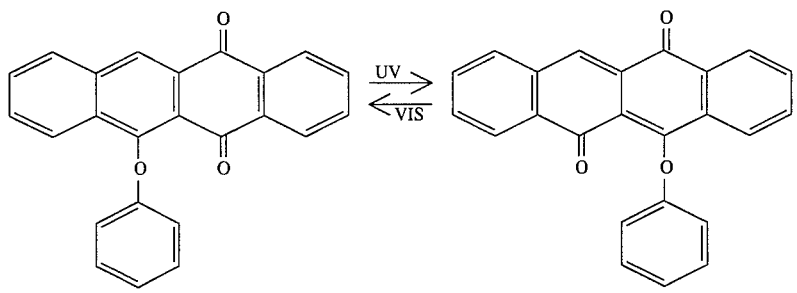

as disclosed in, for example, F. Buchholtz et al., Macromolecules, vol. 26, p. 906 (1993), the disclosure of which is totally incorporated herein by reference. Examples of suitable substituents include alkyl, preferably with from 1 to about 50 carbon atoms and more preferably with from 1 to about 30 carbon atoms, aryl, preferably with from 5 to about 30 carbon atoms and more preferably with from about 5 to about 20 carbon atoms, arylalkyl, preferably with from about 6 to about 50 carbon atoms and more preferably with from about 6 to about 30 carbon atoms, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 50 carbon atoms and more preferably with from 1 to about 30 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Alkyl, aryl, and arylalkyl substituents can also be further substituted with groups such as, for example, silyl groups, nitro groups, cyano groups, halide atoms, such as fluoride, chloride, bromide, iodide, and astatide, amine groups, including primary, secondary, and tertiary amines, hydroxy groups, alkoxy groups, preferably with from 1 to about 30 carbon atoms and more preferably with from 1 to about 20 carbon atoms, aryloxy groups, preferably with from about 5 to about 30 carbon atoms and more preferably with from about 5 to about 20 carbon atoms, alkylthio groups, preferably with from 1 to about 50 carbon atoms and more preferably with from 1 to about 30 carbon atoms, arylthio groups, preferably with from about 5 to about 30 carbon atoms and more preferably with from about 5 to about 20 carbon atoms, aldehyde groups, ketone groups, ester groups, amide groups, carboxylic acid groups, sulfonic acid groups, and the like. Further, two or more substituents can be joined together to form a ring.

Mixtures of two or more photochromic materials can also be employed.

Additional information regarding photochromic materials and the preparation and characterization thereof is disclosed in, for example, Techniques of Chemistry, Vol. 3: Photochromism, A. Weissberger and G. Brown, ed., John Wiley & Sons (New York 1971), and in Photochromism: Molecules and Systems, H. Durr and H. Bouas-Laurent, ed., Elsevier (New York 1990), the disclosures of each of which are totally incorporated herein by reference. Photochromic materials are also available from, for example, Aldrich Chemical Company, Milwaukee, Wis. (including 5480-8; 13,993-9; 26,813-5; 10,655-0; 30,832-3; 5492-1; 15,073-8; 21,515-5; 12,672-1; 39,026- 7; and the like), Eastman Kodak Company, Rochester, N.Y. (including 1817; 13080; 704; 9439; 11012; 902; and the like), Lancaster Synthesis Inc., Windham, N.H. (including 2002; 4555; 4956; 4364; and the like), Fluka Chemika-BioChemika, Buchs, Switzerland (including 85868; 85870; 85875; 12801; and the like) and the like.

The photochromic material is present in the ink in any effective amount. Typically, the photochromic material is present in the ink in an amount of from about 2 to about 10 percent by weight, preferably from about 2 to about 6 percent by weight, and more preferably from about 3 to about 4 percent by weight, although the amount can be outside these ranges.

Optionally, Inks of the present invention can also contain a colorant in addition to the photochromic material. Preferably, this additional optional colorant is an oil soluble dye. The dye is selected so that it is relatively soluble in the organic component of the ink and relatively insoluble in water. For example, one dye suitable for the present invention, Solvent Red 119, has solubilities of about 0.35 grams per milliliter in benzyl alcohol, about 0.2 grams per milliliter in methyl ethyl ketone, about 3 milligrams per milliliter in ethanol, and less than about 0.1 milligram per milliliter in water. Another suitable dye, Solvent Blue 37, is somewhat more soluble in water. The dye is present in the ink in any effective amount. Typically, the dye is present in the ink in an amount of from about 2 to about 10 percent by weight, preferably from about 2 to about 6 percent by weight, and more preferably from about 3 to about 4 percent by weight, although the amount can be outside these ranges. Examples of suitable oil soluble or spirit soluble dyes include Orasol Black RL or Intraplast Black RL/Solvent Black 29, Lapranol Black BR, Savinyl Black RLS, Orasol Black RLP, Neozapon Black X57; solvent yellow dyes inclusive of Savinyl Yellow 2 RLS, Savinyl Yellow RLSN, Intraplast Yellow 2GLN, Neozapon Yellow 081, Neozapon Yellow 141, Levaderm Lemon Yellow, Zapon Fast Yellow CGR, Aizen Fast Yellow CGNH, Zapon Yellow 100, Zapon Yellow 157, and Savinyl Yellow RLS; magenta dyes such as Neozapon Red 492, Direct Brilliant Pink B, Savinyl Pink 6 BLS, Savinyl Red 3 BLS, Orasoi Red 2 BL, Intraplast Red G (Orasol Red), Savinyl Red BLSN, Savinyl Scarlet RLS, Savinyl Fire Red 3GLS, and Zapon Red 335; cyan dyes Orasol Blue 2 GLN, Neozapon Blue 807, Savinyl Blue RLS, Savinyl Blue GLS, Orasol Blue GN, and Losol Blue; brown dyes inclusive of Zapon Brown 187 and Savinyl Brown GLS, Solvent Green 3, Sudan Black B, Ceres Blue 2V, Liquid Oil Jet Black, Macrolex Red G Gram, Macrolex Yellow 3G, Morfast Blue 100, Morfast Red 104, and mixtures thereof; and the like, as well as mixtures thereof.

If desired, the optional colorant can also be a water soluble dye contained in the water phase. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like),Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza[18] annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red HSB (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Triton; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A.Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, although the amount can be outside of these ranges.

Other optional additives to the inks include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The inks of the present invention are characterized by their ability to exhibit a liquid crystalline gel structure at certain temperatures and a liquid microemulsion structure at other, higher temperatures. At a first temperature, they exist in a solid-like form as liquid crystalline gels. At a second temperature, higher than the first temperature, they exist as relatively viscous liquid sols. At a third temperature, higher than the second temperature, they exist as pure liquid microemulsions. In each instance, the transition from one phase to another upon heating or cooling is relatively sharp, in that it occurs rapidly within a narrow temperature range. The inks pass reversibly through these phase changes. Thus, for an ink existing in the liquid crystalline gel form at about 25° C., in the liquid sol form at about 40° C., and in the pure liquid microemulsion form at about 60° C., the ink in gel form can be heated to a suitable temperature, for example, about 60 or 70° C., in an apparatus suitable for hot melt ink jet printing. The ink is jetted onto the substrate, and, as it cools, it passes through the liquid sol phase and into the gel phase. Thus, because the ink rapidly becomes more viscous during cooling, capillary action of the ink in the paper is retarded and high definition images are formed even on plain paper. Optical or scanning electron microscopic examination of an image edge made with inks of the present invention reveals negligible feathering of the immobilized liquid crystalline ink phase. In contrast to other phase change ink concepts, the inks of the present invention upon jetting momentarily remain sufficiently fluid to be partially absorbed into the paper. As a result, the images dry rapidly, show no raised braille-like character, are resistant to surface abrasion, and exhibit good fix. Inks which exist in the liquid sol phase at room temperature and in the pure liquid microemulsion phase at a temperature above room temperature are also suitable for the process of the present invention.

Figure 2:
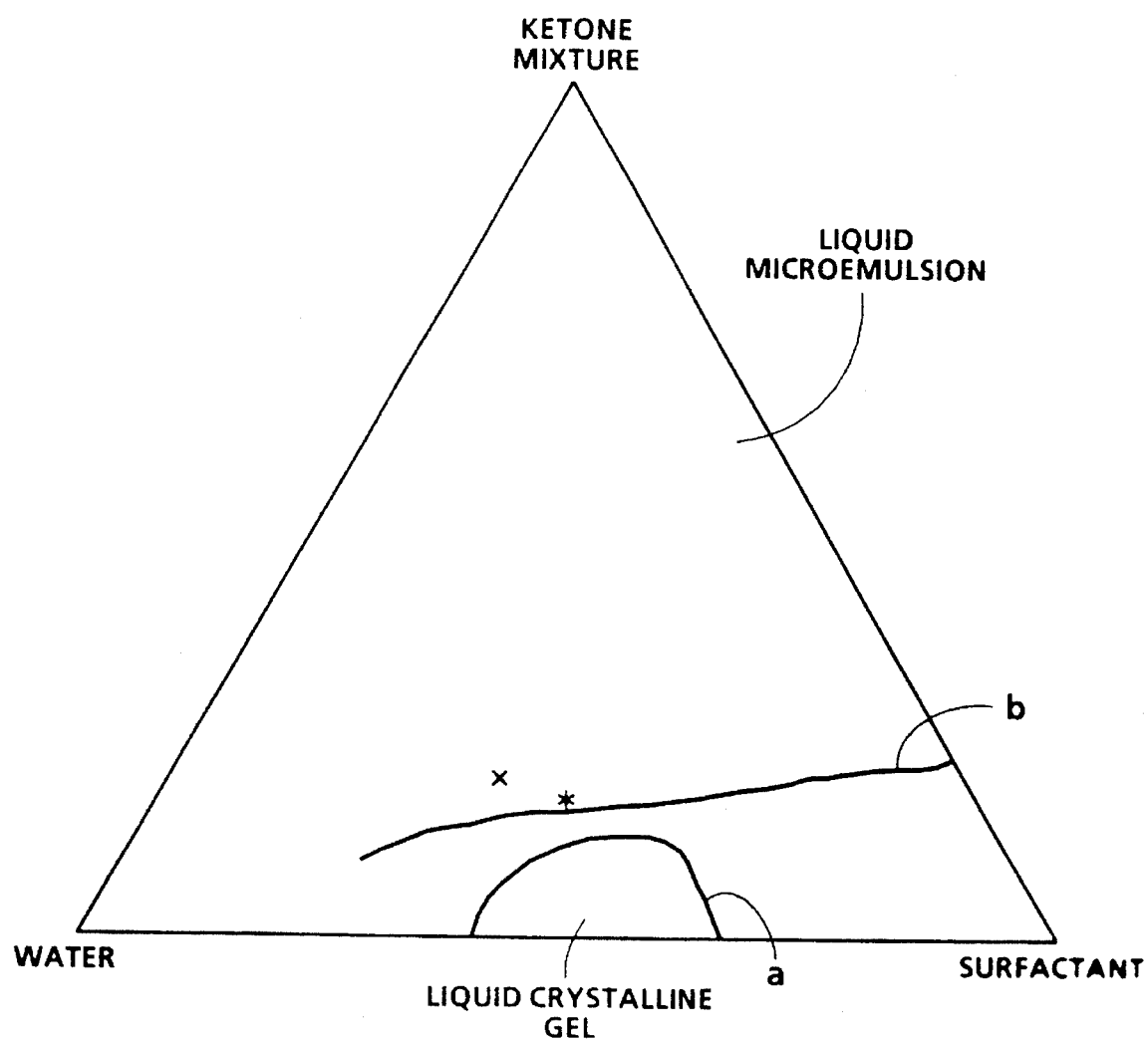

The behavior of ink compositions of the present invention is further illustrated by the partial phase diagrams in FIGS. 1 and 2. More specifically, inks 1 and 2 prepared in Example I hereinbelow can be represented by the partial phase diagrams shown in FIGS. 1 and 2, wherein ink 1 is represented by an "X" and ink 2 is represented by a "*". Illustrated in FIG. 1 is a partial phase diagram for a mixture of water, surfactant, and a ketone mixture at 25° C. Illustrated in FIG. 2 is a partial phase diagram for the same mixture of water, surfactant, and ketone mixture at 50° C. In both instances, each apex of the triangle represents one of the three components at a concentration of 100% by weight, and the point where a line drawn from each apex to the triangle base opposite the apex intersects the base represents that component at a concentration of 0% by weight. (Thus, a mixture containing 33.3% by weight of each component would be plotted at the exact point where all three lines intersect in the center of the triangle.) The composition can be shifted between the liquid crystalline gel phase, represented by the area under line "a" in the diagrams, the pure liquid microemulsion phase, represented by the area above line "b" in the diagrams, and the transitionary liquid sol phase, represented by the area between lines "a" and "b" on the diagrams, by varying the relative concentrations of each of the three components at the temperature of the diagram. The phase of a particular composition can also be shifted by varying the temperature, as can be seen by the differences between the phase lines on the diagram in FIG. 1, at 25° C., and FIG. 2, at 50° C. Thus, as shown, inks 1 and 2 are in the liquid crystalline gel phase at 25° C., but shift to the liquid microemulsion phase at 50° C. These diagrams are referred to herein as "partial" in that not all possible phases at all possible concentrations have been mapped. The area above line "c" in FIG. 1 is a two-phase mixture of water and organic ketone, and other areas on the diagrams are generally believed to be single phase mixtures. These phase diagrams are known in the art and are demonstrated in more detail in, for example, "Stabilization of Inverse Micelles by Nonionic Surfactants," Stig E. Friberg, contained in *Interfacial Phenomena in Apolar Media,* Eicke & Parfitt, eds., Marcel Dekker Inc. (New York and Basel 1987), the disclosure of which is totally incorporated herein by reference.

Figure 3:
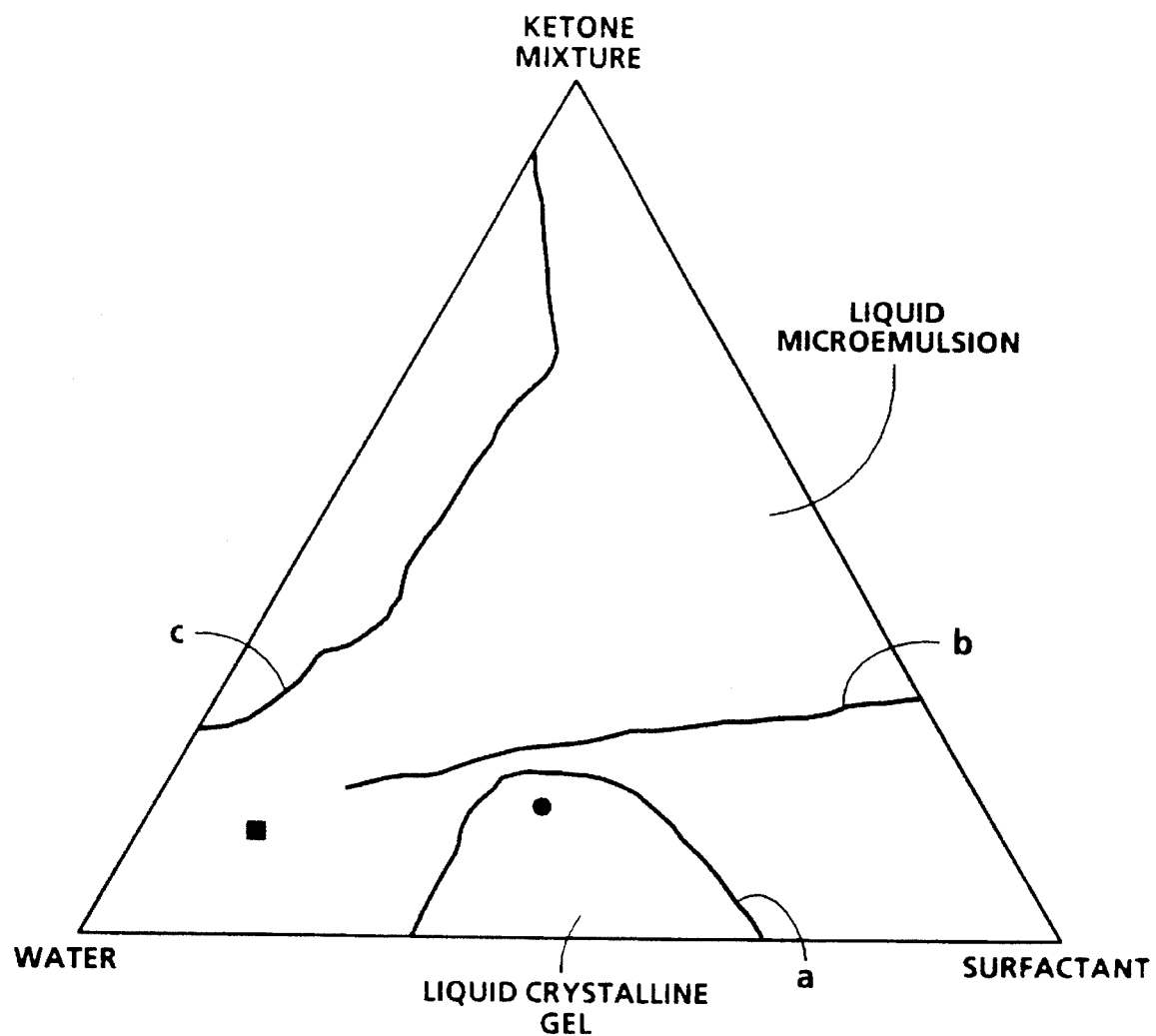

Also suitable for the present invention are inks which are formulated and jetted in an ink jet printing process in a relatively "dilute" form, in that they contain a relatively high concentration of water. These inks, however, are of a formulation that enables formation of a liquid crystalline gel when the ink becomes more concentrated subsequent to jetting onto a substrate and evaporation of water therefrom. An example of such an ink is illustrated schematically in FIG. 3, which represents the same component mixture illustrated in FIGS. 1 and 2, and with the same phases at 25° C., wherein a square represents the composition of an ink prior to jetting at 25° C. and a circle represents the composition of the ink subsequent to partial drying of the ink on the substrate at 25° C. These "dilute" inks are particularly suitable for printing processes wherein the substrate, such as paper, transparency material, or the like, is heated during the printing process to facilitate evaporation of water from the ink and concentration of the liquid crystalline sol component. Preferably, the substrate is heated to the highest temperature possible to enable the most rapid possible ink drying without damaging the substrate. When transparency substrates are employed, temperatures typically are limited to a maximum of about 100° to 110° C., since the polyester typically employed as the base sheet in transparency sheets tends to deform at higher temperatures. Specially formulated transparencies and paper substrates can, however, tolerate higher temperatures, frequently being suitable for exposure to temperatures of 150° or even 200° C. in some instances. Typical heating temperatures are from about 90° to about 140° C. These inks can, however, also be employed in a printing process wherein the substrate is not heated and the ink is allowed to dry at ambient temperature; in these instances, drying times of from about 10 to about 15 seconds are typical, although the drying time can be outside this range.

Inks of the present invention are distinct from inks which contain liquid crystalline molecules or components in that no single ink component, standing alone, exhibits liquid crystalline behavior. Rather, the combination of ink components exhibits liquid crystalline behavior upon heating and cooling.

Inks of the present invention which are solid at room temperature typically exist within a specific temperature window in the solid or liquid crystalline gel phase at temperatures of from about 10° to about 45° C., preferably from about 25° to about 40° C., although the range of gel temperatures can be outside these ranges. Inks of the present invention typically exist in the liquid sol phase at temperatures of from about 15° to about 70° C., preferably from about 25° to about 65° C., although the range of liquid sol temperatures can be outside these ranges. Inks of the present invention typically exist in the pure liquid microemulsion phase at temperatures of above about 65°, preferably above about 75° C., although the pure liquid microemulsion temperature can be above or below these values.

While in the liquid crystalline gel form, inks of the present invention typically have viscosities of several hundred milliPascal-seconds or more. While at higher temperatures (typically about 600C or more) in the liquid sol form, inks of the present invention typically have viscosities of from about 5 to about 12 milliPascal-seconds, although the viscosity in the liquid sol form can be outside this range. While in the pure liquid microemulsion form, inks of the present invention typically have viscosities that are somewhat lower than the viscosity of the ink in the liquid sol form, typically being at least about 20 percent lower than the viscosity of the ink in the liquid sol form, and typically being from about 2 to about 10 milliPascal-seconds, although the viscosity in the microemulsion form can be outside this range.

Typically, inks of the present invention are converted from the liquid crystalline gel phase to the liquid sol phase over a relatively narrow temperature range; typically the temperature range for the transition between the liquid crystalline gel phase and the liquid sol phase is about 2° C. or less, more typically about 1° C. or less, and preferably about 0.5° C. or less, although the transition range can be broader than these ranges. Typically, inks of the present invention are converted from the liquid sol phase to the pure liquid microemulsion phase over a relatively narrow temperature range; typically the temperature range for the transition between the liquid sol phase and the pure liquid microemulsion phase is about 2° C. or less, more typically about 1° C. or less, and preferably about 0.5° C. or less, although the transition range can be broader than these ranges.

Inks of the present invention can be prepared by any suitable method. For example, the inks can be prepared by gently stirring or shaking the individual components of the aqueous, surfactant, and organic solvent phases in an appropriate container. Typically, the photochromic material is admixed with the organic component first, as is the optional oil-soluble dye if present (and, if necessary, filtering this mixture to remove any solid impurities), followed by admixing all of the other ingredients with the organic component/photochromic material mixture, agitating while heating to a temperature adequate to form a stable microemulsion, and thereafter cooling the ink.

Printed images may be generated with the inks of the present invention by incorporating the inks into a thermal ink jet printer and causing droplets of the molten ink to be ejected in imagewise pattern onto a substrate such as paper or transparency material. Suitable printers for employing the inks of the present invention include commercially available ink jet printers, such as the ThinkJet®, PaintJet®, and DeskJet® printers available from Hewlett-Packard Company. Conventional thermal ink jet printers may be modified to make them suitable for use with inks of the present invention by including a heater for heating the ink reservoir to the temperature at or above which the ink is in the pure liquid microemulsion phase. The inks of the present invention are also suitable for use in piezoelectric drop-on-demand ink jet printing systems and in continuous stream ink jet printing systems that have been modified to be capable of heating the ink. Any suitable substrate can be employed, including plain papers such as Xerox® 4024 papers, ruled notebook paper, bond paper, silica coated papers such as Sharp Company silica coated paper, Jujo paper, and the like, transparency materials, fabrics, textile products, plastics, polymeric films, inorganic substrates such as metals and wood, and the like. In a preferred embodiment, the process entails printing onto a porous or ink absorbent substrate, such as plain paper.

The images printed with the inks of the present invention are photochromic in that they have a first state corresponding to a first absorption spectrum and a second state corresponding to a second absorption spectrum. Another embodiment of the present invention is directed to a process which comprises (a) incorporating into an ink jet printer an ink composition which comprises an aqueous phase, an oil phase, a photochromic material having a first state corresponding to a first absorption spectrum and a second state corresponding to a second absorption spectrum, and a surfactant, said ink exhibiting a liquid crystalline gel phase at a first temperature and a liquid microemulsion phase at a second temperature higher than the first temperature; (b) causing droplets of the ink to be ejected in imagewise pattern onto a substrate; and (c) thereafter effecting a photochromic change in at least some of the photochromic material on the substrate from the first state to the second state.

The photochromic shift from the first state to the second state can be effected by any method suitable for the photochromic material or materials selected for the marking material. Examples of methods for inducing the photochromic shift include irradiation with radiation of a suitable wavelength, typically from about 200 to about 400 nanometers, although the wavelength can be outside this range. The reverse photochromic effect can be induced by irradiation with visible light, typically in the wavelength range of from about 400 to about 700 nanometers, although the wavelength can be outside this range, or by the application of heat.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

Ink compositions of the present invention with the following ingredients (percentages are by weight) are prepared by first admixing the photochromic material and the organic component (and filtering the mixture, if desired), followed by admixing the remaining ingredients, heating to a temperature sufficient to establish a stable microemulsion, and shaking, followed by cooling:

●Ink 1:  2.0% 1',3'-dihydro-1',3',3'-trimethyl-6-nitrospiro [2H-1-benzopyran-2-2'-(2H)-indole] (photochromic material, available from Aldrich Chemical Company, Milwaukee, WI), of the formula

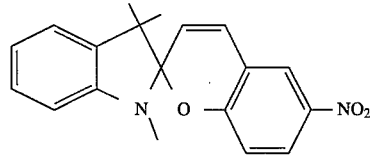

33.3% polyoxyethylene (10) stearyl ether surfactant (Brij 76, obtained from ICI Americas, Inc., Wilmington, DE), 48.0% water, 16.7% mixture containing 50% methyl ethyl ketone and 50% 2,4-pentanedione.

●Ink 2:  2.0% 1,3-dihydro-1,3,3-trimethylspiro[2H-indole-2,3'-[3H]naphth[2,1-b][1,4]oxazine (photochromic material, available from Aldrich Chemical Company, Milwaukee, WI), of the formula

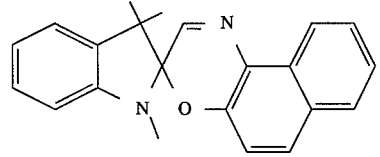

40.7% Brij 76 surfactant, 40.7% water, 16.6% mixture containing 50% methyl ethyl ketone and 50% 2,4-pentanedione.

●Ink 3:  2.0% 1',3'-dihydro-1',3',3'-trimethyl-6-nitrospiro[2H-1-benzopyran-2,2'-(2H)indole], 57.8% sodium dioctyl sulfosuccinate (aerosol) surfactant (obtained from American Cyanamid, Wayne, NJ), 10.8% water, 29.4% methyl ethyl ketone.

●Ink 4:  1.5% 1,3-dihydro-1,3,3-trimethylspiro[2H-indole-2,3'-[3H]naphth[2,1-b][1,4]oxazine, 54.1% sodium dioctyl sulfosuccinate (aerosol) surfactant, 14.8% water, 29.6% methyl ethyl ketone.

●Ink 5:  6.0% 1',3'-dihydro-1',3',3'-trimethyl-6-nitrospiro[2H-1-benzopyran-2,2'-(2H)indole], 27.8% Brij 76 surfactant, 22.6% water, 17.3% methyl ethyl ketone, 7.5% ethanol, 18.8% hexane.

●Ink 6:  1.5% 1,3-dihydro-1,3,3-trimethylspiro[2H-indole-2,3'-[3H]naphth[2,1-b][1,4]oxazine, 5.5% Oil Jet black dye (obtained from Keystone Aniline Corp., Chicago, IL), 27.5% Brij 56 polyoxyethylene (10) cetyl ether surfactant (obtained from ICI Americas, Inc., Wilmington, DE), 22.4% water, 16.8% methyl ethyl ketone, 7.7% ethanol, 18.6% hexane.

These inks are each incorporated into a thermal ink jet printing test fixture equipped with a Hewlett-Packard DeskJet® printhead modified with an aluminum block heater inserted into the cartridge. The printhead cartridge is heated to temperatures of from about 90° to about 110° C. to result in printhead face temperatures of from about 65° to about 85° C. to enable drop ejection. Images are generated by jetting the inks onto Xerox® Archival bond (25% cotton) plain paper. It is believed that all of the inks are capable of being jetted at these temperatures. The images thus formed with the inks containing 1,3-dihydro-1,3,3-trimethylspiro [2H-indole-2,3'-H]naphth[2,1-b][1,4]oxazine are essentially invisible to the naked eye and the images thus formed with the inks containing 1',3'-dihydro-1',3',3'-trimethyl- 6-nitro-spiro[2H-1-benzopyran-2,2'-(2H)indole] are orange or red in color. Upon subsequent irradiation with a Blak Ray longwave UV lamp (model B-100A, San Gabriel, Calif.), it is believed that the print pattern will appear blue for the images generated with the inks containing 1,3-dihydro-1,3,3-trimethylspiro[2H-indole-2,3'-[3H]naphth[2,1-b][1, 4]oxazine and purple for the images generated with the inks containing 1',3'-dihydro- 1',3',3'-trimethyl-6-nitrospiro[2H-1-benzopyran-2,2'-(2H)indole]. Thereafter, it is believed that exposure of the print pattern to incandescent light will return the print to its original appearance.

EXAMPLE II

Ink compositions of the present invention with the following ingredients (percentages are by weight) are prepared by admixing the following ingredients at 75° C. with stirring to dissolve the surfactant in the other ingredients and form a liquid microemulsion, followed by cooling to room temperature to obtain a liquid crystalline gel:

- Ink 7: 30% polyoxyethylene (20) stearyl ether surfactant (Brij 78, obtained from ICI Americas, Inc., Wilmington, DE), 60% water, 10% 1',3'-dihydro-1',3',3'-trimethyl-6-nitrospiro(2H-1-benzopyran-2,2'-(2H)indole]
- Ink 8: 30% polyoxyethylene (20) stearyl ether surfactant (Brij 78, obtained from ICI Americas, Inc., Wilmington, DE), 50% water, 20% 1,3-dihydro-1,3,3-trimethyl-spiro[2H-indole-2,3'-[3H]naphth[2,1-b][1,4]oxazine The ink compositions thus prepared can be incorporated into a thermal ink jet printing test fixture as described in Example I and employed to generate images on plain paper. The images thus formed with the inks containing 1,3-dihydro-1,3,3-trimethylspiro[2H-indole-2,3'-[3H]naphth[2, 1-b][1,4]oxazine are essentially invisible to the naked eye and the images thus formed with the inks containing 1',3'-dihydro-1',3',3'-trimethyl-6-nitrospiro[2H-1-benzopyran-2, 2'-(2H)indole] orange or red in color. Upon subsequent irradiation with a Blak Ray longwave UV lamp (model B-100A, San Gabriel, Calif.), it is believed that the print pattern will appear blue for the images generated with the inks containing 1,3-dihydro-1,3,3-trimethylspiro[2H-indole-2,3'-[3H]naphth[2,1-b][1,4]oxazine and purple for the images generated with the inks containing 1',3'-dihydro-1', 3',3'-trimethyl- 6-nitrospiro[2H-1-benzopyran-2,2'-(2H)indole]. Thereafter, it is believed that exposure of the print pattern to incandescent light will return the print to its original appearance.

EXAMPLE III

Ink compositions of the present invention with the following ingredients (percentages are by weight) are prepared by first admixing the photochromic material and the organic component and filtering the mixture if desired, followed by admixing the remaining ingredients, heating to a temperature sufficient to establish a stable microemulsion, and shaking, followed by cooling:

- Ink 9: 4.1% 1',3'-dihydro-1',3',3'-trimethyl-6-nitrospiro[2H-1-benzopyran-2,2'-(2H)indole], 6.3% sodium dioctyl sulfosuccinate surfactant (Aerosil OT, obtained from American Cyanamid Co., Wayne, NJ), 29.0% water, 60.6% cyclohexanone.
- Ink 10: 4.1% 1,3-dihydro-1,3,3-trimethylspiro[2H-indole-2,3'-[3H]naphth[2,1-b][1,4]oxazine, 6.9% sodium dodecyl sulfonate surfactant (obtained from E. I. Du Pont de Nemours & Co., Wilmington, DE), 30.0% water, 59.0% cyclohexanone.
- Ink 11: 3.5% 1',3'-dihydro-1',3',3'-trimethyl-6-nitrospiro[2H-1-benzopyran-2,2'-(2H)indole], 4.5% sodium dioctyl sulfosuccinate surfactant (Aerosil OT, obtained from American Cyanamid Co., Wayne, NJ), 31.5% water, 52.6% cyclohexanone, 7.9% ethanol.
- Ink 12: 3.5% 1,3-dihydro-1,3,3-trimethylspiro[2H-indole-2,3'-[3H]naphth[2,1-b][1,4]oxazine, 3.9% sodium dodecyl sulfonate surfactant (obtained from E. I. Du Pont de Nemours & Co., Wilmington, DE), 30.6% water, 45.0% cyclohexanone, 11.6% methyl cellosolve.
- Ink 13: 3.4% 1',3'-dihydro-1',3',3'-trimethyl-6-nitrospiro[2H-1-benzopyran-2,2'-(2H)indole], 5.6% sodium dodecyl sulfonate surfactant (obtained from E. I. Du Pont de Nemours & Co., Wilmington, DE), 30.0% water, 51.5% cyclohexanone, 2.1% ethanol, 5.3% ethylene glycol.
- Ink 14: 3.8% 1,3-dihydro-1,3,3-trimethylspiro[2H-indole-2,3'-[3H]naphth[2,1-b][1,4]oxazine, 5.0% cetyl trimethyl ammonium bromide surfactant, 29.1% water, 51.5% cyclohexanone, 6.0% ethanol, 4.6% methyl cellosolve.

The inks thus formed will contain a relatively small concentration of liquid crystalline phase prior to jetting; this phase, however, will become concentrated upon evaporation of water from the ink subsequent to jetting.

These inks are incorporated into a thermal ink jet printing test fixture equipped with a Hewlett-Packard DeskJet® printhead. Images are generated by jetting the inks onto a variety of plain papers. It is believed that all of the inks will exhibit good printhead operability, being readily jettable with little or no maintenance intervention. The images thus formed with the inks containing 1,3-dihydro-1,3,3-trimethylspiro[2H-indole- 2,3'-[3H]naphth[2,1-b][1,4]oxazine are essentially invisible to the naked eye and the images thus formed with the inks containing 1',3'-dihydro- 1',3',3'-trimethyl-6-nitrospiro[2H-1-benzopyran-2,2'-(2H)indole] are orange or red in color. Upon subsequent irradiation with a Blak Ray longwave UV lamp (model B-100A, San Gabriel, Calif.), it is believed that the print pattern will appear blue for the images generated with the inks containing 1,3-dihydro-1,3,3-trimethylspiro[2H-indole-2,3'-[3H]naphth[2, 1-b][1,4]oxazine and purple for the images generated with the inks containing 1',3'-dihydro-1',3',3'-trimethyl-6-nitrospiro[2H-1-benzopyran- 2,2'-(2H)indole]. Thereafter, it is believed that exposure of the print pattern to incandescent light will return the print to its original appearance.

Optionally, the paper can be heated to a temperature of about 100° C. by a heating block situated under the paper sheet to increase drying time and concentration of the liquid crystalline phase in the ink subsequent to jetting.

Other embodiments and modifications of the present invention may occur to those skilled in the art subsequent to a review of the information presented herein. These embodiments and modifications, as well as equivalents thereof, are also included within the scope of this invention.

What is claimed is:
1. An ink composition which comprises an aqueous phase, an oil phase, a photochromic material, and a surfactant, said ink exhibiting a liquid crystalline gel phase at a first temperature and a liquid microemulsion phase at a second temperature higher than the first temperature.

2. An ink composition according to claim 1 wherein the oil phase is selected from the group consisting of ketones, alcohols, glycol ethers, hydrocarbons, and mixtures thereof.

3. An ink composition according to claim 1 wherein the oil phase contains a material selected from the group consisting of methyl ethyl ketone, 2,4-pentadione, ethylene glycol dimethyl ether, ethanol, hexane, and mixtures thereof.

4. An ink composition according to claim 1 wherein the oil phase contains materials with boiling points of less than about 80° C.

5. An ink composition according to claim 1 wherein the oil phase contains a material selected from the group consisting of sulfolane, cyclohexanone, 2-pentanol, and mixtures thereof.

6. An ink composition according to claim 1 wherein the oil phase contains materials with boiling points of greater than about 80° C.

7. An ink composition according to claim 1 wherein the oil phase contains materials with boiling points of greater than about 100° C.

8. An ink composition according to claim 1 wherein the oil phase is present in the ink in an amount of from about 15 to about 50 percent by weight.

9. An ink composition according to claim 1 wherein the oil phase is present in the ink in an amount of from about 17 to about 44 percent by weight.

10. An ink composition according to claim 1 wherein the photochromic material is present in the ink in an amount of from about 2 to about 10 percent by weight.

11. An ink composition according to claim 1 wherein the surfactant is present in the ink in an amount of from about 25 to about 65 percent by weight.

12. An ink composition according to claim 1 wherein the surfactant is present in the ink in an amount of from about 27 to about 60 percent by weight.

13. An ink composition according to claim 1 wherein the surfactant is a nonionic surfactant.

14. An ink composition according to claim 1 wherein the surfactant contains hydrophobic units selected from the group consisting of alkyl groups and alkylaryl groups and contains hydrophilic units selected from the group consisting of alkylene oxide groups and alkylene glycol groups.

15. An ink composition according to claim 1 wherein the surfactant is $C_xH_{(2x+1)}(OC_2H_4)_yA$,

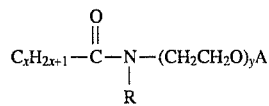

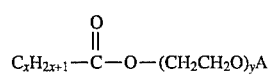

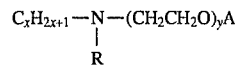

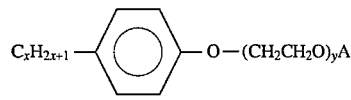

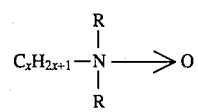

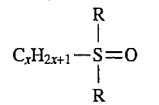

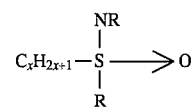

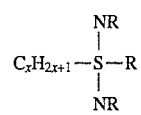

or

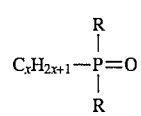

wherein each R is, independently of the others, hydrogen or an alkyl group, x is an integer of from about 8 to about 22, y is an integer of from 0 to about 14, and A is a terminal functional group.

16. An ink composition according to claim 15 wherein x is an integer of from about 12 to about 18, y is an integer of from about 2 to about 8, and A is selected from the group consisting of —H, —OH, —CH$_3$, —C$_2$H$_5$, —CH$_2$CH$_2$CH$_3$, —CH(CH$_3$)$_2$, —OSO$_3^-$, —OSO$_2$NR$_2$ wherein each R is, independently of the others, hydrogen or an alkyl group; —COO$^-$, —OPO$_3^-$, —C(O)OCH$_2$CH$_2$SO$_3^-$, —NR$_3^+$ wherein each R is, independently of the others, hydrogen or an alkyl group; —N(R)CH$_2$COO$^-$ wherein R is hydrogen or an alkyl group; —N$^+$R$_2$CH$_2$COO$^-$ wherein each R is, independently of the other, hydrogen or an alkyl group; —N(R)CH$_2$CH$_2$COO$^-$ wherein R is hydrogen or an alkyl group; —N$^+$R$_2$CH$_2$CH$_2$COO$^-$ wherein each R is, independently of the other, hydrogen or an alkyl group; —N(R)CH$_2$SO$_3^-$ wherein R is hydrogen or an alkyl group; —N$^+$R$_2$CH$_2$SO$_3^-$ wherein each R is, independently of the other, hydrogen or an alkyl group; —N(R)CH$_2$CH$_2$SO$_3^-$ wherein R is hydrogen or an alkyl group; —N$^+$R$_2$CH$_2$CH$_2$SO$_3^-$ wherein each R is, independently of the other, hydrogen or an alkyl group; —C(O)N(R)CH$_2$COO$^-$ wherein R is hydrogen or an alkyl group; —C(O)N(R)CH$_2$CH$_2$COO$^-$ wherein R is hydrogen or an alkyl group; —C(O)N(R)CH$_2$SO$_3^-$ wherein R is hydrogen or an alkyl group; —C(O)N(R)CH$_2$CH$_2$SO$_3^-$ wherein R is hydrogen or an alkyl group;

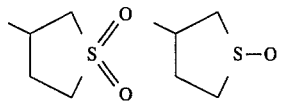

and mixtures thereof.

17. An ink composition according to claim 1 wherein the surfactant is selected from the group consisting of those of the general formula RO(CH$_2$CH$_2$O)$_n$H wherein R is a mixture of linear, even carbon-number hydrocarbon chains ranging from C$_{12}$H$_{25}$ to C$_{16}$H$_{33}$ and n represents the number of repeating units and is a number of from 1 to about 12.

18. An ink composition according to claim 1 wherein the surfactant is selected from the group consisting of: (a) C$_{12}$H$_{25}$—(OCH$_2$CH$_2$)$_6$OH; (b) C$_{12}$H$_{25}$—(OCH$_2$CH$_2$)$_2$OSO$_3^\ominus$; (c) RO(CH$_2$CH$_2$O)$_n$H where R is a mixture of C$_{12}$H$_{25}$ and C$_{14}$H$_{29}$ and n represents the number of repeating units and has an average value of about 3; (d) $RO(CH_2CH_2O)_nH$ where R is a mixture of $C_{12}H_{25}$ and $C_{14}H_{29}$ and n represents the number of repeating units and has an average value of about 6.3; (e) $RO(CH_2CH_2O)_nH$ where R is a mixture of $C_{12}H_{25}$ and $C_{14}H_{29}$ and n represents the number of repeating units and has an average value of about 6.9; (f) $RO(CH_2CH_2O)_nH$ where R is a mixture of $C_{12}H_{25}$ and $C_{14}H_{29}$ and n represents the number of repeating units and has an average value of about 7.2; (g) $RO(CH_2CH_2O)_nH$ where R is a mixture of $C_{12}H_{25}$ and $C_{14}H_{29}$ and n represents the number of repeating units and has an average value of about 7.0; (h) $RO(CH_2CH_2O)_nH$ where R is a mixture of $C_{12}H_{25}$ and $C_{14}H_{29}$ and n represents the number of repeating units and has an average value of about 8.3; (i) $RO(CH_2CH_2O)_nH$ where R is a mixture of $C_{12}H_{25}$ and $C_{14}H_{29}$ and n represents the number of repeating units and has an average value of about 11.3; and mixtures thereof.

19. An ink composition according to claim 1 wherein the surfactant is selected from the group consisting of polyoxyethylene (10) stearyl ether, polyoxyethylene (20) stearyl ether, polyoxyethylene (10) cetyl ether, sodium dioctyl sulfosuccinate, sodium dodecyl sulfonate, cetyl trimethyl ammonium bromide, and mixtures thereof.

20. An ink composition according to claim 1 wherein the ink exhibits a liquid crystalline gel phase at a temperature of from about 10° to about 45° C.

21. An ink composition according to claim 1 wherein the ink exhibits a liquid crystalline gel phase at a temperature of from about 25° to about 40° C.

22. An ink composition according to claim 1 wherein the ink exhibits a liquid sol phase at a temperature of from about 15° to about 70° C.

23. An ink composition according to claim 1 wherein the ink exhibits a liquid sol phase at a temperature of from about 25° to about 65° C.

24. An ink composition according to claim 1 wherein the ink exhibits a liquid microemulsion phase at a temperature above about 65° C.

25. An ink composition according to claim 1 wherein the ink exhibits a liquid microemulsion phase at a temperature above about 75° C.

26. An ink composition according to claim 1 wherein the ink exhibits a viscosity of from about 2 to about 10 milliPascal-seconds when in the liquid microemulsion phase.

27. An ink composition according to claim 1 wherein the photochromic material is a spiropyran.

28. An ink composition according to claim 1 wherein the photochromic material is a spirooxazine.

29. An ink composition according to claim 1 wherein the photochromic material is a spirothiopyran.

30. An ink composition according to claim 1 wherein the photochromic material is selected from the group consisting of 1',3'-dihydro- 1',3',3'-trimethyl-6-nitrospiro[2H-1-benzopyran-2,2'-(2H)indole], 1,3-dihydro-1,3,3-trimethylspiro[2H-indole-2,3'-[3H]naphth[2,1-b][1,4]oxazine, and mixtures thereof.

31. A process which comprises incorporating into an ink jet printing apparatus an ink composition according to claim 1 and causing droplets of the ink composition to be ejected in an imagewise pattern onto a substrate.

32. A process according to claim 31 wherein the ink is selectively heated in an imagewise pattern, thereby causing droplets of the ink to be ejected in an imagewise pattern.

33. A process according to claim 32 wherein the substrate is maintained at a temperature above ambient temperature when droplets of ink are ejected onto the substrate.

34. A process according to claim 31 wherein images are formed by melting the ink and causing the melted ink to be expelled in droplets onto a substrate, thereby generating an image on the substrate.

35. A process which comprises (a) incorporating into an ink jet printer an ink composition which comprises an aqueous phase, an oil phase, a photochromic material having a first state corresponding to a first absorption spectrum and a second state corresponding to a second absorption spectrum, and a surfactant, said ink exhibiting a liquid crystalline gel phase at a first temperature and a liquid microemulsion phase at a second temperature higher than the first temperature; (b) causing droplets of the ink to be ejected in imagewise pattern onto a substrate; and (c) thereafter effecting a photochromic change in at least some of the photochromic material on the substrate from the first state to the second state.

36. A process according to claim 35 wherein the photochromic change in the photochromic material from the first state to the second state is effected by irradiation with radiation at a selected wavelength.

37. A process according to claim 36 wherein said radiation is within the ultraviolet wavelength band.

38. A process according to claim 35 wherein the photochromic material in the second state subsequently is caused to undergo another photochromic change, thereby returning it to the first state.

39. A process according to claim 35 wherein photochromic material in the second state subsequently is caused to undergo another photochromic change effected by irradiation with visible light, thereby returning it to the first state.

40. A process according to claim 35 wherein photochromic material in the second state subsequently is caused to undergo another photochromic change effected by heating, thereby returning it to the first state.

41. A process according to claim 35 wherein all of the photochromic material on the substrate is caused to shift from the first state to the second state.

42. A method according to claim 35 wherein a first portion of the photochromic material on the substrate is caused to shift from the first state to the second state and a second portion of the photochromic material on the substrate remains in the first state.

\* \* \* \* \*